US010700419B2

(12) United States Patent
Rheinfelder et al.

(10) Patent No.: US 10,700,419 B2
(45) Date of Patent: Jun. 30, 2020

(54) ACTIVE ANTENNA SYSTEM

(71) Applicant: Global Invest Properties Holding AG, Pfäffikon (CH)

(72) Inventors: Clemens Rheinfelder, Blaustein (DE); Michael Tauber, München (DE)

(73) Assignee: Global Invest Properties Holding AG, Pfäffikon (CH)

( * ) Notice: Subject to any disclaimer, the term of this patent is extended or adjusted under 35 U.S.C. 154(b) by 0 days.

(21) Appl. No.: 16/049,398

(22) Filed: Jul. 30, 2018

(65) Prior Publication Data

US 2018/0366815 A1    Dec. 20, 2018

Related U.S. Application Data

(62) Division of application No. 15/109,095, filed as application No. PCT/EP2014/079483 on Dec. 30, 2013, now Pat. No. 10,283,848.

(30) Foreign Application Priority Data

Dec. 30, 2013    (EP) .................................. 13199797

(51) Int. Cl.
*H01Q 1/24*      (2006.01)
*H01Q 3/26*      (2006.01)
(Continued)

(52) U.S. Cl.
CPC ........... *H01Q 1/246* (2013.01); *H01Q 3/2605* (2013.01); *H01Q 3/34* (2013.01); *H01Q 21/0025* (2013.01); *H04B 1/40* (2013.01); *H04B 1/62* (2013.01); *H04B 7/04* (2013.01); *H04B 17/12* (2015.01); *H04L 43/106* (2013.01); *H04B 17/21* (2015.01)

(58) Field of Classification Search
CPC ........ H01Q 1/246; H01Q 3/2605; H01Q 3/34; H01Q 21/0025; H04B 17/12; H04B 1/40; H04B 1/62; H04B 7/04; H04B 17/21; H04L 43/106
See application file for complete search history.

(56) References Cited

U.S. PATENT DOCUMENTS 5,175,878 A    12/1992   Davis et al.
5,898,683 A    4/1999   Matsumoto et al.
(Continued)

FOREIGN PATENT DOCUMENTS

CN    102484894    5/2012
EP    2632058    8/2013
(Continued)

OTHER PUBLICATIONS

European Search Report, dated Sep. 15, 2014, from European Application No. EP 13199797.5, filed Dec. 30, 2013. Fifteen pages.
(Continued)

*Primary Examiner* — Nguyen T Vo
(74) *Attorney, Agent, or Firm* — HoustonHogle LLP

(57) ABSTRACT

The present invention relates to an active antenna system comprising
a plurality of antennas (2),
a radio equipment (3) connected to the antennas (2) and being located adjacent to the antennas (2),
wherein the radio equipment (3) comprises for each antenna (2) a separate transceiver module (12).

17 Claims, 27 Drawing Sheets

Figure 1:
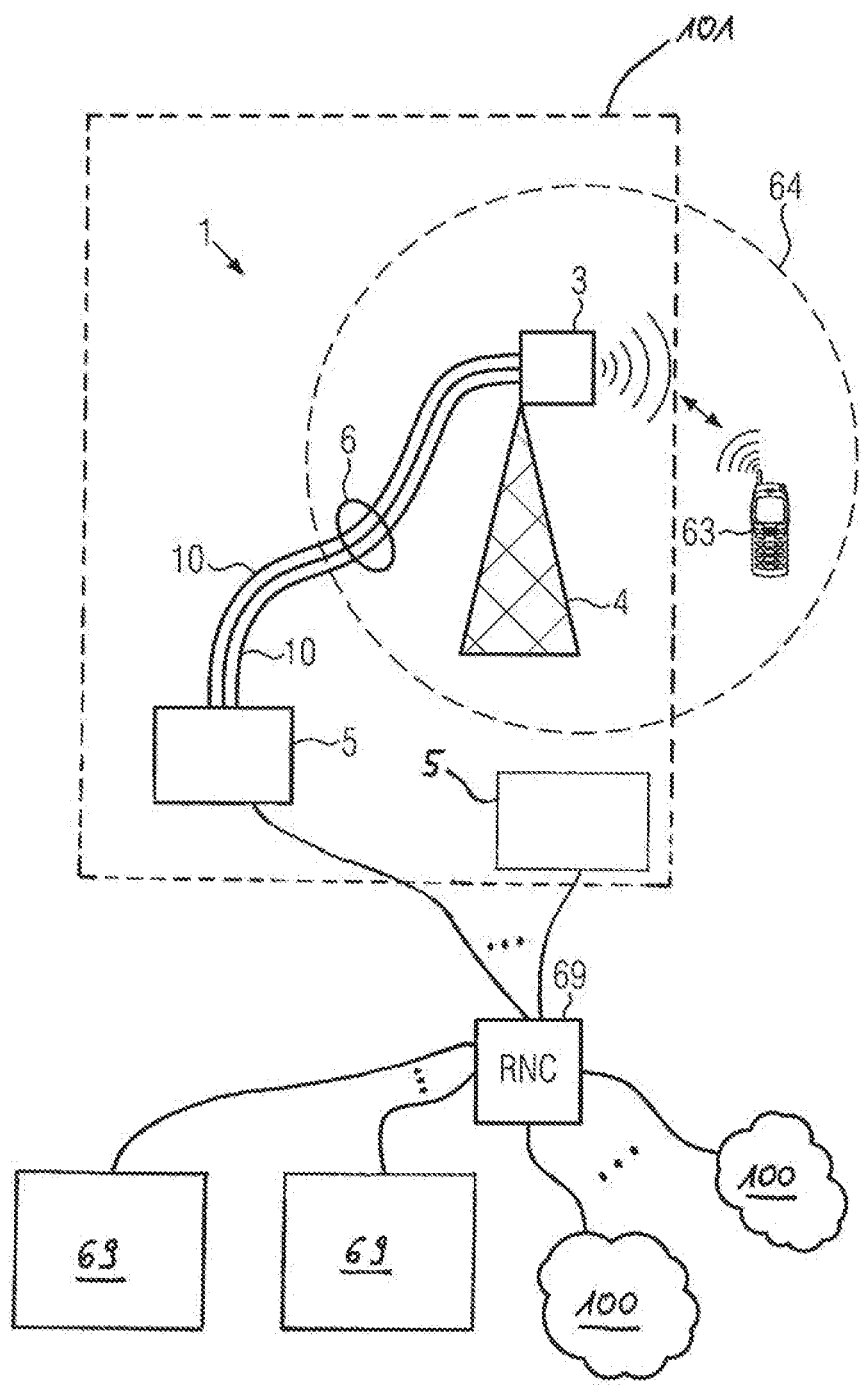

(51) Int. Cl.
*H01Q 3/34* (2006.01)
*H01Q 21/00* (2006.01)
*H04B 7/04* (2017.01)
*H04B 17/12* (2015.01)
*H04B 1/40* (2015.01)
*H04B 1/62* (2006.01)
*H04L 12/26* (2006.01)
*H04B 17/21* (2015.01)

(56) References Cited

U.S. PATENT DOCUMENTS

| | | | |
|---|---|---|---|
| 5,903,834 | A | 5/1999 | Wallstedt et al. |
| 6,801,788 | B1 | 10/2004 | Csapo et al. |
| 8,346,091 | B2 | 1/2013 | Kummetz et al. |
| 8,774,196 | B2* | 7/2014 | Schmidt ............... H04B 7/0682 342/383 |
| 2004/0219950 | A1 | 11/2004 | Pallonen et al. |
| 2008/0214124 | A1 | 9/2008 | Saitou et al. |
| 2010/0087227 | A1 | 4/2010 | Francos et al. |
| 2010/0093282 | A1 | 4/2010 | Martikkala et al. |
| 2010/0278530 | A1 | 11/2010 | Kummetz et al. |
| 2011/0134972 | A1 | 6/2011 | Zhu et al. |
| 2011/0150050 | A1 | 6/2011 | Trigui et al. |
| 2012/0128040 | A1 | 5/2012 | Kenington |
| 2012/0190389 | A1 | 7/2012 | Hui |
| 2012/0196545 | A1 | 8/2012 | Schmidt et al. |
| 2012/0243468 | A1 | 9/2012 | Hui et al. |
| 2013/0194134 | A1 | 8/2013 | Beeker et al. |
| 2015/0118970 | A1* | 4/2015 | Thoukydides ......... H04B 17/14 455/67.14 |

FOREIGN PATENT DOCUMENTS

| | | |
|---|---|---|
| GB | 2440192 | 1/2008 |
| JP | H09162977 | 6/1997 |
| WO | WO 92/13400 | 8/1992 |
| WO | WO 2012141624 | 10/2012 |
| WO | WO 2015101642 | 7/2015 |

OTHER PUBLICATIONS

International Preliminary Report on Patentability, dated Jul. 14, 2016, from International Application No. PCT/EP2014/079483, filed on Dec. 30, 2014. Eighteen pages.

International Search Report and Written Opinion of the International Searching Authority, dated Aug. 18, 2015, from International Application No. PCT/EP2014/079483, filed on Dec. 30, 2014. Twenty-three pages.

Marpaung, D. et al., "Integrated microwave photonics," Laser and Photonics Reviews, Nov. 12, 2012. Thirty pages.

Middleton, C. et al., "High Performance Microwave Photonic Links Using Double Sideband Suppressed Carrier Modulation and Balanced Coherent Heterodyne Detection," Paper given at 2009 IEEE Military Communications Conference, Oct. 18-21, 2009, Boston, MA. Six pages.

Roeloffzen, C.G.H. et al., "Silicon nitride microwave photonic circuits," Optics Express vol. 21, No. 19, Sep. 23, 2013. Twenty-five pages.

Wyrwas, J., "Linear, Low Noise Microwave Photonic Systems using Phase and Frequency Modulation," U.C. Berkeley Technical Report No. UCB/EECS-2012-89, May 11, 2012. One hundred twelve pages.

Notification of Reason for Refusal, dated Nov. 27, 2018, from Chinese Patent Application No. 2016-544555. 19 pages.

* cited by examiner

ACTIVE ANTENNA SYSTEM

RELATED APPLICATIONS

This application is Division of U.S. application Ser. No. 15/109,095, which is a § 371 National Phase Application of International Application No. PCT/EP2014/079483, filed on Dec. 30, 2014, which claims priority to European Application No. 13 199 797.5, filed on Dec. 30, 2013, all of which are incorporated herein by reference in their entirety.

The present invention relates to an active antenna system.

Known active antenna systems comprise a plurality of antennas which are connected to a radio equipment. The radio equipment comprises a single transceiver for transmitting and receiving the antenna signals. The transceiver is connected to the individual antennas by means of a passive array. The radio equipment is connected by means of a data line to a radio equipment control unit. The radio equipment control unit processes the data signals which are to be transmitted and which are received comprising decoding and encoding, distributing of the data to the individual antennas, beamforming, etc.

US 2012/0196545 A1 discloses an antenna array having a plurality of antenna elements. The antenna array comprises a plurality of transceiver modules, an active antenna element subset of the plurality of antenna elements, wherein the active antenna element subset comprises at least one active antenna element being actively coupled to an associated transceiver module of the plurality of transceiver modules and at least one passively combined sub-array of at least two antenna elements of the plurality of antenna elements. A method for generating antenna patterns with the antenna array is also disclosed.

US 2012/0243468 A1 describes a compression/decompression method for backhaul communication of a complex-valued radio signal between base stations and network processing units, such as a Central Processor of a Coordinated MultiPoint (CoMP) system, significantly reducing backhaul bandwidth. The spatial and temporal correlations of a wireless IQ signal are exploited in order to remove redundancy and substantially reduce signal bandwidth. Feature component signals of significance are extracted through linear transformation to form the radio signal, and are individually quantized, possibly at different bit rates in accordance with their relative importance. The transformation can either be predetermined or computed in real-time based on the spatial and temporal statistics of the radio signal. In the latter case, the transformation matrix or matrices are also sent over the backhaul in order to allow the radio signal to be reconstructed at the receiving end. Different methods of generating the transformation matrices are proposed.

US 2012/0190389 A1 discloses to compress multi-antenna complex-valued signals by exploiting both a spatial and a temporal correlation of the signals to remove redundancy within the complex-valued signals and substantially reduce the capacity requirement of backhaul links. After receiving the compressed signal at a receiver, a decompressor decompresses the received signal over space and over time to reconstruct the multiple antenna stream.

EP 2 632 058 A1 discloses an apparatus, a method and a computer program for providing a composite beampattern, the apparatus providing a composite beampattern for at least two antenna elements forming an antenna array coupled to at least two signal branches of a signal, the composite beam-pattern having at least two main lobes pointing in different spatial directions. Further, an adaptive antenna array with an internal digital interface of base stations between Radio Equipment Controllers (REC) to local or remote radio units, also known as Radio Equipment (RE), is described. Between the REC and the RE multiplexed digital base band signals are transferred over serial links using the CPRI-standard.

US 2012/0128040 A1 describes a module for an active antenna system for receiving and transmitting radio signals sealed in a housing. In one aspect of the invention, the module also includes a hub that controls the collection and distribution of the digital radio data and control data. The hub may be switchable on and off so that in some implementations of the invention a single central hub controls the collection and distribution of the digital radio data and control data in different ones of the modules. In another implementation of the invention, each one of the modules has its own hub for controlling the collection and distribution of the digital radio data and control data in its own module as well as between the modules. Between the Radio Equipment Controller (REC) or base transceiver station, respectively, and the Radio Equipment (RE) or C-Hub in the antenna housing, respectively, multiplexed digital base band signals are transferred over serial links using the CPRI- and/or OBSAI-standard.

GB 2 440 192 A discloses a digital radio unit directly connected to a plurality of antenna elements forming the antenna. Each one of the antenna elements is thereby directly connected to the digital radio unit or its components. The digital radio unit converts RF signals received and transmitted via the antenna elements from/to a mobile station into signals according to CPRI or OBSAI standard/interface. These signals are then transferred via optical fibres up to 40 km long to a digital radio server located at a base station. The digital radio unit comprises at least one antenna element, at least one micro radio, and at least one hub, also referred to as "C-hub". Between the Radio Equipment Controller (REC) or base transceiver station, respectively, and the Radio Equipment (RE) or C-Hub at the antenna, respectively, multiplexed digital base band signals are transferred over serial links using the CPRI- and/or OBSAI-standard.

US 2010/0093282 A1 discloses a multi-transceiver architecture for advanced Tx antenna monitoring and calibration in MIMO and smart antenna communication systems. An exemplary wireless transceiver circuit is shown including two individually operated transceiver modules according to the invention configured for use in a wireless MIMO spatial multiplexing system, whereas a second RF signal received via a second antenna connected to a reception chain of the second transceiver module is used for providing feedback information about a first RF signal transmitted from a first antenna connected to a transmission chain of the first transceiver module via a closed antenna loop. Further, an exemplary principle of a calibration set-up for a smart antenna system in downlink calibration during system manufacture (factory calibration) according to an exemplary embodiment of the present invention and an exemplary principle of a downlink calibration of the smart antenna system which can be carried out when the exemplary system is activated/reset (field calibration) or during the run time of the system (run-time calibration) are disclosed.

U.S. Pat. No. 6,801,788 B1 discloses a telecommunication base station transceiver subsystem that can be configured to provide signal or multicarrier frequency services. The base station is divided into a radio unit, which is positioned proximate to the antennas, and a main unit, which is remotely located from the radio unit. The transmission between the main unit and the radio unit comprises an analog signal period.

U.S. Pat. No. 5,903,834 describes a communication network and associated methods, permitting wireless communication with a mobile unit in an indoor environment. Transceivers are positioned at spaced-apart locations and are coupled to a centralized control device. Uplink signals transmitted via a mobile unit are received by receiver portions of transceivers within the range of the uplink signal. Downlink signals are generated by at least two transmitter portions of at least two transceivers.

US 2010/0278530 A1 discloses a distributed antenna system for communicating with a plurality of space stations. The distributed antenna system includes a system controller and a master unit communicating with at least one of the plurality of space stations. A remote unit communicates over high data rate media with the master unit and/or a downstream remote unit. Alternatively, the distributed antenna system includes a controller and a digital time/space crosspoint switch controlled by the controller. By digitizing the transceiver is in in communication with the digital time/space crosspoint switch. The crosspoint switch is configured to transmit and receive digital data through the digitizing transceiver. For each RF band the master unit combines the downlink signal from up to four base stations on a per band basis and digitalizes the combined signal. The digitized and combined signals from each of the RF bands may then be time division multiplexed into frames and converted to a single serial stream.

US 2011/0150050 describes a digital integrated antenna array for enhancing coverage and capacity of a wireless network. The digital antenna array comprises antennas connected to duplex filters connected to amplifiers. Direction couplers between each antenna and the respective duplex filters as well as direction couplers between each duplex filter and the respective amplifiers are used to calibrate the hardware as required for digital beamforming. All calibration signals from the different direction couplers are fed by means of wire connections into a beamforming core, which controls and calibrates a plurality of antennas.

WO 92/13400 A1 discloses a multichannel radiotelephonie system comprising an antenna connected to a duplex filter connected to amplifiers. A direction coupler between the antenna and the duplex filter as well as a direction coupler between the duplex filter and the amplifiers are providing remote diagnostics and measurements as well as RF output subsystem fault detection.

US 2004/0219950 A1 discloses an antenna arrangement and base transceiver station. The base transceiver station comprises at least one active antenna connected to a local unit for performing conversion between a low-frequency digital signal and a radio frequency electromagnetic field.

The object of the present invention is to provide an active antenna system which is very flexible configurable and efficient in operation.

The object is solved by an active antenna system according to claim 1. Advantageous embodiments of the present invention are disclosed in the corresponding subclaims.

According to a first aspect of the present invention an active antenna system comprises
   a radio equipment having a plurality of transceiver modules, each transceiver module being connected to at least one antenna,
   a radio equipment control unit having a hub being connected to the transceiver modules via an antenna interconnect,
wherein the hub is embodied for receiving base band signals via the antenna interconnect from the transceiver modules and to extract channel signals from the received base band signals.

As the hub is arranged in the radio equipment control unit which is part of a base station the base band signals are transmitted to the radio equipment control unit without extracting the channel signals. This allows easily to distribute the base band signals on several data connections, particularly several antenna cables, of one antenna interconnect. This results in a reduced information loss and minimizes the requirements for the transmission capacity of a single data connection of the antenna interconnect between the radio equipment control unit and the radio equipment. The radio equipment control unit does receive all the information which is originally received by the transceiver modules.

The hub separates channel signals of several channels transmitted via one antenna. Therefore, the channel signals of one antenna are combined during the transmission via the antenna interconnect. A hub which separates the channel signals can also be integrated into a channel card.

A further advantage of the hub in the radio equipment control unit is that less power is needed in the radio equipment. As the radio equipment is usually located at the top of an antenna tower the available power is limited.

According to a further aspect of the present invention an active antenna system comprises
   a radio equipment comprising a plurality of transceiver modules, each transceiver module being connected to at least one antenna,
   a radio equipment control unit,
wherein each transceiver module comprises a switch matrix being connected to the radio equipment control unit via an antenna interconnect, wherein at least two switch matrices are connected by means of an intermediate cable.

Such an active antenna system allows to direct flexibly the data via one or the other switch matrix. Preferably the antenna interconnect comprises several antenna cables so that also the data stream is flexible distributed via the several cables by means of the switch matrices.

A switch matrix is a data switch which decides on the content of data packages, particularly the headers, to which target the package is to be transmitted.

The active antenna system according to a further aspect of the present invention comprises a plurality of antennas, a radio equipment connected to the antennas and being located adjacent to the antennas, wherein the radio equipment comprises a separate transceiver module for each antenna.

Thus, the present invention provides a distributed transceiver system for the plurality of antennas, so that the antenna signals of each antenna are individually processed.

By providing a separate transceiver for each antenna, the signals for each antenna can be individually processed. This increases the flexibility because the signals can be individually adapted for each antenna. The distributed transceiver structure is a completely new architecture of the radio equipment of active antenna systems, which provides new solutions for a plurality of different aspects. Preferably, the radio equipment comprises an antenna module for each antenna, wherein each antenna module comprising a transceiver module is embodied with an analog-to-digital converter and a digital-to-analog converter. This allows a digital pre- and post-processing of the individual antenna signals in the radio equipment. Furthermore, this makes it possible to transmit and receive digital data to and from a radio equipment control unit. These data can be compressed. Due to the distributed transceiver architecture, the signals of neighboring antennas are usually very similar, so that the compression is very efficient. It is particularly preferred to jointly compress the digital signals of or for several antennas.

The jointly compressed signals are preferably beamforming signals because beamforming signals for several antennas differ mostly only in the phase shift, wherein the data content is usually substantially identical. Such kind of data can be compressed very efficiently, e.g. by transmitting the content only once and transmitting the phase shift for the individual antennas separately.

The radio equipment and the radio equipment control unit are preferably connected by an antenna connect. The antenna connect can be embodied as optical fiber. The optical fiber can be a single mode fiber or a multi-mode fiber, so that data signals can be transmitted in multiple colors according to the DWDM-standard.

In one preferred embodiment, a hub is provided in the radio equipment control unit, but no hubs are provided in the radio equipment. Such a design is very flexible because the transceiver modules can be incorporated in any kind of topologies. This architecture is freely scaleable and provides a high redundancy. The radio equipment comprising no hub is simpler than ordinary radio equipment and comprises less components and circuits, thus it is more stable.

According to further embodiments, a control RF base band unit, which is part of the radio equipment, comprises a switch matrix, wherein the switch matrix is connected to an antenna interconnect. Additionally, the switch matrix is connected to at least two terminals, wherein the terminals can be connected by means of an intermediate cable to a corresponding terminal of a switch matrix of another control RF base band unit. Thus, several transceiver modules of the radio equipment can be connected by these intermediate cables, wherein at least one or more switch matrix is connected by an antenna interconnect with the radio equipment control unit. With such a design, it is possible to provide particularly suitable topologies, such as comprising only a few antenna interconnects for transmitting redundant data only once between the radio equipment control unit and the radio equipment and duplicating and distributing the redundant data in between the several transceiver modules or antenna modules, respectively, wherein only individual phase information is provided for each antenna module.

The data compression for compressing the digital data which are to be transmitted between the radio equipment and the radio equipment control unit can comprise a lossless data compression or a lossy data reduction process.

Such kind of data compression is particularly efficient in combination with an active antenna system having a distributed architecture of the radio equipment, which means that an individual transceiver module is assigned to each antenna. Thereby, the digital signals of the different antennas are very similar, so that the compression is very efficient.

In a beam forming mode it is possible to calculate once a phase shift per time unit for a moving user equipment (UE) of a communication partner which communicates with the active antenna system so that the corresponding phase shifts can be calculated continuously in the radio equipment and a beam can automatically follow the user equipment.

By means of the received signals the position of the user equipment can be tracked and in case the user equipment deviates from the predicted trajectory a corresponding correction of the phase shift can be carried out.

According to a further embodiment the transceiver module comprises means for calibrating each transceiver module separately with respect to phase and/or amplitude. Such a calibrating means can be provided for the transmission path and/or for the receiving path.

The means for calibrating are comprising a feedback loop which provides a feedback of a reference signal which is picked up for the transmission path or which is coupled to the receiving path by means of a coupling element adjacent to the antenna. A second, alternative coupling element can be provided at the inner side of a duplex filter.

According to a further example an active antenna system is provided comprising
a plurality of antenna modules, wherein each antenna module comprises an antenna, a transceiver module and a control RF-based unit, wherein means for synchronizing the several antenna modules are provided. These calibration means are embodied to measure time delays between respective antenna modules and to apply to each antenna module a certain delay so that the runtime in between the antenna modules is compensated for outputting the antenna signals.

The calibration means can be embodied for measuring the maximum delay in the topologic. Alternatively, the calibration means can be embodied for measuring only the delays to the neighboring antenna modules.

Figure 14:
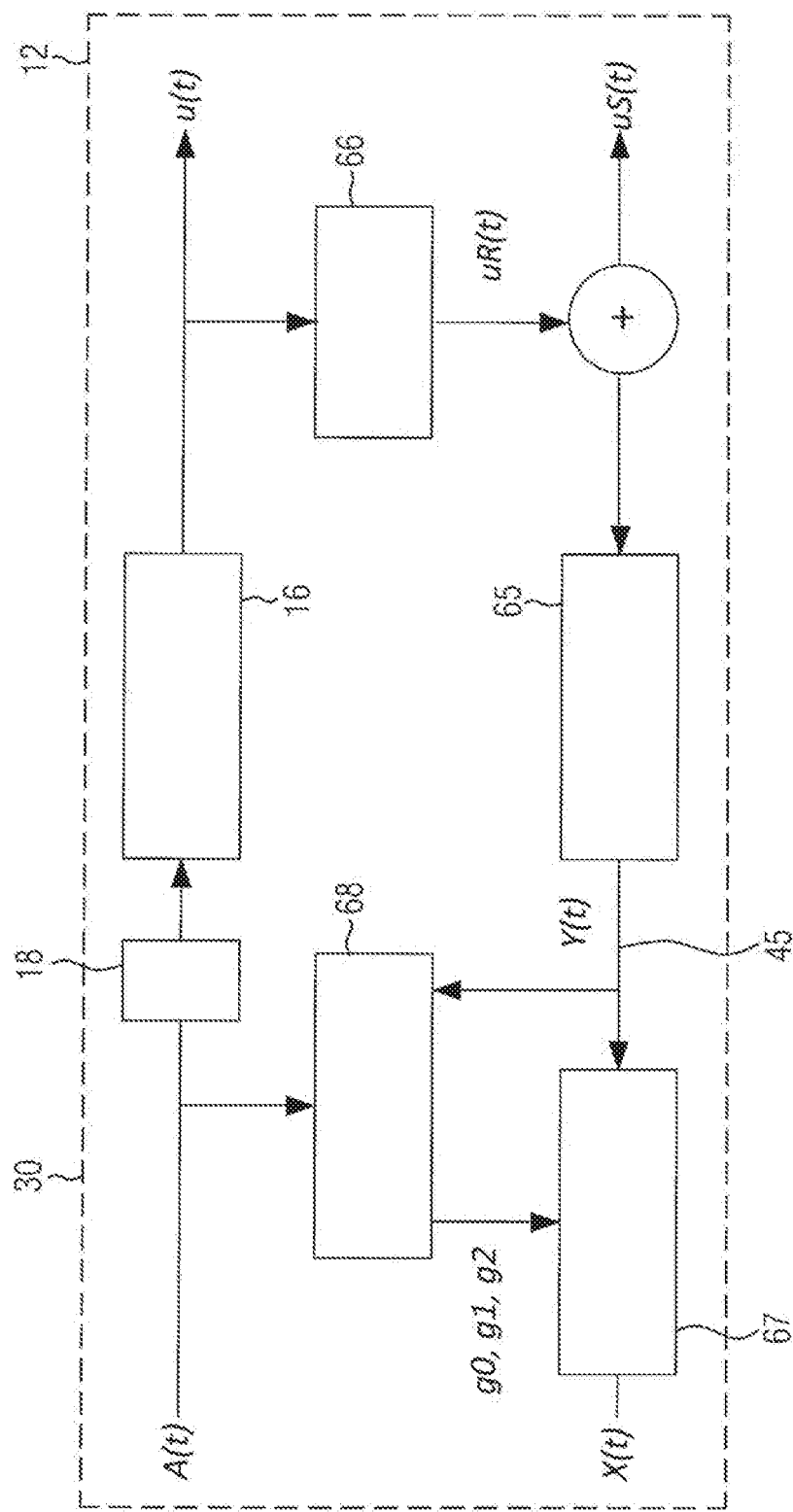

The invention is explained in the following in more detail by means of the enclosed drawings which show several examples of the invention. The drawings show in FIG. 1 schematically an active antenna system, FIG. 2 an antenna module in a side view, FIG. 3 schematically an antenna array in a top view, FIG. 4 radio equipment with a transceiver module in a block diagram, FIG. 5 an antenna comprising several radiators in a side view, FIG. 6*a* an active antenna system comprising several transceiver modules connected to a radio equipment control unit in a block diagram, FIG. 6*b* a further embodiment of transceiver modules in a block diagram, FIG. 7 a diagram of the electric field with two main lobs and four side lobs, FIG. 8*a*, 8*b* embodiments of Tx-transmission chips in block diagrams, FIG. 9*a*, 9*b* embodiments of Rx-receiving chips in block diagrams, FIG. 10*a*, 10*b* synchronizing means for a daisy chain schematically in a block diagram, FIG. 11*a*, 11*b* schematically synchronizing means for a tree-topology, FIG. 12*a*, 12*b* antenna modules having means for synchronizing clock signals, FIG. 13*a*, 13*b* an amplification unit for simultaneously amplifying and converting a digital input signal to an analog output signal;

FIG. 14 a transceiver module comprising a IQ-compensation module, and

FIG. 15-23 different embodiments of the radio equipment based on optical domain.

An active antenna system (AAS) 1 comprises a plurality of antennas 2. The antennas 2 are part of a radio equipment 3. The radio equipment 3 comprises control circuits for controlling the signals which are to be transmitted via the antennas 2 and for controlling the signals which are received by means of the antennas 2. Examples of the radio equipment 3 will be explained below in more detail.

Figure 4:
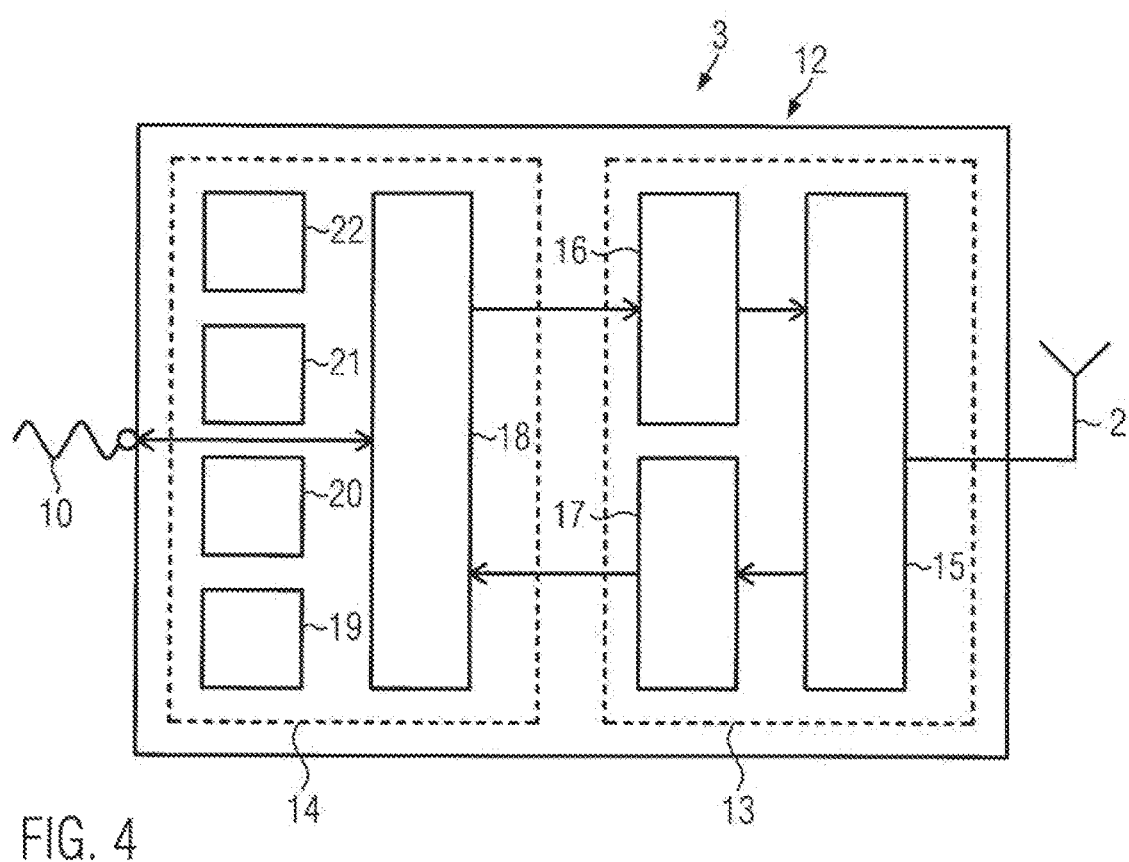
Figure 5:
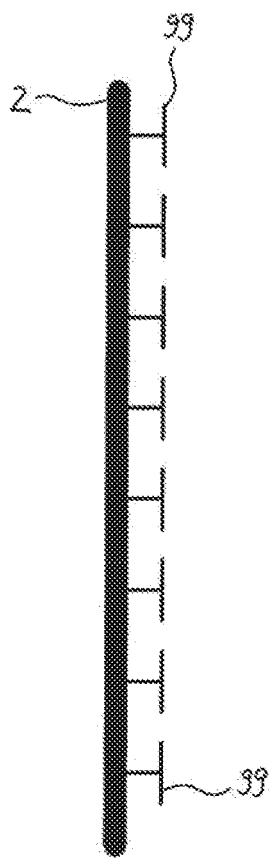

Each antenna 2 is connected to a transceiver module 12 and can consist of one or more radiators 99 (FIGS. 4, 5).

Radiators 99 of one antenna 2 receive substantially the same transmission antenna signal, because there are no active elements between the transceiver and the corresponding radiators 99. It is possible that the radiators 99 receive transmission antenna signals with a slight phase shift due to different length of the connections between the transceiver and the radiators 99.

The radiator(s) 99 of an antenna 2 can be cross polarized. In such a case two independent signals can be transmitted and received via one antenna 2. Such a cross polarized antenna 2 is preferably connected to two transceiver modules 12.

The radio equipment 3 is usually mounted on an antenna tower 4 (FIG. 1).

In the first embodiments of the active antenna system 1 a radio equipment control unit 5 is located distant from the radio equipment 3, wherein the radio equipment 3 and the radio equipment control unit 5 are connected by means of one or more antenna interconnects 6. The radio equipment 3, the radio equipment control unit 5 and the antenna interconnect 6 are typically part of a base station 101 such as a Node B in UMTS (UMTS: Universal Mobile Telecommunications System) or a base transceiver station in GSM (GSM: Global System for Mobile Communications).

Typically the data which are to be transmitted with the antenna interconnect 6 are digital data. Basically it is also possible to transmit analogous modulated data. The data is typically transmitted by means of the CPRI standard (Common Public Radio Interface), which is an interface standard comprising a transmission with the data being inserted into frames as containers. Transmitting the data is also possible by means of any other appropriate standard such as for example OBSAI (Open Base Station Architecture Initiative).

The antenna interconnect 6 comprises preferably a plurality of optical cable, particularly a single-mode or one or more multi-mode glass-fiber cables, as antenna cables 10 for transmitting a plurality of data signals simultaneously. Alternatively each of the antenna cables 10 can be provided as an electrical cable, preferably as a coaxial cable. Preferably, each antenna cable 10 transmits the signals received and/or transmitted by one single transceiver module 12. This provides the possibility to control the signal each transceiver module 12 receives from the radio equipment control unit 5 and to process all the received signals from each transceiver module 12 in the radio equipment control unit 5 together, which is described below in more detail.

On the contrary, in ordinary active antenna systems the received antenna signals are preprocessed and then multiplexed in a C-hub in the radio equipment, as disclosed in EP 2 632 058 A1, US 2012/0128040 A1 and GB 2 440 192 A. Also, the transmitted signals are multiplexed in the radio equipment control unit before being transmitted to the radio equipment. This results in information loss and stresses the transmission capacity of the antenna interconnect between the radio equipment control unit and the radio equipment. Due to the information loss, the radio equipment control unit does not receive all the information which is originally received by the transceiver modules. The limited transmission capacity of the antenna interconnect prohibits high speed transmissions with low latency over the ordinary active antenna system.

It is also possible to embody the antenna interconnect 6 as a radio connect using active antenna systems. The receiver and transmitter can be tracked to each other so that swaying of the tower 4 can be compensated.

Figure 6A:
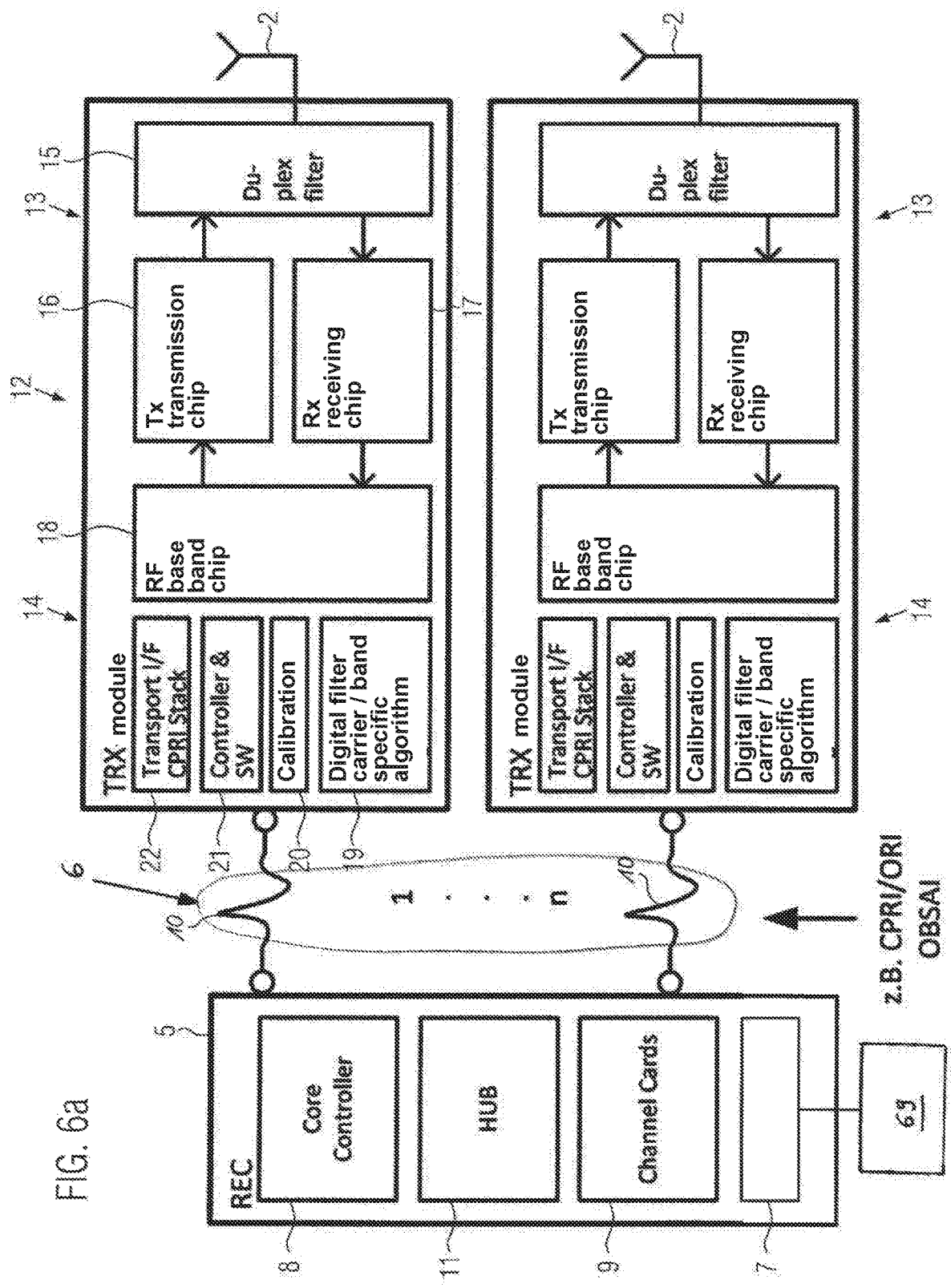

The radio equipment control unit 5 comprises an interface 7 which is connected to a radio network controller (UMTS) or base station controller (GSM) 69 for receiving and transmitting data (FIGS. 1, 6*a*). The data comprises voice data, email data, sms/mms data, video data, music data, control data etc.

The radio network controller/base station controller 69 can be connected to one or more wide area networks 100, such as the internet or a core network of the UMTS. Further, the radio network controller 69 according to the UMTS standard can be connected to other radio network controllers 69.

The radio equipment control unit 5 comprises a core controller 8. The core controller is the main processor which controls the modules of the radio equipment control unit 5. Furthermore, the core controller 8 controls all processes in the radio equipment control unit 5, e.g. distributing the antenna signals to the respective antennas 2.

The radio equipment control unit 5 comprises a plurality of channel cards 9. The channel cards 9 are connected to the interface 7 and are embodied for receiving incoming data from the interface 7 and converting the data into channel signals on a base band frequency and vice versa. The channel cards 9 are connected to the antenna interconnect 6 directly or via a hub 11 and thus to the transceiver modules 12. The channel cards 9 are embodied for transmitting the channel signals on the base band frequency to the transceiver modules 12 and vice versa.

A logical channel signal comprises data of one or more logical channels, wherein a logical channel comprises data of one or more subscribers or communication partners. The channel cards 9 can further be embodied for processing the data, channel signals and/or logical channels, i.e. scrambling, descrambling, extracting the logical channels from and/or multiplexing the logical channels to the channel signals, coding and/or frequency conversion.

Each channel card can serve for 1 to 100 antennas 2. Usually the radio equipment control unit 5 comprises one to twelve channel cards 9 for handling up to 1000 or even more telephone calls simultaneously. The channel cards 9 comprise a plurality of DSPs (digital signal processors).

As described above, preferably for each antenna 2 an individual transceiver module 12 is provided. Each transceiver module 12 comprises a combined transceiver and filter unit 13 and a control RF base band unit 14 (FIG. 4). The transceiver filter unit 13 comprises a duplex filter 15. It is also possible to provide two filter elements one for transmitting and one for receiving antenna signals instead of one duplex filter 15.

The duplex filter 15 is connected to a Tx-transmission chip 16 and a Rx-receiving chip 17. The Tx-transmission chip 16 and the Rx-receiving chip 17 are connected to a RF-base band chip 18.

Basically, the RF-base band chip 18 converts data signals coming from the radio equipment control unit 5 onto a base band frequency. In the RF-base band chip 18 the base band signals are processed, wherein a crest-factor reduction and/or a pre- or postdistortion and/or a frequency conversation and/or another processing step for preparing the base band signals to be converted to a high frequency signal is carried out.

This base band frequency signal is converted to a high frequency signal by means of the Tx-transmission chip 16 which is a heterodyne or homodyne architecture comprising converters, filters, and amplifier. The Rx-receiving chip 17 converts the high frequency antenna signal received from the duplex filter 15 to a base band frequency signal. Thus, the Rx-receiving chip 17 and the Tx-transmission chip 16 are shifting the antenna signals to the base band frequency signal and vice versa.

The Tx-transmission chip 16, the Rx-receiving chip 17 and the duplex filter 15 are elements of the transceiver filter unit 13. The transceiver filter unit is based on high frequency technology which is usually made by means of a CMOS, SiGe or GaAs-chip, wherein typically the Tx-transmission chip 16 is made of GaAs or GaN, the Rx-receiving chip 17 is made of SiGe order CMOS and the control RF-base band unit 14 is made of CMOS.

The control RF-base band unit 14 comprises besides the RF-base band chip 18 several digital filter structures 19, a calibration module 20, a controller 21, and a transport interface 22.

With the digital filters 19 the data signals can be preprocessed for being e.g. decimated, filtered or for converting the sample rate. The calibration module 20 is provided for calibrating the antennas 2 as it is explained below. In a transport interface 22 the incoming or outgoing data are packed or unpacked in and from CPRI containers. Each CPRI container can contain data for or from one, several or all antennas 2 and for one or more logical channels.

The RF-base band chip 18 and the further elements 19-22 can be embodied on a single chip which is e.g. based on silicon technology.

In the first embodiment (FIG. 6a) preferably each of the transceiver modules 12 is connected by means of an antenna cable 10 with the hub 11 being located in the radio equipment control unit 5. The hub 11 is further connected to the channel cards 9 and embodied to transfer the channel signals from the channel cards 9 via the antenna interconnect 6 to the transceiver modules 12 and vice versa by means of the CPRI standard. Further, the hub 11 can be embodied to multiplex and extract the channel signals and/or scramble and descramble the channel signals, which means that the hub 11 comprises partly the functionality the channel cards 9 have as described above.

Each antenna cable 10 is preferably a glass-fiber cable, wherein the data signals are transmitted in one colour or in multiple colors according to the DWDM-standard (Dense Wavelength Division Multiplexing). This provides a high bandwidth for each antenna, so that a huge amount of information can be transmitted between the radio equipment control unit 5 and the transceiver module 12 of the corresponding antenna 2. In case of the antenna cables 10 being glass-fiber cables the hub 11 is embodied to convert electric signals into optical signals and vice versa.

If the antenna cable 10 can is embodied as a multimode glass-fiber cable, then beam splitters (not shown) are provided at the input side of the transceiver modules 12 for directing the predetermined colour to the respective transceiver module 12.

The radio equipment 3 is free of any hub.

Such a design is very flexible, because the transceiver module 12 can be incorporated in any kind of topologies. The design is freely scalable and provides a high redundancy. The radio equipment 3 comprising no hub is simpler than ordinary radio equipments and comprises less components and circuits, so it is more stable. The radio equipment 3 is usually an outdoor antenna which is exposed to all environmental impacts. The more simple design provides a significantly better reliability. And since each antenna signal of each antenna 2 and each transceiver module 12 is transmitted via the respective antenna cable 10, controlling the antenna signal in transmission direction in the radio equipment control unit 5 is provided as well as further intelligent processing the received antenna signals as a whole in the radio equipment control unit 5.

Figure 2:
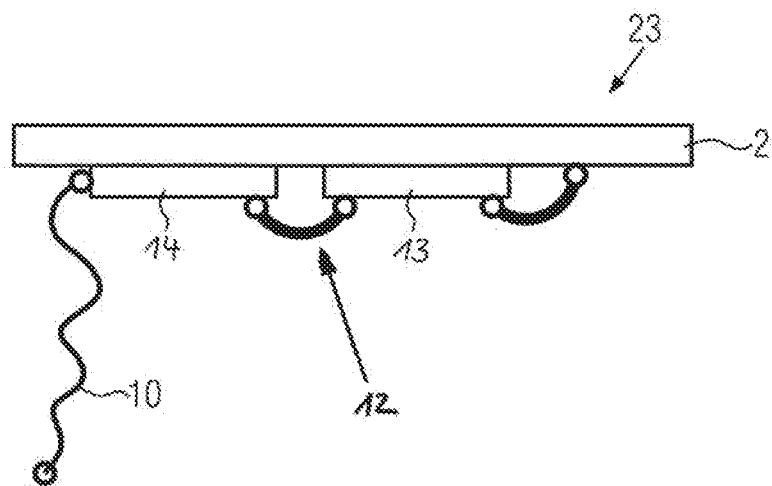
Figure 3:
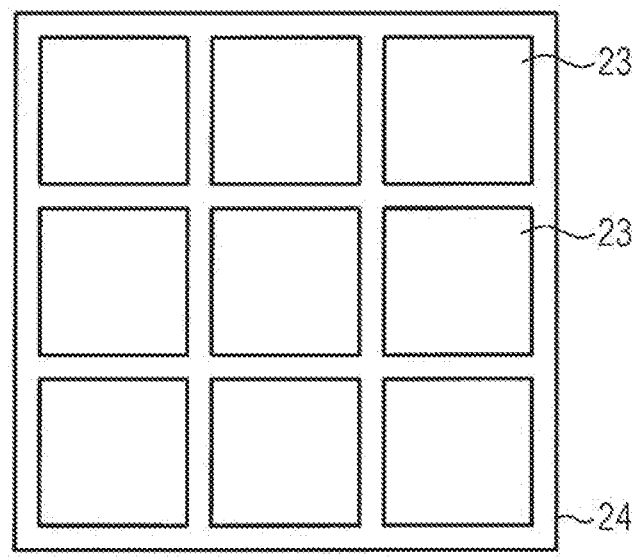

Each antenna 2, transceiver module 12 and control RF-base band unit 14 form an antenna module 23 (FIG. 2).

A plurality of antenna modules 23 form an antenna array 24 (FIG. 3). In an antenna array 24 the distance between neighbouring antennas 2 or radiators 99, respectively, is typically about $0.5\lambda$ to $2\lambda$. It is also possible that the distance between neighbouring antennas 2 or radiators 99, respectively, in the edge region of the antenna array is larger than $2\lambda$ for increasing the aperture of the antenna array and for suppressing side lobes.

As explained below the plurality of antenna modules 23 can be controlled in a beamforming mode so that the emitted beams are forming several narrow lobes.

Beamforming signals for several antennas 2 or radiators 99, respectively, differ mostly only in the phase shift, wherein the data content is usually substantially identical. Such kind of content data can be transmitted once from the radio equipment control unit 5 to the radio equipment 3, wherein the phase shifts and/or amplitude shifts for the individual antennas 2 are separately transmitted. Beamforming can be also carried out for received antenna signals, wherein it is appropriate that in the radio equipment control unit 5 a beamforming vector is calculated and this beamforming vector is transmitted to the radio equipment 3 for carrying out the beamforming. For calculating the beamforming vector it is appropriate to have the encoded and/or rescrambled content information which is usually only in the radio equipment control unit 5 available.

Figure 6B:
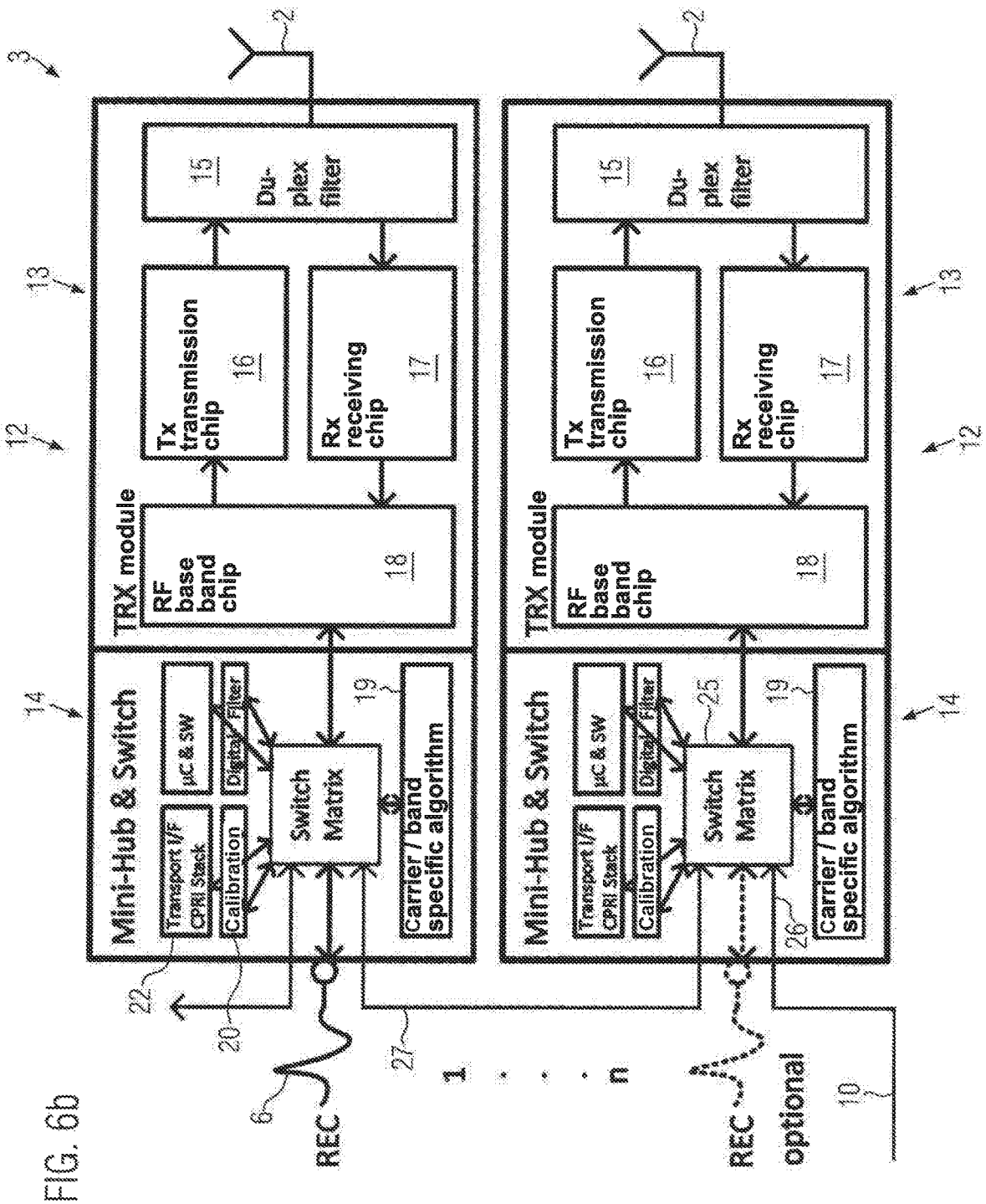

FIG. 6b shows a radio equipment of a second embodiment of the present invention. This radio equipment 3 is part of an active antenna system 1 as described above. The same parts are designated with the same reference signs and are not again explained in detail.

This radio equipment 3 comprises several antennas 2 and transceiver modules 12. Each transceiver module 12 comprises a transceiver filter unit 13 and a control RF-base band unit 14. The transceiver filter unit 13 is identical to the one of the above described embodiment. The control RF-base band unit 14 is similar to the one of the above described embodiment and comprises also an RF-base band chip 18, a digital filter 19, a calibration module 20, a controller 21, and a transport interface 22. Additionally the control RF-base band unit 14 comprises a switch matrix 25. The switch matrix 25 can be connected to an antenna cable 10 of the antenna interconnect 6. Additionally, the switch matrix 25 is connected to two or more terminals 26. The terminals 26 of two different transceiver modules 12 can be connected by intermediate cables 27, wherein the intermediate cables 27 extend between two control RF-base band units 14. Thus, two or more transceiver modules 12 are connected by these intermediate cables 27, wherein (at least) one (or more) transceiver modules 12 are connected by means of an antenna cable 10 with the radio equipment control unit 5. This one or more antenna cables 10 are preferably optical glass-fiber cables, wherein the intermediate cables 27 are preferably electric cables. These intermediate cables 27 and the at least one antenna interconnect 6 form a data bus passing all control RF-base band units 14.

The switch matrix 25 is further connected to the elements 18-22.

The switch matrix 25 can be used in different arrangements. For example, all antenna modules 23 can be connected by an individual antenna cable 10 with the radio equipment control unit 5 and additionally the data bus can be provided connecting the radio equipment control unit 5 and all antenna modules 23. By means of the data bus a broadcast message to all antenna modules 23 can be easily sent. This is particularly advantageous for a booting and configuration process.

Furthermore, if a specific antenna cable 10 is blocked by a strong data traffic or by a defect such as a broken connection or failing electronic devices, then further information can be transmitted via a different antenna cable 10 to another antenna module 23 from which the information is transmitted via the data bus to the original antenna module 23. Thus, it is possible to re-direct traffic in case of a high data load or any other blockade of an antenna cable 10 of the antenna interconnect 6.

Furthermore, flexibility of the antenna architecture is achieved in switching antenna modules 23 together to serve different requirements. For example, it is possible to reduce power consumption of the radio equipment 3 by using only a subset of the antenna modules 23 for transmission to a communication partner 63 (FIG. 1). Another example is using different subsets of the antenna modules 23 to communicate with different communication partners 63, whereby each of the subsets is exclusively provided for one of the communication partners 63. Again this reduces power consumption but may also serve other purposes like secure transmissions. These examples are provided that the consumed power is sufficient for receiving and transmitting to the communication partner(s) 63.

Such a communication partner 63 is typically a mobile device, such as a mobile phone, smart phone, computer, tablet, etc. comprising a communication unit. Such a communication unit has one, two or even more antennas, a transceiver for receiving and transmitting radio signals via the antenna(s) and a digital processor unit for processing the antenna signals.

In this case of using switch matrices 25 the overall data traffic between the radio equipment 3 and the radio equipment control unit 5 can be handled by a lower number of antenna cables 10 as installed antenna modules 23 so that only a limited number of antenna modules 23 are connected by individual antenna cables 10 with the radio equipment control unit 5 and the other antenna modules 23 are connected only via the data bus to other antenna modules 23 and to the radio equipment control unit 5. Such a switch matrix allows an individual configuration of the antenna modules 23 which can be adapted to the actually used method of transmitting and receiving data signals via the radio equipment 3.

In this embodiment each antenna signal of each antenna 2 and each transceiver module 12 is transmitted via the respective antenna cable 10 or another antenna cable 10 connected to a neighboring switch matrix 25. Thus, similar to the embodiment described above with the hub 11 incorporated into the radio equipment control unit 5, controlling the antenna signal of each transceiver module 12 in transmission direction in the radio equipment control unit 5 is provided as well as further intelligent processing the received antenna signals as a whole in the radio equipment control unit 5.

Basically, in this embodiment the hub 11 in the radio equipment control unit 5 can be integrated into the channel cards 9. Thus, the transceiver modules 12 which are connected to an antenna cable 10, are directly connected to the channel cards 9. In case of antenna cables 10 being embodied as optical fibres, the conversion from electrical to optical signals and vice versa can be performed by simple converters (not shown).

The above-described embodiments can also be provided in combination in an active antenna system. In such a combination the above-described advantages of the invention are achieved, namely the high speed transfer with low latency over the antenna interconnect 6, providing all the received antenna signals to the radio equipment control unit 5, full control of the transmitted antenna signals by the radio equipment control unit 5, flexible configuration of the antenna architecture with low power consumption by switching different antenna modules 23 together as needed, and fault tolerance by redundant provided antenna cables 10.

According to a further embodiment of the active antenna system the radio equipment 3 and the radio equipment control unit 5 are forming a single unit (not shown). In this unit the radio equipment 3 is directly connected to the antenna modules 23. The radio equipment does not need the transport interface. The antenna modules 23 are identical or similar to the embodiments shown in FIGS. 6a and 6b. A direct connection between the radio equipment 3 and the antenna modules 23 means that these elements are connected by electrical conductor paths. Due to the close arrangement of the radio equipment 3 and the antenna modules 23 it is possible to provide substantially any number of conductor paths between the radio equipment 3 and the antenna modules 23. These conductor paths can be embodied as printed circuits on a common printed circuit board of radio equipment 3 and the antenna modules 23. These connector paths can be also short electrical cables. It is also possible to embody the radio equipment 3 and the control RF base band unit 14 on a single chip. There is no need to transform the electrical signals into optical signals and to transmit them via a low number of optical cables.

In ordinary active antenna systems the data rate between the radio equipment 3 and the radio equipment control unit 5 is limited to about 10 GB/s. The smaller the distance between the radio equipment 3 and the radio equipment control unit 5 is, the easier it is to increase the data rate. Ordinary active antenna systems need an average power of about 10 W for each antenna module just for transmitting the data signals between the radio equipment 3 and the radio equipment control unit 5. Thus, the transmission of the data between the radio equipment 3 and the radio equipment control unit 5 form a significant power load. The closer the distance between the radio equipment 3 and the radio equipment control unit 5 is, the less power is needed.

It is obvious to a person skilled in the art that with the present invention power consumption is decreased and transmission rates between the radio equipment 3 and the radio equipment control unit 5 are increased compared to ordinary active antenna systems, as described above.

The above described active antenna systems can be basically used in a MIMO mode (Multiple-in-Multiple-Out) or in a beam forming mode. In the MIMO mode each antenna 2 (or group of antennas 2) is sending an antenna signal which is physically independent of the antenna signals of the other antennas 2 of the antenna array 24. Physically independent means that the antenna signals are not physically linked but they can be linked by the data content. E.g. if several antennas 2 are sending simultaneously the identical antenna signal to achieve a high intensity then these antenna signals are not physically linked. A certain amount of information can also be distributed in different sections, wherein the different sections of information are sent by means of different antenna signals. The information contained in the antenna signals is linked to each other but the individual antenna signals are physically independent of each other.

In the beam forming mode the antenna signals of several antennas 2 are physically linked with each other so that the beam has a certain form. This beam forming is achieved by emitting substantially identical antenna signals with different antennas 2, wherein the antenna signals have a certain phase delay to each other and/or a certain amplitude relationship, so that by constructive and destructive interference a certain beam is formed.

In the beam forming mode these antenna signals are physically linked to each other by the phase difference and/or the amplitude relationship.

The active antenna systems can also be used in a combined MIMO mode and beam forming mode in that several groups of antennas 2 are used for emitting certain beams and/or individual antennas 2 are used simultaneously for emitting an independent antenna signal. It is also possible to combine MIMO with beamforming, wherein certain MIMO signals are emitted via several antennas 2 and the signals of the several antennas 2 form a beamforming signal.

Figure 7:
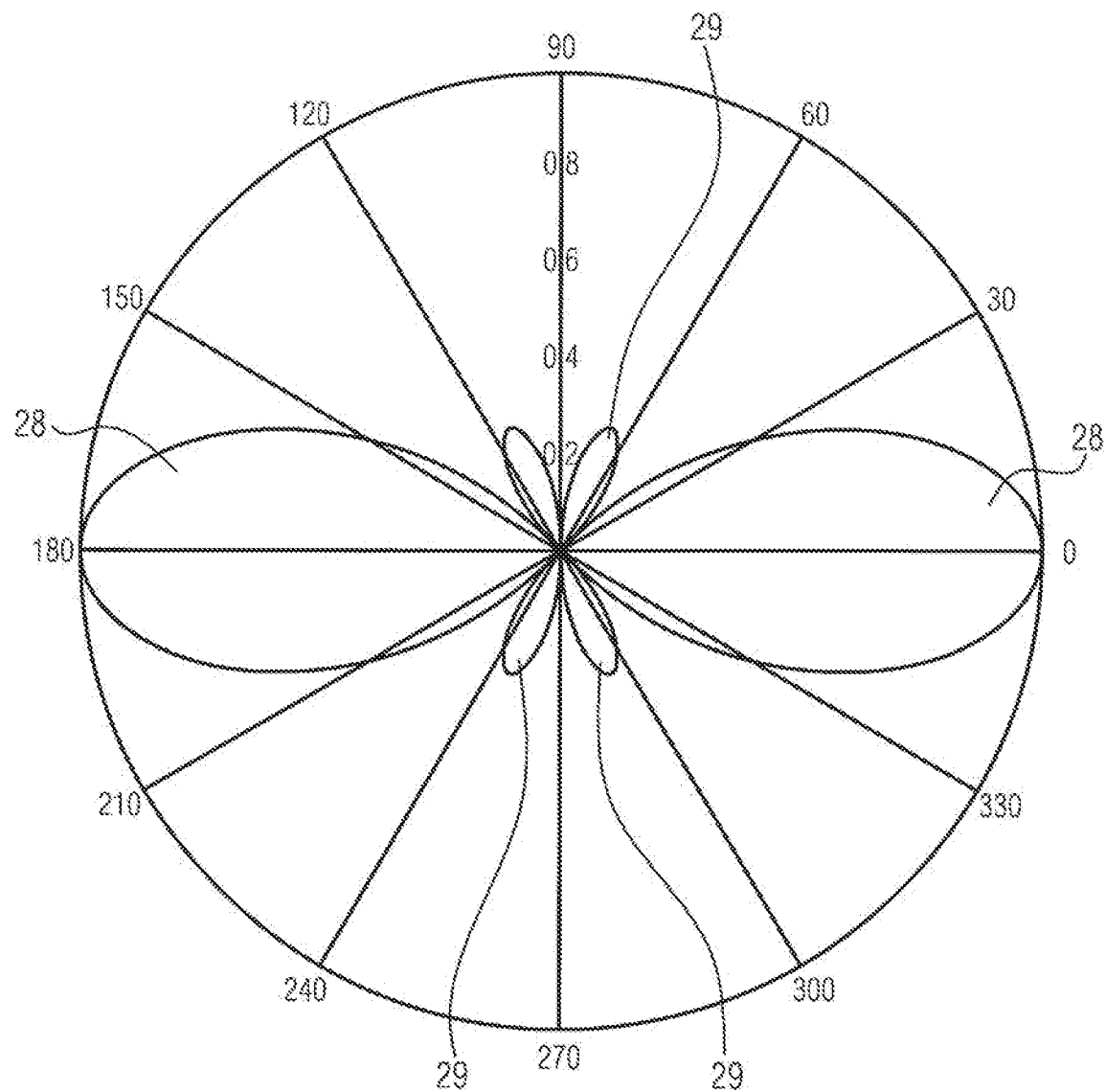

Avery simplified static simulation of n emitting antennas 2 provides a two-dimensional normalized relative intensity of the electric field of:

$$E_{rel} = \left| \frac{\sin\left[n\left(\frac{\pi*d*\sin\phi}{\lambda} - \frac{\alpha}{2}\right)\right]}{n*\sin\left[\frac{\pi*d*\sin\phi}{\lambda} - \frac{\alpha}{2}\right]} \right|, \quad (1)$$

wherein n is a number of the antennas 2, d is the distance of the antennas 2 in λ, φ is the angle with respect to the main emitting axis and a is the phase difference between neighbouring antennas 2 assuming a linear array with equidistant antennas 2. FIG. 7 shows a diagram of the electric field, with two main lobes 28 and four side lobes 29. For calculating the intensity of the electrical field in the far field (>10λ) in the direction of emission φ for two isotropic antennas 2, the following formulas can be used:

$$\Psi = d_r * \cos\phi + \delta \quad (2)$$

$$E = E_0 \left( e^{j*\frac{\Psi}{2}} + e^{-j*\frac{\Psi}{2}} \right) \quad (3)$$

$$E = E_0 \frac{e^{j*n*\frac{\Psi}{2}}}{e^{j*\frac{\Psi}{2}}} \left( \frac{e^{j*n*\frac{\Psi}{2}} + e^{-j*n*\frac{\Psi}{2}}}{e^{j*\frac{\Psi}{2}} - e^{j*\frac{\Psi}{2}}} \right) \quad (4)$$

wherein ψ is the phase difference, $d_r$ is the distance of adjacent radiators 99 in radians ($d_r = 2\pi d/\lambda$), ψ is the direction of emission and δ is the linear phase shift of adjacent radiators 99. These formulas form the basis for calculating the phase differences and the amplitudes for a beam forming. However, mostly empirical weighting components have to be considered for each antenna. The beam forming is calculated then by a numerical approximation, wherein for each communication partner to which a beam shall be directed, a separate calculation is needed. These calculations are carried out in the channel cards 9 of the radio equipment control unit 5.

The beam forming can be a two-dimensional beam forming, wherein the beam is focused only in a horizontal plane. It is also possible to carry out a three dimensional beam forming, when the beam is focused both in the horizontal and in the vertical plane.

Preferably, the calculation of the phase differences and the amplitudes are carried out in the base band. The thus calculated base band signal can directly be shifted into a radio frequency signal. As the mixing process is a multiplication with $e^{j\omega\tau}$, the phase and amplitude information is also provided in the radio frequency signal. Preferably the spectrum of all channels is completely calculated in the base band.

Alternatively it is also possible to calculate the phase differences in the radio frequency signal. However, this requires analog phase shifter. PIN-diodes together with delay lines can be used as analog phase shifters.

The MIMO mode and the beam forming mode are only relevant with respect to emitting antenna signals. Antenna signals of multiple sources are super-imposed so that each antenna 2 receives the signals of different signal sources. The received antenna signals are digitized by means of an analog-to digital converter (ADC) of the RF-base band module 18 and are transformed to the base band. The base band data are transmitted to the radio equipment control unit 5. In the radio equipment control unit 5 the base band data are decoded. The decoded digital data can be discriminated e.g. with respect to the source. The signals of a certain source received by different antennas 2 can be further investigated. Particularly, it is possible to carry out a beam selection, according to which it is determined from which direction the corresponding signals are received. Such a beam selection can be done by adding or multiplying the signals, particularly if one of the signals is phase-shifted. For example, phase-shifting one signal about a certain amount and adding it to a not shifted signal received by a different antenna 2 can result in a destructive interference with no or a very small signal level. From this phase difference the receiving angle can be deduced. For scanning a certain range two signals of neighbouring antennas 2 are stepwise phase shifted to each other by incremental steps, wherein for each step the sum or difference of the two signals is calculated. The phase at which the sum or difference provides a maximum or minimum is determined. From this phase the direction of the signal (DoA: Direction of Arrival) can be calculated.

The base band data are sent in data containers via the antenna interconnect 6 from the control RF-base band unit 14 to the radio equipment control unit 5. Before putting the base band data into the containers, the amount of base band data is reduced by a lossless data compression and/or a lossy data reduction process. A suitable lossless data compression is e.g. the Lempel/ZiV LZ 77 algorithm which have a significant data reduction because of the high similarity of the received individual antenna signals. In an lossy compression however, not sensible, relevant, redundant or similar information, respectively, or disturbing information can be eliminated. Disturbing information is e.g. noise or not used channels. As usually with involvement of the radio equipment control unit 5 the number of users, the activity and the transmitting/receiving situation is known, a plurality of data can be eliminated or deleted, wherein the useful data or information is maintained.

This kind of data compression is particularly efficient in combination with an AAS having a distributed architecture of the radio equipment 3, which means that to each antenna 2 an individual transceiver module 12 is assigned. Thereby, the digital signals exchanged with antenna modules 23 are very similar so that the compression is very efficient.

The sensitivity of the whole system can be increased if the data of the individual antennas 2 are super-imposed. Such a super position can be carried out by adding of data received by different antennas 2. As the data of the different antennas 2 are correlated to each other but not the noise, the signal to noise-ratio is increased.

Data signals which are transmitted from the radio equipment control unit 5 to the antenna modules 23 consist usually of an information which is to be transmitted to the recipient or communication partner 63, which is called message data in the following, and the amplitude/phase information. The message data is identical for all antenna modules 23 in the beam forming mode. The data signals differ with respect to the phase and/or amplitude information. Therefore, it is appropriate to send once the message data and to send separately from the message data the amplitude and/or phase information for the several antenna modules 23. The message data are e.g. distributed by the data network connecting the antenna modules 23. This results in a significant reduction of the data amount which has to be transmitted via the antenna interconnect 6.

A further possibility to reduce the data amount is to predict the trajectory of a communication partner 63 and to calculate the corresponding phase shifts and/or amplitude shifts for directing a radio signal by means of beamforming to the communication partner 63. The calculation of the phase shifts and/or amplitude shifts can be carried out in the radio equipment 3 so that the message data have to be transmitted only once from the radio equipment control unit 5 to the radio equipment 3. In certain time intervals the accuracy of the prediction is checked and if necessary corrected.

This method is particularly efficient if the communication partner 63 is a mobile phone installed in a driven car which moves usually with a rather constant speed and direction. The direction is usually known by the coordinates of the street.

The reduction of the data amount which is to be transmitted between the radio equipment 3 and the radio equipment control unit 5 improves the quality of the whole system significantly, because with the same amount of data as transmitted between the radio equipment 3 and the radio equipment control unit 5 in the ordinary active antenna systems, a much higher quality of beam forming or beam selection is possible and much more complex antenna signals are possible. The similarity of the data of different channels allow a reduction to about 30-40% of the original data amount without reducing the quality of the data.

Figure 8A:
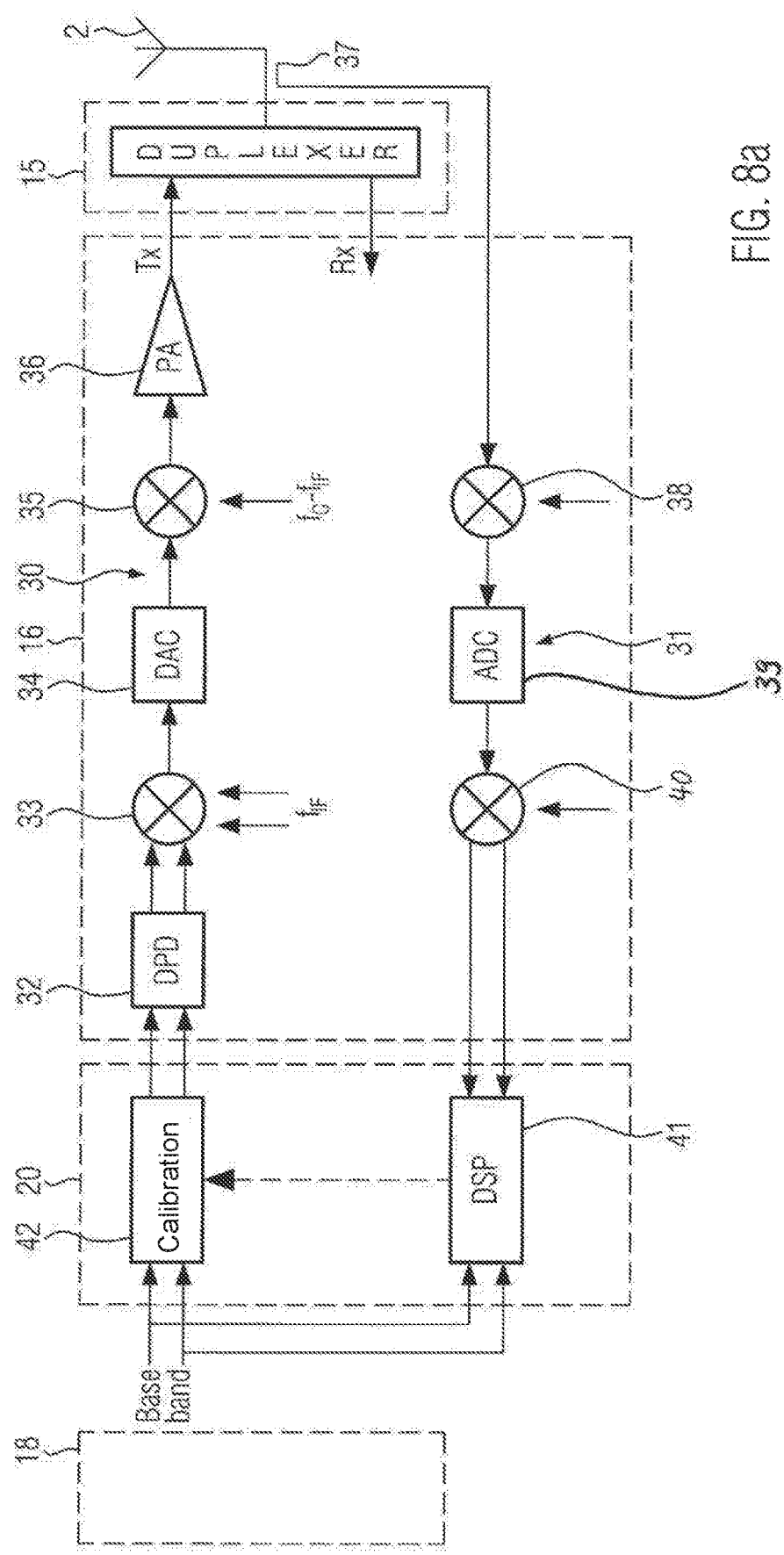

According to a further embodiment of the present invention the transceiver module 12 comprises means for calibrating each transceiver module 12 separately with respect to phase and amplitude of the transmitted antenna signals. The Tx-transmission chip 16 comprises a transmission path 30 and a reference path 31 (FIG. 8a). The transmission path 30 comprises a digital predistortion unit 32 (DPD), one or more intermediate frequency-up converter ($f_{IF}$) 33, a digital-to-analog converter 34 (DAC), a channel frequency-up converter 35 and a power amplifier 36 (PA). The digital predistortion unit 32 reduces any non-linearity of the power amplifier 36. The intermediate frequency-up converter ($f_{IF}$) 33 can be a sample rate converter or digital upconverter (DUC) for converting the digital base band signal on the base band frequency onto a digital intermediary frequency. Then the channel frequency-up converter 35 converts the analog intermediary frequency signal onto the carrier signal on the carrier frequency.

The reference path 31 comprises an external coupling element 37 which is coupled to the connection between the duplex filter 15 and the antenna 2 for decoupling or branching-off an external calibration feedback signal from the channel signal which is transmitted from the duplex filter 15 to the antenna 2. The external coupling element 37 is e.g. a Lange coupler or a directional coupler. Further, the reference path 31 comprises an intermediate frequency-down converter 38, an analog-to-digital converter 39 (ADC) and a base band (digital) down converter (DDC) 40. The analog external calibration feedback signal having the carrier frequency or samples of frequencies in the broadband is converted onto an intermediate frequency by the intermediate frequency-down converter 38. Then the base band down converter 40 converts the digital intermediate frequency signal onto the base band frequency. The frequencies of the external calibration signal are preferably in gaps between the regularly used frequencies for not disturbing the data transmission. Thus, the reference path 31 provides an external calibration feedback signal branched-off from the channel signal supplied to the antenna 2, wherein the external calibration feedback signal is down-converted to the base band frequency.

The calibration module 20 comprises a digital signal processor 41 (DSP) and a calibration unit 42. The digital signal processor 41 is connected to the reference path 31 for receiving the down-converted external calibration feedback signal and is also connected to the RF-base band chip 18 for receiving the base band signal. The digital signal processor 41 compares the base band signal and the external calibration feedback signal and provides a comparison information to the calibration unit 42. The calibration unit 42 is also connected with the RF-base band chip 18 for receiving the base band signal and is connected with the Tx-transmission chip 16 for supplying a modified baseband signal to the Tx-transmission chip 16. The calibration unit 42 modifies the base band signal according to the comparison information so that the differences between the base band signal and the down-converted external calibration feedback signal are minimized.

Figure 8B:
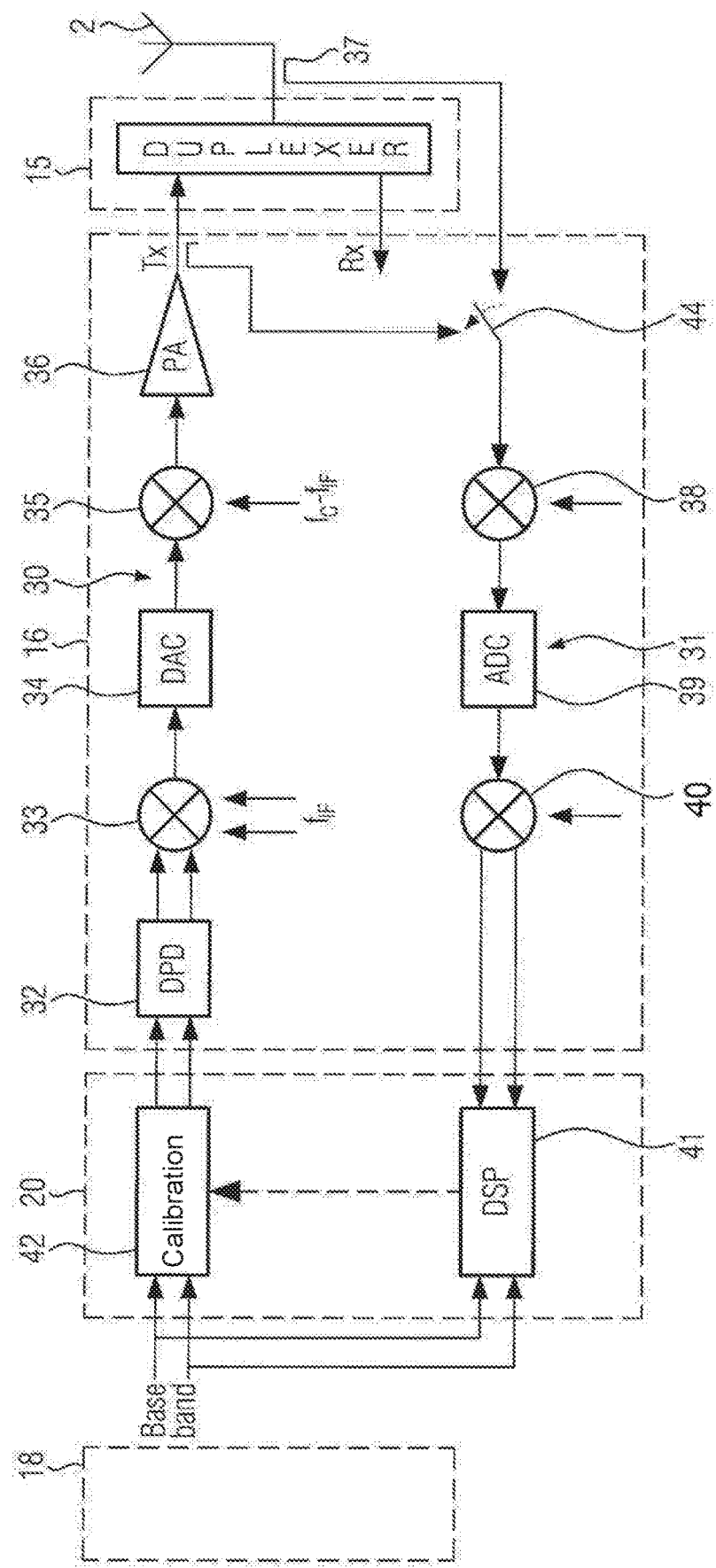

In a preferred embodiment of the present invention an internal coupling element 43 is additionally provided at the transmission path 30 between the channel frequency-up converter 35 and the duplex filter 15 for decoupling or branching-off an internal calibration feedback signal (FIG. 8b). The internal coupling element 43 is connected to a switch 44 provided in the reference path 31, which can connect the reference path 31 either with the internal coupling element 43 for receiving the internal calibration feedback signal or with the external coupling element 37 for receiving the external calibration feedback signal. The duplex filter 15 has a certain impact on the channel signal which depends on different parameters, particularly the temperature. By carrying out a calibration on the basis of the internal calibration feedback signal and the external calibration feedback signal, this impact of the duplex filter 15 can be eliminated. The internal calibration feedback signal is particularly used for adjusting the digital predistortion unit 32. This can be achieved by analyzing the harmonics of the channel signal which is output by the power amplifier 36. The duplex filter 15 lets only pass the signals in the channel band, so that the harmonics are eliminated. Thus, this information is not available in the external calibration feedback signal. Such a calibration means comprising an internal calibration feedback signal and an external calibration feedback signal allows to compensate for fluctuations of low cost duplex filters 15 which are preferred in an active antenna system, because each antenna module 23 needs such a duplex filter 15.

In the above embodiment the calibration feedback signals are down-converted by means of an analog intermediate frequency down converter 38. This intermediate frequency down converter 38 can be provided as a mixer. Instead of such a mixer also other non-linear elements such as a diode or an analog-to-digital converter with a low resolution and low scanning frequency (Nyquist-converter) may be used instead of the intermediate frequency down mixer 38.

Figure 9A:
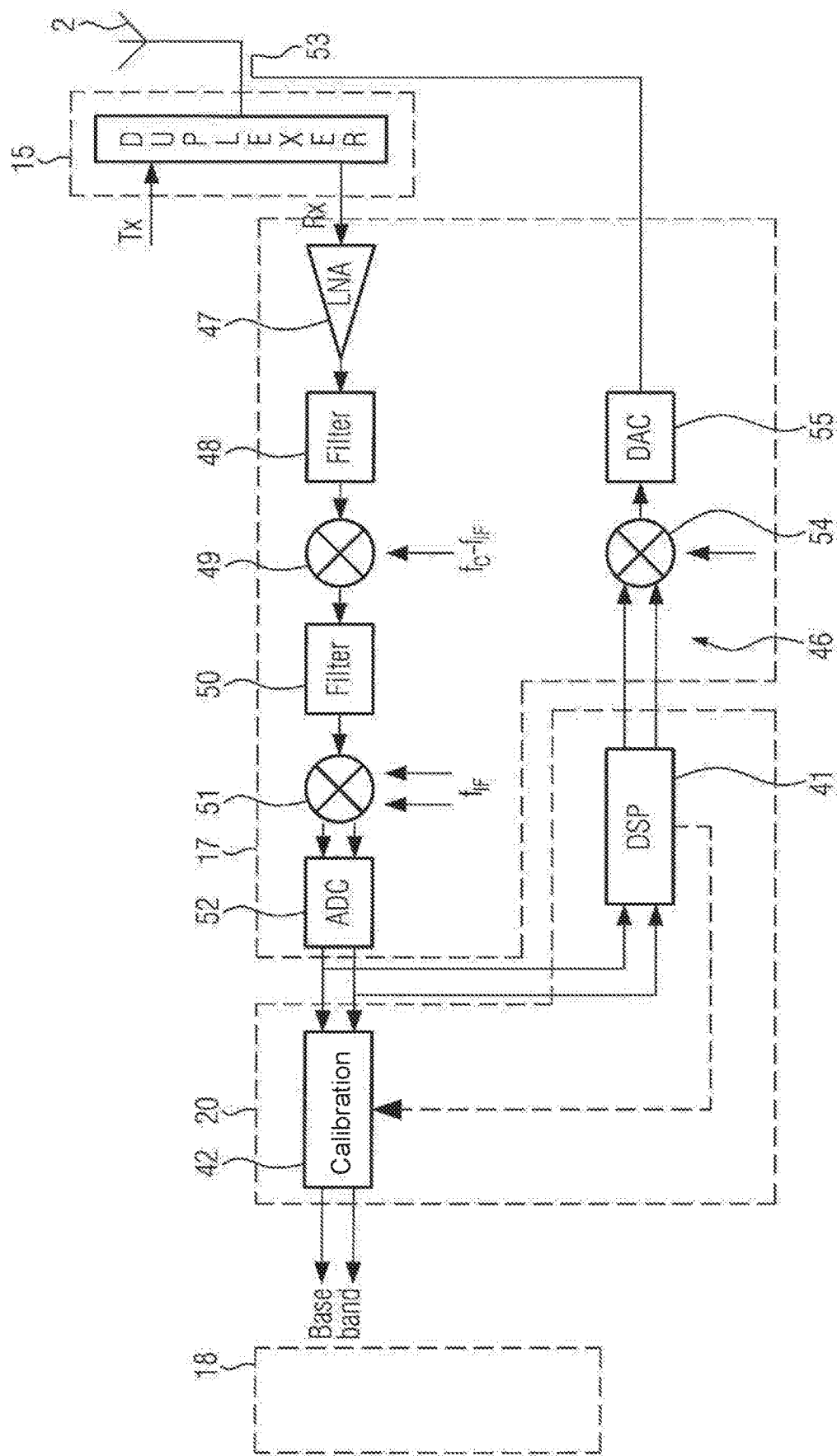
Figure 10A:
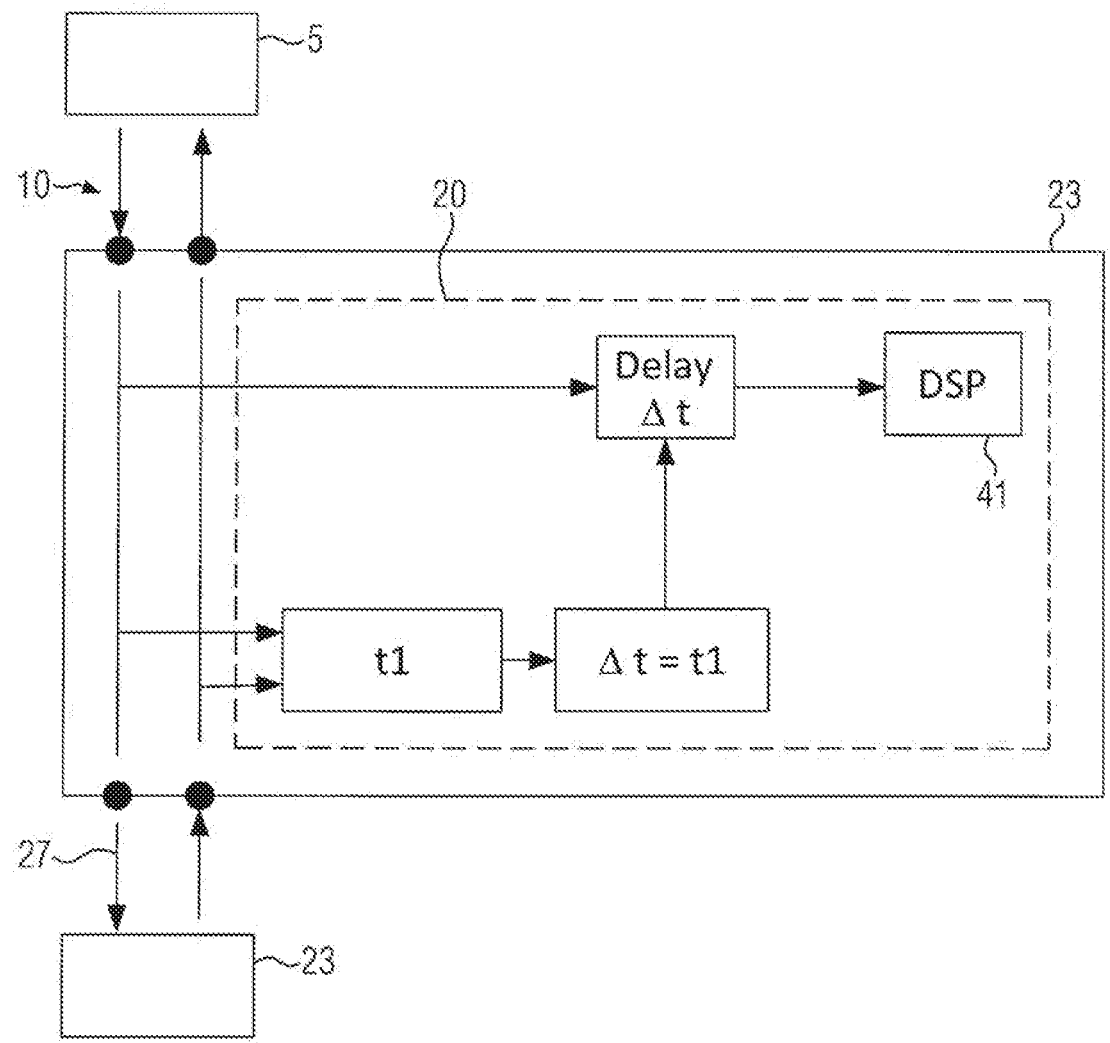

According to a further embodiment of the present invention the transceiver module 12 comprises also means for calibrating each transceiver module 12 separately with respect to phase and amplitude of the received antenna signals. The transceiver module 12 comprises a receiving path 45 and a reference path 46 (FIG. 9*a*). The receiving path 45 extends from the duplex filter 15 to the RF-base band chip 18 via the Rx-receiving chip 17 and the calibration module 20. The Rx-receiving chip 17 comprises a receiving path 45, a low noise amplifier 47, a band filter 48, an intermediate frequency-down converter 49, an intermediate frequency band or low pass filter 50, a base band down converter 51 and an analog-to-digital converter 52. These elements are provided for amplifying the received antenna signal and converting it down to the base band frequency. Any other known means for receiving and down-converting a high frequency signal to a base band signal can also be used (e.g. direct conversion). The output of the Rx-receiving chip 17 is connected with the calibration unit 42 of the calibration module 20 and with the digital signal processor 41. The reference path 46 extends from the digital signal processor 41 via the Rx-receiving chip 17 to an external coupling element 53 which is provided at the connection between the duplex filter 15 and the antenna 2 for coupling a reference injection signal on the carrier frequency into the connection between the duplex filter 15 and the antenna 2. The reference injection signal is generated in the digital signal processor 41 of the calibration module 20. The Rx-receiving chip 17 comprises a reference path 46 having a channel frequency-up converter 54 and a digital-to-analog converter 55 (DAC).

The digital signal processor 41 generates the reference injection signal as a digital signal in the base band frequency. This reference injection signal is converted-up to the channel frequency (receiving band frequency) or carrier frequency, respectively, by the channel frequency up converter 54 and converted into an analog signal by the digital-to-analog converter 55. The analog reference injection signal on the carrier frequency is coupled by means of the external coupling element 53 to the input side of the duplex filter 15. The reference injection signal is then amplified, filtered and down-converted to the base band frequency by the elements along the receiving path 45. The received reference injection signal, now on the base band, is then forwarded to the digital signal processor 41 where it is compared to the original reference injection signal generated by the digital signal processor 41. The digital signal processor 41 provides comparison information to the calibration unit 42 which modifies the base band signal received from the RF-base band chip 18 so that the differences between the modified received signal and the generated reference injection signal are minimized.

Figure 9B:
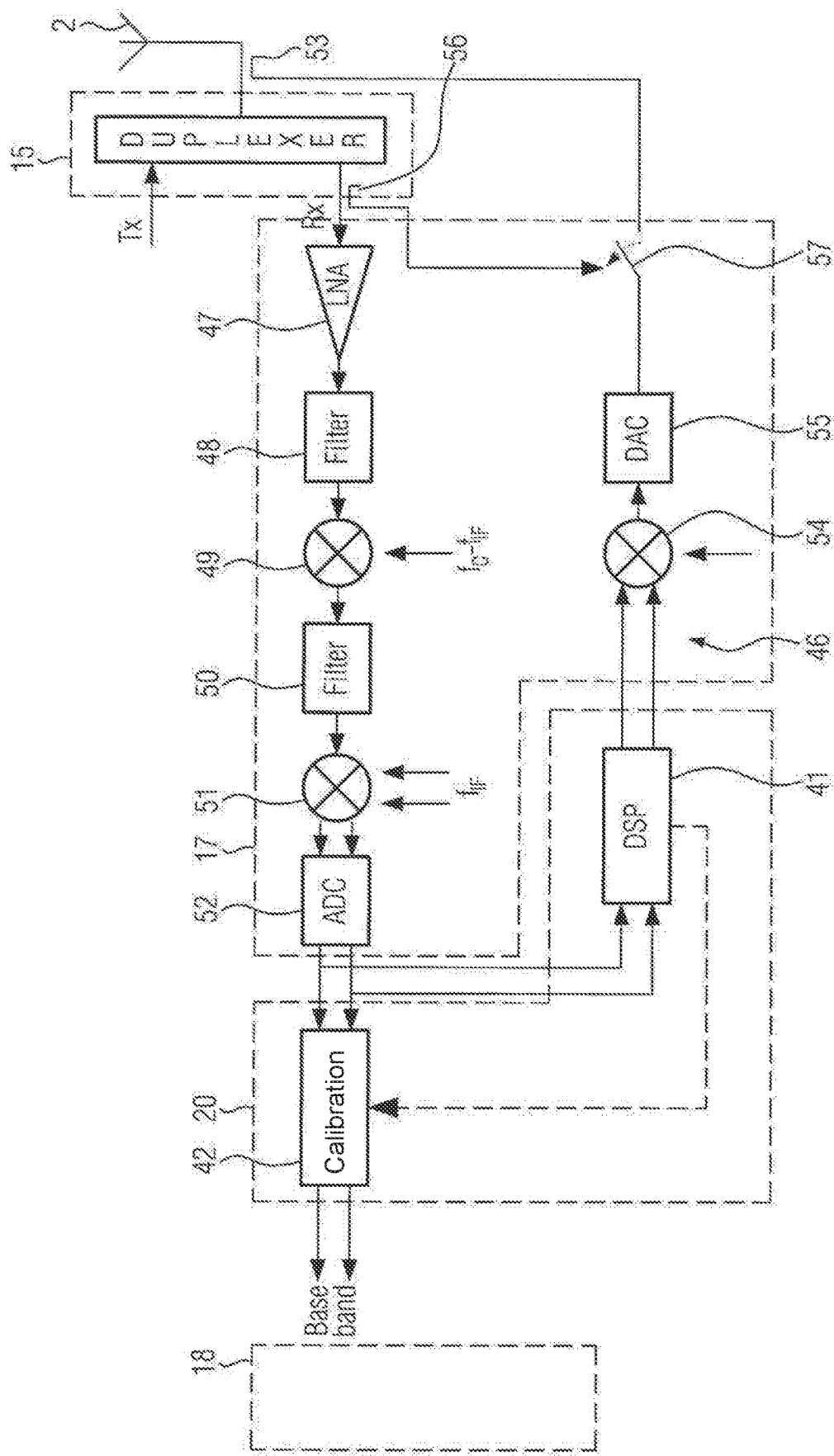

In a preferred embodiment of the present invention there is an additional internal coupling element 56 in the receiving path 45 between the duplex filter 15 and the low noise amplifier 47 (FIG. 9*b*). This internal coupling element 56 is connected by a switch 57 to the reference path 46. With the switch 57 the reference injection signal can be either applied to the internal coupling element 56 or to the external coupling element 53. Thus, the influence of the duplex filter 15 can be eliminated by calibrating the receiving path 45 of the transceiver module 12 by the reference injection signal applied to the internal coupling element 56 and by the reference injection signal applied to the external coupling element 53.

By the above described embodiments of the present invention it is obvious that each antenna module 23 can be calibrated in itself without the need to transfer any calibration signal to the outside of the respective antenna module 23. This provides for a more exact calibration than in ordinary active antenna systems since calibration connections to the outside comprise delays and can be exposed to disturbances.

The antenna modules 23 receive via the antenna interconnect 6 or the intermediate cable 27 data which are to be transmitted. The antenna interconnect 6 and the connections via the intermediate cables 27 are preferably a serial digital bus so that the antenna modules 23 can be connected in any kind of topology such as daisy chain, ring and tree topology and combinations thereof. At least one antenna module 23 is connected with the radio equipment control unit 5. The distance(s) between one or more antenna modules 23 and the radio equipment control unit 5 and the distances between connected antenna modules 23 can differ, so that the several antenna modules 23 receive the data with different delays and phases. The calibration module 20 of the control RF-base band unit 14 is embodied for delaying the output of the data according predetermined delaying coefficients so that all antenna modules 23 are synchronized. The delaying coefficients are calculated in the DSPs 41.

The antenna modules 23 can be configured in a daisy-chain (FIG. 10*a*, 10*b*) wherein the radio equipment control unit 5 forms a data source which is sending to the several antenna modules 23 data signals via an antenna cable 10 of the antenna interconnect 6 and the intermediate cables 27. FIG. 10*a* shows only two antenna modules 23, but any number of antenna modules 23 can be arranged in the daisy-chain. The data signals are sent by the radio equipment control unit 5 via the antenna cable 10 and received by the first antenna module 23 in the daisy-chain which is directly connected to the radio equipment control unit 5, that is the antenna module 23 nearest to the radio equipment control unit 5. Then the data signals travel through the daisy-chained antenna modules 23 via the intermediate cables 27 to the antenna module 23 which is most distant from the radio equipment control unit 5.

This most distant antenna module 23 is embodied so that a predetermined synchronization signal, which is transmitted from the radio equipment control unit 5 via the antenna cable 10 and the intermediate cables 27 to the antenna modules 23, is returned from the most distant antenna module 23 via the same intermediate cables 27 and the same antenna cable 10 to the radio equipment control unit 5. Since the synchronization signal travels from the radio equipment control unit 5 through the antenna cable 10 and all intermediate cables 27 in the daisy-chain to the most distant antenna module 23 (forward direction) and then the way back to the radio equipment control unit 5 again through the same intermediate cables 27 and the antenna cable 10 (reverse direction), the time interval between transmitting the synchronization signal from and receiving it at the radio equipment control unit 5 results from twice the summarized delay times of the antenna cable 10, of all intermediate cables 27 and of all antenna modules 23 in the daisy-chain. Similarly, this calculation also applies to each specific antenna module 23 in the daisy-chain, but the time interval between receiving the synchronization signal in forward direction and receiving the same synchronization signal in reverse direction results from twice the summarized delay times of all intermediate cables 27 connecting the respective antenna module 23 with its successive antenna modules 23 in forward direction and of the successive antenna modules 23.

The calibration modules 20 are detecting the time when the synchronization signal passes the respective antenna module 23 on the way from the radio equipment control unit 5 to the most distant antenna module 23 and on its way back to the radio equipment control unit 5. The difference of these two time data is calculated and divided in half. The resulting time value form the delay time $\Delta t$.

Figure 10B:
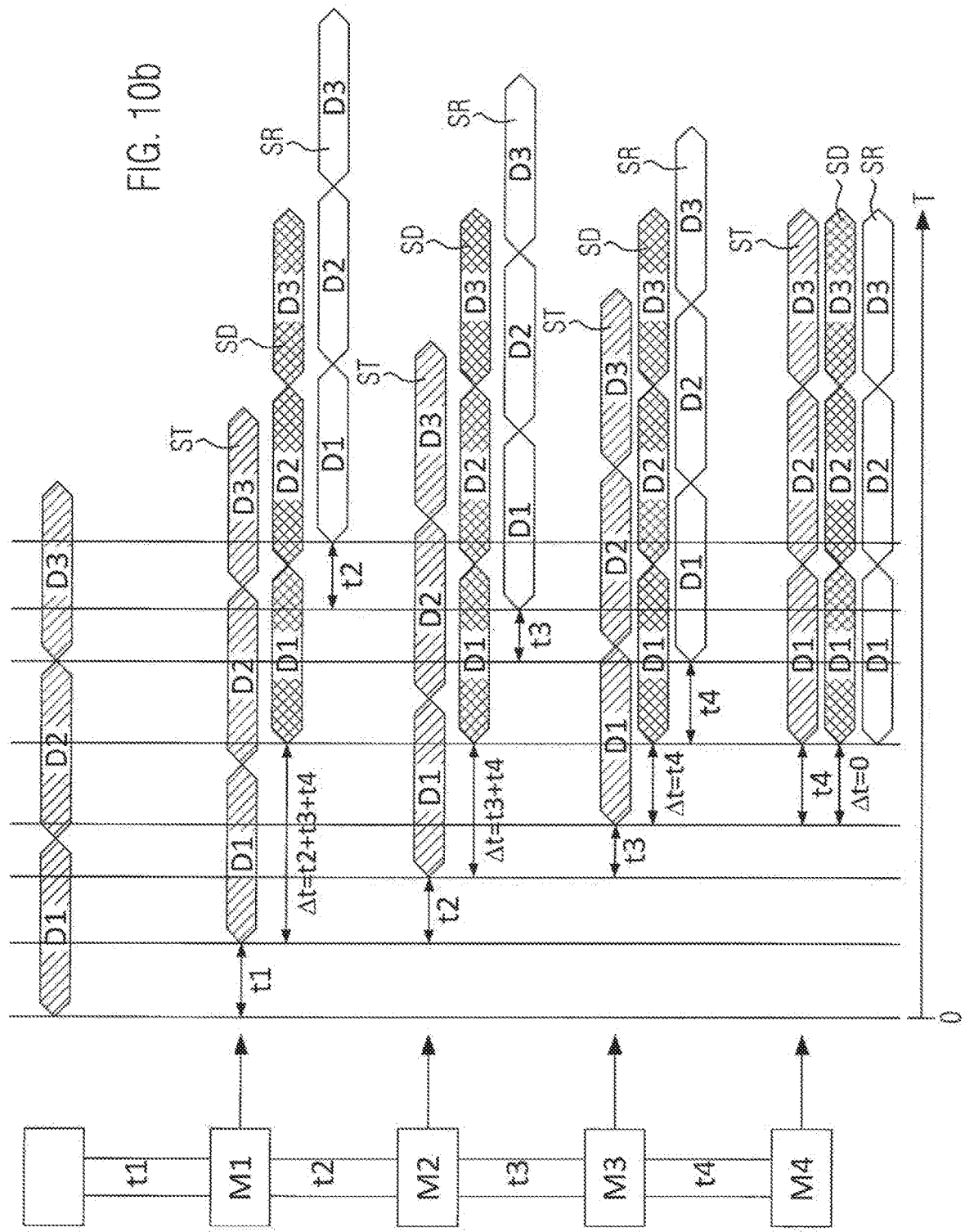
Figure 11A:
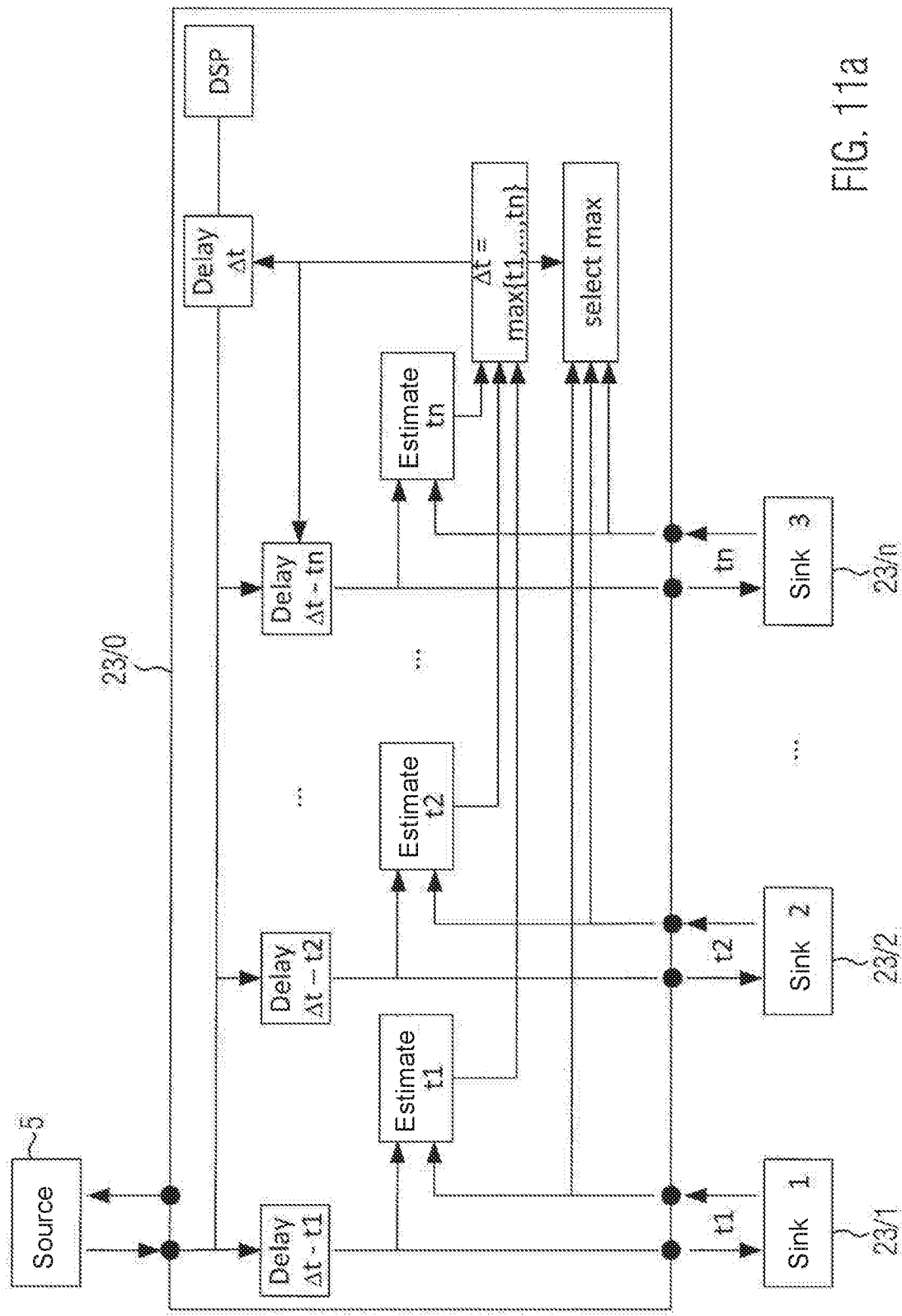
Figure 11B:
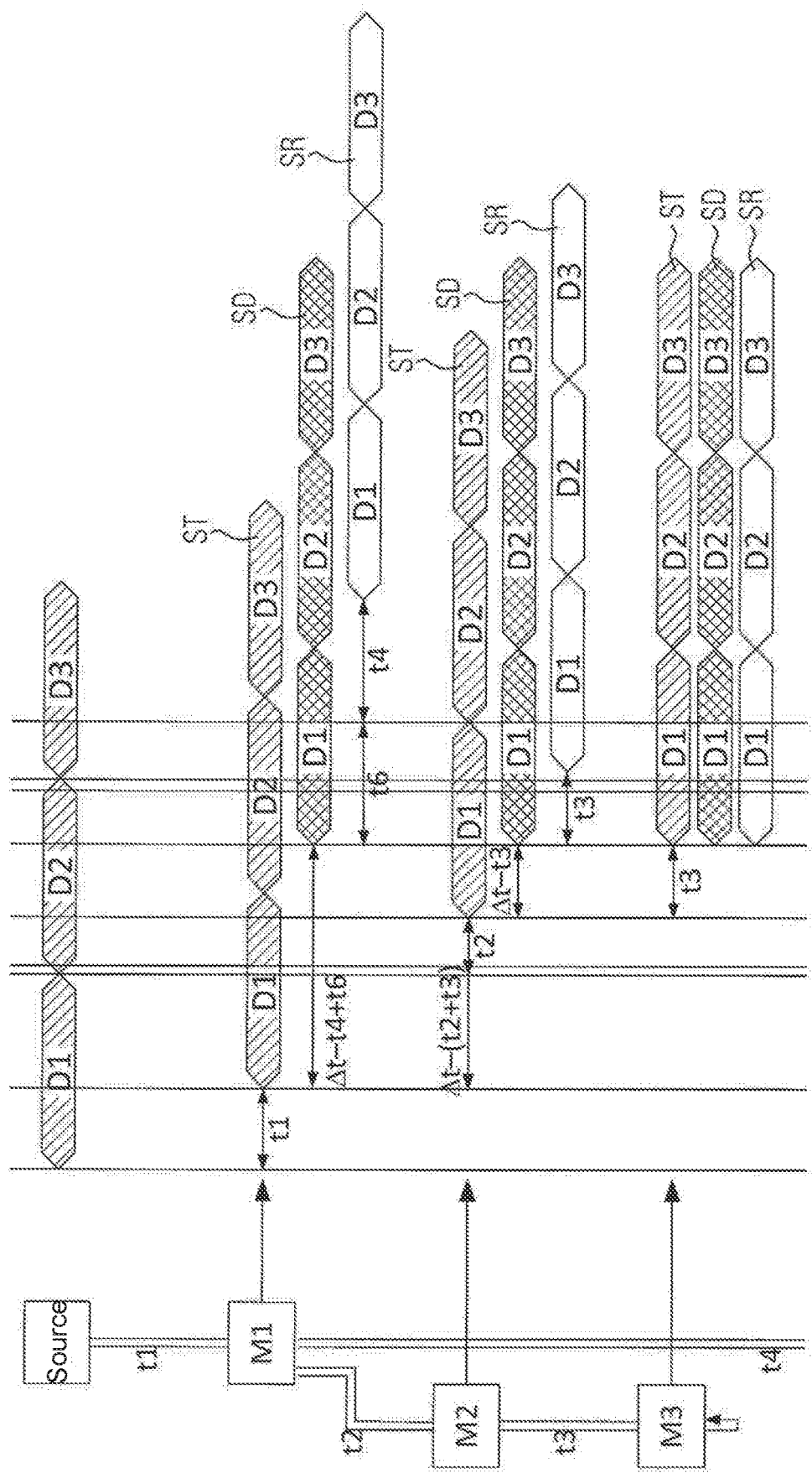
Figure 11B:
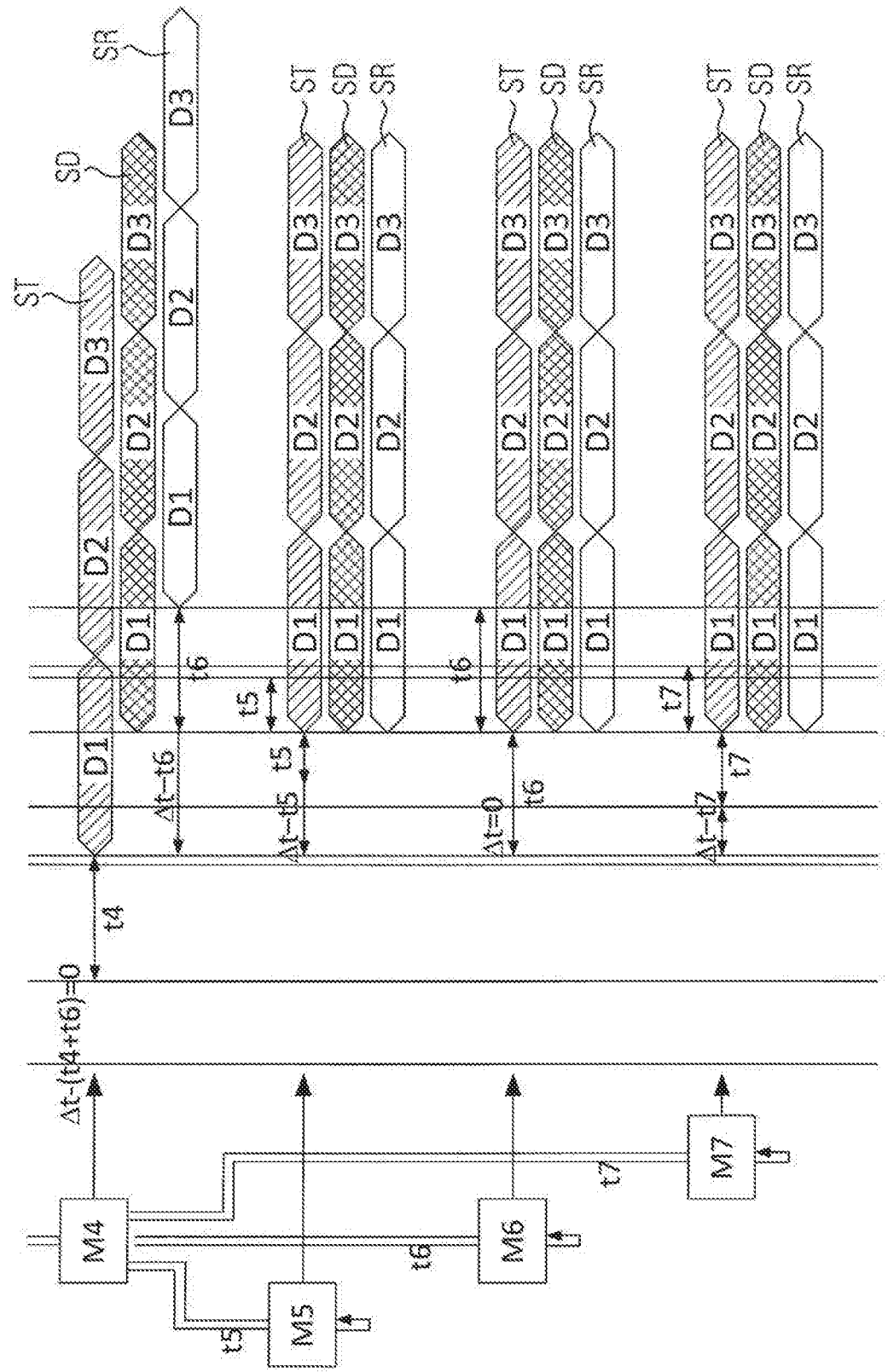

FIG. 10b shows an example of a configuration comprising four antenna modules 23 M1, M2, M3, M4, configured in a daisy-chain. The time intervals for transmitting the data signals between the radio equipment control unit 5 and the first antenna module M1 is t1, between the first antenna module m1 and the second antenna module M2 is t2, between the second antenna module M2 and the third antenna module M3 is t3 and between the third antenna module M3 and the fourth antenna module M4 is t4. So the complete duration for transmitting the data signals from the radio equipment control unit 5 (data source) to the most distant antenna module M4 is t1+t2+t3+t4. FIG. 10b comprises a timing diagram of the signals, wherein the signals when they were received from the antenna modules on the way from the source to the most distant antenna module M4 (forward direction), are designated with ST, the signals which are received by the respective modules on the return way (reverse direction) are designated with SR and for delayed signals are designated with SD.

The antenna module M1 receives a signal ST at the time t1. This module receives the returning signal SR at the time t1+t2+t3+t4+t4+t3+t2. The time difference between the transmitted signal ST and the returned signal SR is 2 (t2+t3+t4). This difference is divided in half for calculating a delay time $\Delta t$ which is for the first antenna module M1 t2+t3+t4. The delayed signal SD is the original signal ST delayed by $\Delta t$. Thus, the signal SD is provided in the calibration module 20 to the digital signal processor 41 at the time t1+t2+t3+t4.

As it can be seen from FIG. 10b by calculating for each antenna module 23 an individual delay time $\Delta t$ and delaying the incoming signal ST by this delay time $\Delta t$ all antenna modules 23 are processing the delayed signals SD exactly at the same time (t1+t2+t3+t4).

The synchronization signal can be any data signal. It is also possible to use a special synchronization signal or a clocking signal which do not contain any data as synchronization signal. Preferably, the synchronization is carried out at the booting of the active antenna system and is repeated at certain intervals.

The antenna modules 23 can also be arranged in a tree topology so that certain antenna modules 23 are connected to several further antenna modules to which they are transmitting the data signals. An antenna module 23 which is connected to several antenna modules 23 is called branching antenna module 23, because the signal path starting at the data source is branching at these antenna modules 23 to the further antenna modules 23. FIG. 11a shows schematically a functional block diagram of a branching antenna module 23 being part of a tree topology comprising a radio equipment control unit 5 as data source, the branching antenna module 23/0 and further antenna modules 23/1-23/n. In each branch one or more antenna modules 23 can be provided, wherein the antenna modules 23 can be configured in these branches in a daisy-chain configuration or a tree configuration or a combined daisy-chain or tree configuration. In each branch the most distant antenna module 23 is configured for returning a synchronization signal back to the data source. In the branching antenna module 23/0 the calibration module 20 is embodied for detecting the time when the synchronization signal is passing this branching antenna module 23 from the data source to the antenna modules 23 in the respective branch and the corresponding time of the returning synchronization signal. The difference of the two timing values is calculated and divided in half so that for each branch a delay value t1, t2, . . . , tn is calculated.

As each branch can comprise several branches, the synchronization signal can be returned on a certain branch several times, once for each sub-branch. So it can be that for each branch several timing values for the returning synchronization signal are received. The calculation of the delay times t1, t2, . . . , tn is based on the latest timing value for the returning synchronization signal which corresponds to the longest transmission path in each branch.

In the branching antenna module 23 the largest delay time t1, t2, . . . , tn of the individual branches is selected as delay interval $\Delta t$ of this branching antenna module 23/0. With this delay interval data $\Delta t$ the incoming data signals are delayed in the calibration module 20 before they are further processed by the digital signal processor 41.

Furthermore, the branching antenna module 23 delays the data signals for each individual branch by the delay interval data $\Delta t$ minus the individual delay time t1, t2, . . . , tn of the respective branch. Thus, the data signals are less delayed in long branches than in short branches.

FIG. 11b shows an example of a mixed tree- and daisy-chain-topology. This active antenna system comprises the radio equipment control unit 5 as data source, two branching antenna modules M1, M4 and further antenna modules M2, M3, M5, M6, and M7.

The longest signal path extends from the radio equipment control unit 5 (or any other reference point like hub, switch . . . ) via the antenna module M1, M4 to the most distant antenna module M6. The antenna modules M3, M5, M6, and M7 are returning the synchronization signals.

The branching antenna module M1 receives four times a returning synchronization signal, wherein the delay interval $\Delta t$ is calculated on the basis of the returning signal of the antenna module M6, because this is the most distant antenna module in this configuration. Thus, the delay interval $\Delta t$ in the branching antenna module M1 is t4+t6.

The delay to the branch containing the antenna modules M2, M3 is $\Delta t-(t2+t3)$. So the data signal reaches the antenna module M2 at a time which is delayed from starting the signal at the source 5 by t1 and t2 due to the runtime between the source 5, the antenna module M1 and the antenna module M2 and by the delay $\Delta t-(t2+t3)$.

In the antenna module M2 the data signal is delayed by $\Delta t=t3$ which is a delay according to the daisy-chain of M2 and M3.

The branching antenna module M1 does not delay the data signals to the further branching antenna module M4, because this branch provides the maximum delay in the branching antenna module M1, thus $\Delta t-tn$ is 0 (tn=t4+t6). In the branching module M4 the delay interval $\Delta t'$ is t6. Thus, the data signals to the antenna module M5 are delayed by $\Delta t'-t5$, the data signals to the antenna module M7 are delayed by $\Delta t'-t7$ and the data signals to the antenna module M6 are delayed by $\Delta t'-t6$ which is 0.

Thus, in all data modules M1-M7 the processing of the delayed data signals SD starts simultaneously at the time t1+t4+t6.

The antenna modules 23 are connected by antenna connects 6 or intermediate cables 27. All antenna modules 23 are automatically synchronized and there is no need for exactly define the length for the antenna interconnect(s) 6 and the intermediate cables 27. The antenna interconnects 6 should have substantially a similar length to that the delay times for the individual branches are minimized. This synchronization mechanism facilitates the design of the antenna interconnects 6 and also of the intermediate cables 27 significantly.

In the above-described embodiments of the synchronization mechanism the radio equipment control unit 5 forms the data source of the active antenna system. The data source can be also one of the antenna modules 23, wherein the other antenna modules 23 are synchronized with respect to the antenna module 23 which forms the data source. In such a case the calibration module 20 of the "data source" generates the synchronization signal.

The delays of all antenna modules 23 can be calculated in the data source or it is also possible, that each antenna module 23 is calculating the respective delay by measuring the time difference between the synchronization signal and the returning synchronization signal.

According to another embodiment it is also possible that each antenna module 23 is measuring the delay(s) to the neighboring antenna module(s) 23. On the basis of these measured delays the delay coefficients for the respective antenna module 23 is determined. In such a method the determination of the delays has to be arbitrated, e.g. by determining one antenna module 23 as master.

According to a further embodiment the determination of the individual delay times Δt is carried out by a method as described in the following with reference to FIG. 11b. For using this method the synchronization signals comprise headers with data fields, which can be read and written by each antenna module 23 as well as by the radio equipment control unit 5. In FIG. 11b the branch which comprises the longest delay is the branch from the radio equipment control unit 5, passing antenna module M1, passing antenna module M4, and ending at antenna module M6, thus the longest delay is t1+t4+t6. Each antenna module 23 is embodied to let only pass the returning synchronization signal comprising the longest time interval to its predecessor, such as another preceding antenna module 23 or the preceding radio equipment control unit 5. This synchronization signal is the latest received returning synchronization signal.

In a first step the radio equipment control unit 5 transmits a first synchronization signal to the antenna modules 23. The time differences between the synchronization signal and the returning synchronization signal is measured by the radio equipment control unit 5 and by each antenna module 23, for each connected branch separately. Then the measured time differences are divided by 2 in the radio equipment control unit 5 and in each antenna module 23. For example, antenna module M4 calculates three time differences t5, t6 and t7 for three branches and, since the returning synchronization signal received from antenna module M6 is the latest, only this synchronization signal is passed from antenna module M4 to antenna module M1. Another example is antenna module M1, which calculates two time differences t2+t3 and t4+t6 for two branches and lets only pass the returning synchronization signal received from antenna module M4 to the radio equipment control unit 5. The radio equipment control unit 5 measures all time differences of all returning synchronization signals on all branches and calculates the respective time differences. Further, the radio equipment control unit 5 determines the longest time difference, which is the time difference of the latest returning synchronization signal from all branches, as "maximum delay time" of the active antenna system. Since FIG. 11b only shows one branch being connected to the radio equipment control unit 5, the radio equipment control unit 5 calculates only one time difference t1+t4+t6, which is also the "maximum delay time".

In a second step the radio equipment control unit 5 transmits a second synchronization signal to the antenna modules 23. The radio equipment control unit 5 writes the "maximum delay time" to a data field ("max delay time") of the synchronization signal and the calculated time difference of each connected branch to another data field ("branch delay time") of the synchronization signal, which is then transmitted to the respective branch. This means, that the succeeding antenna modules 23 of every branch receive a second synchronization signal comprising the "maximum delay time", which is the same for all branches, and comprising the "branch delay time", which is a unique value for each branch and which represents its own time difference or delay.

In a third step, each antenna module 23 receives the second synchronization signal, extracts the "maximum delay time" and the unique "branch delay time". Then, each antenna module 23 writes the value calculated before for each connected branch to the "branch delay time" and passes the modified synchronization signal to the respective branch. This means, that the "maximum delay time" is left untouched and the "branch delay time" is set to the unique value which was calculated in the first step for the respective branch. For example, the antenna module M1 writes the value of t2+t3 to "branch delay time" of the second synchronization signal and passes the modified signal to antenna module M2. Further the antenna module M1 writes the value of t4+t6 to "branch delay time" of the second synchronization signal and passes the modified signal to antenna module M4. Then, each antenna module 23 calculates the difference between the extracted "branch delay time" and the largest "branch delay time" of its succeeding branches, which was calculated in the first step. For example, the antenna module M1 calculates (t1+t4+t6)−(t4+t6)=t1, the antenna module M4 calculates (t4+t6)−(t6)=t4. Thus, each antenna module 23 calculates the time difference of the connection to its preceding antenna module 23 ("preceding delay").

In a forth step, the radio equipment control unit 5 transmits a third synchronization signal to each connected branch which comprises another data field ("sum delay") with the value "0". While passing the synchronization signal, each antenna module 23 extracts the value from the data field "sum delay" of the synchronization signal, sums the extracted value with the "preceding delay" and writes the result to the data field "sum delay". For example, the antenna module M1 extracts "0" from the data field "sum delay", calculates 0+t1 and writes t1 to the data field "sum delay", while the antenna module M4 extracts t1 from the data field "sum delay", calculates t1+t4 and writes this value to the data field "sum delay". Thus, each antenna module 23 now knows the sum of the delays to itself in its branch.

In a fifth and last step each antenna module 23 subtracts from the "maximum delay time" the "sum delay" and applies this individual delay time Δt to a delay line which delays the antenna signal being transmitted and/or received. For example antenna module M1 calculates (t1+t4+t6)−t1=t4+t6, while antenna module M4 calculates (t1+t4+t6)−(t1+t4)=t6. Thus, all antenna modules 23 transmit or receive the antenna signals at the same point of time.

If timing problems, which can cause errors in measurements, arise by reading from and writing to the data fields in the synchronization signal, while the synchronization signal is passed through an antenna module 23, then the radio equipment control unit 5 can distribute these timing relevant steps to several sub steps. For this a further synchronization signal is transmitted which only purpose is to provide the data fields for writing.

In the above description of the method for determination of the individual delay times Δt the delay each antenna module 23 has internally is omitted for better understandability.

According to a further embodiment the determination of the calibration coefficients is carried out for all or the predetermined antenna modules 23 in the radio equipment control unit 5 and the delay is also carried out in the radio equipment control unit 5. Thus all or the predetermined antenna modules 23 do not delay the antenna signals. In such a case the calibration coefficients can be combined with the delays and phase shift according to the beamforming or other corrections.

The above-described synchronization mechanism can also be used for synchronizing antenna modules 23 being configured in a ring-topology or a ring-topology mixed with a daisy-chain-topology and/or a tree-topology. On the point of view of the data source, a ring-topology forms two branches, one in clockwise direction and one in counter-clockwise direction. These two directions in the ring are treated as separate branches. Thus, a ring-topology can be lead to a tree-topology having two branches.

Figure 12A:
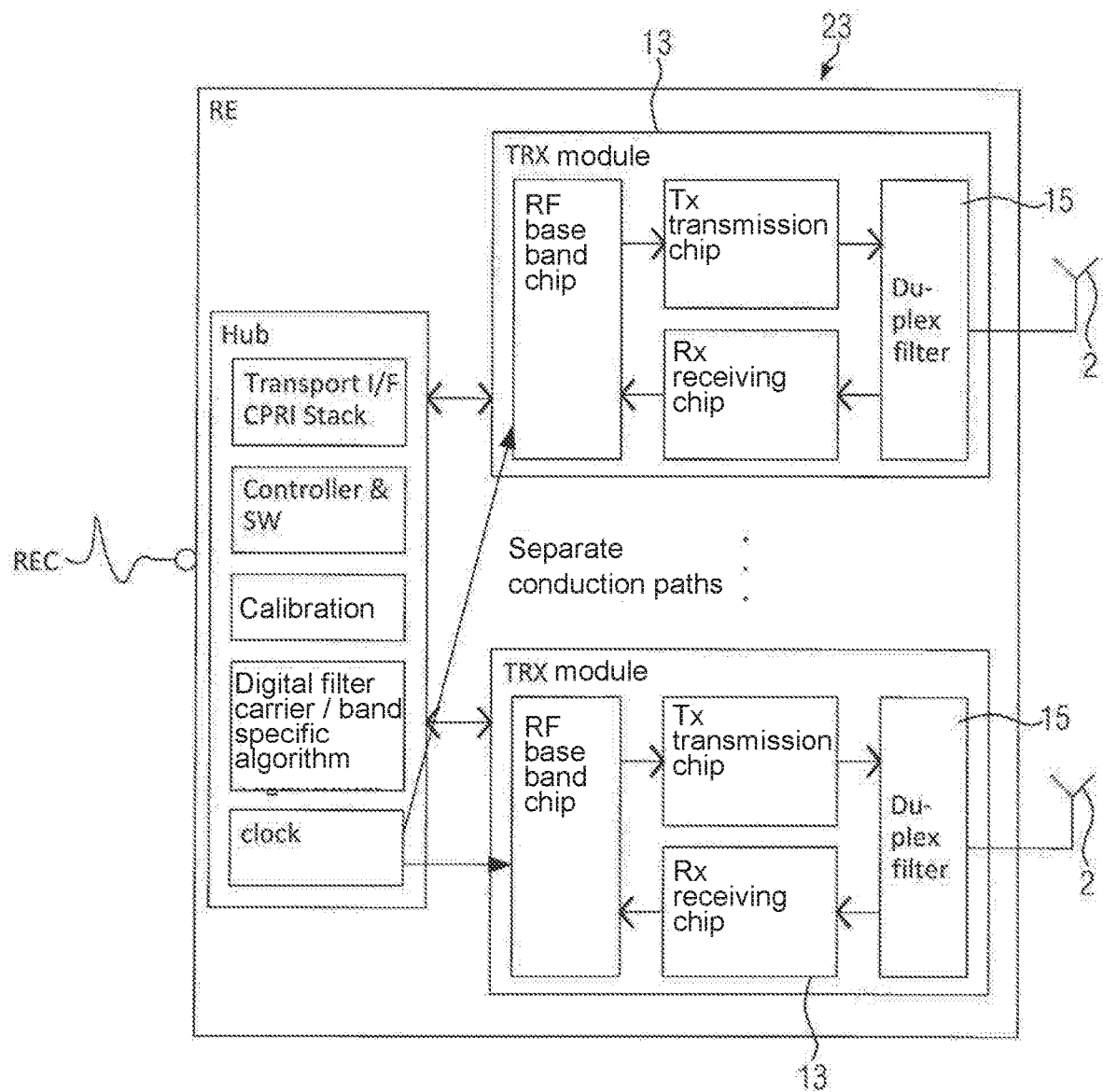
Figure 12B:
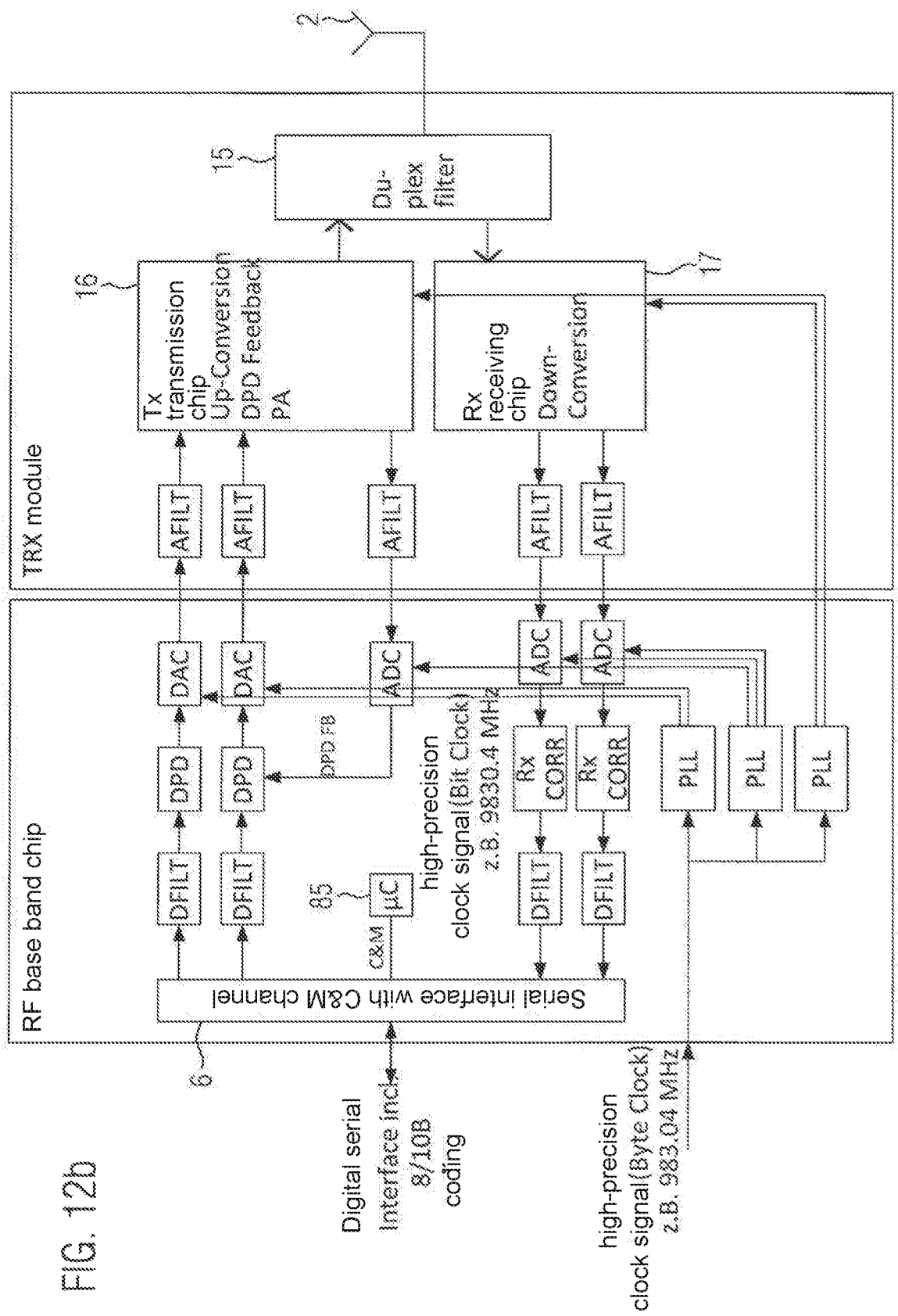
Figure 13A:
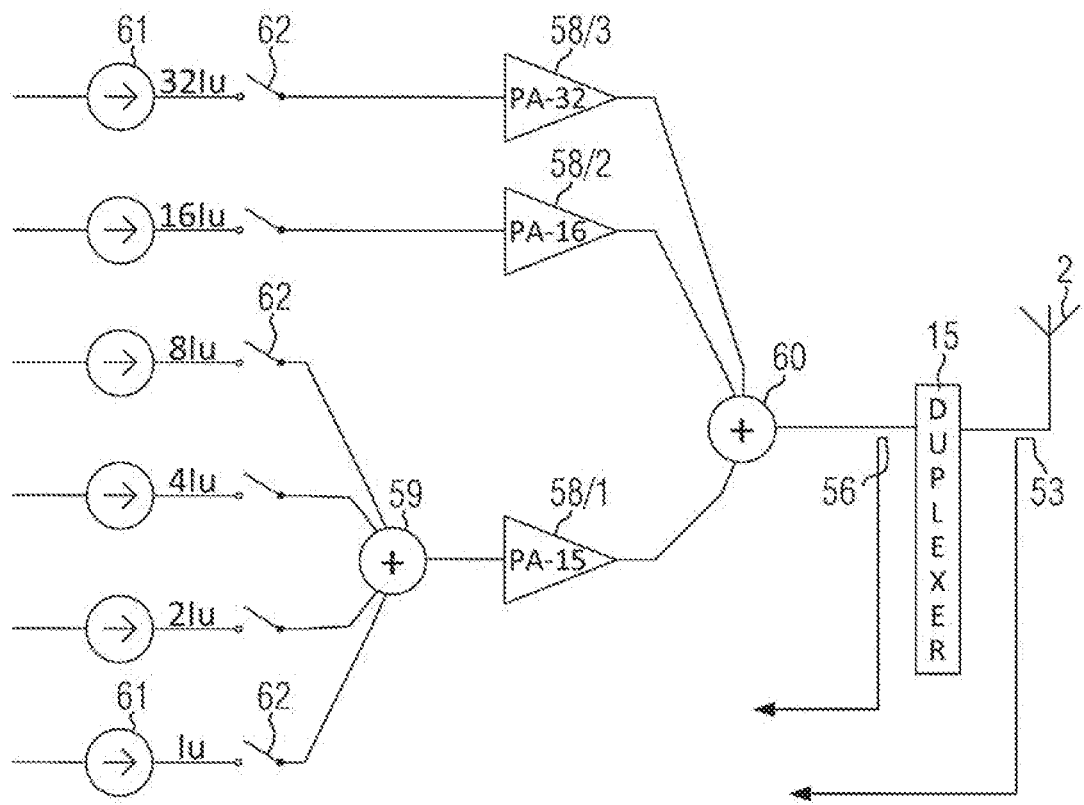
Figure 13B:
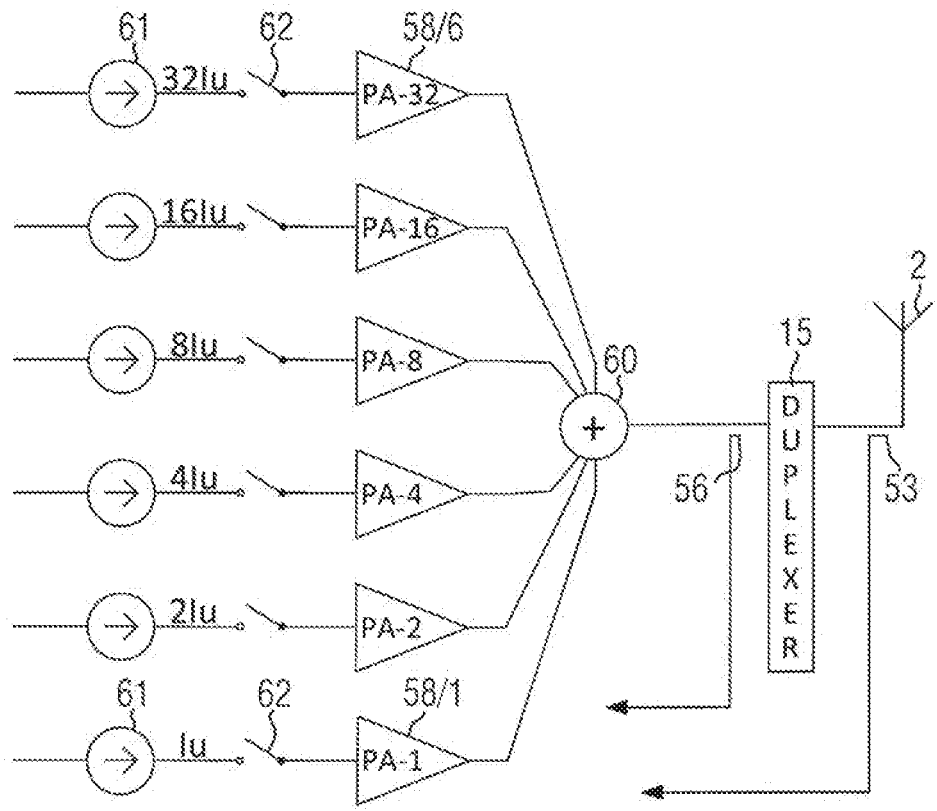

The clock signals in each antenna modules should be very precise. A deviation of about 14 ps means a phase-shift of 5° for a signal having a frequency of 1 GHz. The clock signals should clock to about ⅒ of the bit frequency. The byte clock speed should be e.g. about 983 MHz (for an anticipated 10 Gbps signal). According to one embodiment such a clock signal is e.g. centrally generated and transmitted by a separate conduction path having the same length to each module and they are stabilized by a high-precision oscillator and a PLL, so that the clock signal provides a ps-accuracy. This high-precision clock signal can be used for controlling digital-to-analog converters and analog-to-digital converters. FIGS. 12a and 12b show an example of the distribution of such a clock signal in an antenna module 23.

According to another embodiment the above described mechanism for synchronizing the data signals can also be used for synchronizing clock signals. Each antenna module comprises a separate clock having preferable a high precision oscillator and a PLL for stabilizing the clock signal. The individual clocks of the antenna modules can communicate with each other via the data bus. During configuration one of these clocks forms a master clock. This master clock sends a clock signal to one or more further clocks, which are slave clocks. The clock signal comprises a time stamp. The slave clock receives the clock signal from the master clock together with the time stamp and calibrates its clock signal according to the time difference between the time stamp and the time when the slave clock received the clock signal from the master clock. Then the slave clock returns its clock signal back to the master, so that the master can verify whether the calibration of the slave is correct or not. In case of a deviation the calibration is repeated.

Once a slave clock is calibrated it can act as master clock for calibrating clocks of further antenna modules.

The clock of the radio equipment control unit 5 can be used as master clock for clocks a certain group of antenna modules 23. After having calibrated these clocks then these clocks can be used as master clocks for further clocks of further antenna modules.

In the following a high performance amplifier for amplifying the high frequency signals having a high peak-to-average ratios output by a digital-to-analog converter is explained.

Usually a digital-to-analog converter generates internally a current signal for each bit of the digital signal, wherein each internal signal comprises either the current 0 or the current $2^n \cdot I_0$, wherein $I_0$ is the current of the 0-bit. These several currents are summarized in a summarizing node for providing the complete analog current signal.

In the present embodiment (FIG. 13a) several amplifiers 58 are provided for amplifying an output of a single bit of the digital-to-analog converter or a combined output of a limited number of bits. In the embodiment according to FIG. 13a the digital-to-analog converter 55 comprises as an example a 6 bit output, wherein only the bits 0, 1, 2, and 3 are summarized on a summarizing node 59 and the further bits 4 and 5 are individually amplified by separate amplifiers 58/2 and 58/3. The outputs of the amplifiers 58/1, 58/2, 58/3 are combined on a further summarizing node 60. The amplification characteristic of the amplifiers 58/1, 58/2 and 58/3 is adapted to the individual current levels of the different outputs of the digital-to-analog converter 55. Particularly, it is preferable to provide a different amplification characteristic for high current levels in comparison to low current levels. Particularly, the amplifier 58/1 for the lower bits needs a smaller maximum output current in comparison to the amplifiers 58/2 and 58/3 for the higher bits.

By amplifying the current outputs of the bits or group of bits before the current of all bits are combined in a final summarizing node improves the linearity and the response characteristic of the Tx-transmission chip 16.

According to a further embodiment the current outputs of each bit of the digital-to-analog converter is amplified by a separate power amplifier 58/1-58/6. For each bit a certain current source 61 is arranged providing a current with the level 2n·I0, wherein n is the number of the bit. The current source 61 is connected by a switch 62 to the corresponding power amplifier 58/1-58/6. If the switch 62 is closed, then the corresponding bit is on and if the switch 62 is open, then the corresponding bit is off. The currents of the respective bits are amplified by the individual amplifiers 58/1-58/6 which are adapted to the corresponding current level. The individual amplifiers 58/1-58/6 are adapted to the corresponding current level in that the area of corresponding transistors is adapted to the current level or several transistors are connected in parallel according to the current level. Such an embodiment comprises identical amplification paths for each bit so that the delay for each bit is identical. This provides a very homogenous integration into the Tx-transmission chip 16. The individual amplified currents are summarized at the summarizing node 60. The completely summarized signal forms the antenna signal which is applied to the antenna 2 without further amplification.

With such an amplification unit individual bits or groups of bits of the output of the digital-to-analog converter are amplified separately and then summarized by a summarizing node. There is no need for a further amplification for applying the complete antenna signal to the antenna 2. Such an amplification unit can be realized by low costs, with a high linearity and with a high efficiency. Furthermore, such an amplification unit can be embodied completely as an integrated circuit in semiconductor technology. (wenn die Ausgangsleistung nicht zu hoch ist, sonst besser diskret)

These high performance amplifiers can be embodied on a chip either with discrete elements and/or with integrated elements. These high performance amplifiers can be used in any multi carrier system having high peak-to-average ratio signals. Furthermore, an impedance converter can be connected with the output of the summarizing node. Further signal processing elements can be provided between the power amplifiers and the summarizing node.

The above described active antenna systems 1 can be used for a secure wireless communication with a communication partner 63.

In the following the steps for establishing a communication connection between the active antenna system 1 and a communication partner 63 (FIG. 1) are explained:

1. The establishing of a communication connection starts with scanning for a communication partner 63. The active antenna system 1 can emit a beam-shaped scanning signal which direction is permanently changed so that the scanning signal is scanning during certain time intervals a cell 64 for new potential communication partners. If the communication partner 63 receives such a scanning signal, then it sends a predetermined scanning reply signal which is received by the active antenna system. The scanning reply signal can comprise an identification code such as IMEI and/or the telephone number, so that the active antenna system can identify a communication partner 63.

Alternatively the scanning for a communication partner can be triggered by the communication partner 63 by sending a contact signal. The sending of this contact signal is initiated by the communication partner 63 without receiving any signal from the active antenna system 1. The active antenna system 1 sends a contact reply signal after receiving such a contact signal to the communication partner. By the exchange of the contact signal and the contact reply signal the communication partner 63 and the active antenna system 1 can identify themselves to each other.

In case that the communication partner 63 is moving connection information from one cell 64 can be transmitted to the active antenna system of a neighboring cell to which the communication partner 63 is moving, so that the active antenna system 1 of the neighboring cell is already expecting the communication partner 63. Preferably, the estimated position of the communication partner 63 is transmitted from one cell 64 to the other cell 64, so that the active antenna system 1 in the second cell can search at a certain region in the cell for the arriving communication partner 63.

The scanning signal, the scanning reply signal, the contact signal, and the contact reply signal are only provided for getting into contact between the communication partner 63 and the active antenna system 1 and not for exchanging any information besides the optional identification information (IMEI and/or the telephone number).

2. After the active antenna system 1 has recognized a communication partner 63 it estimates the direction of arrival (DOA) from the received scanning reply signal or contact signal. Eventually a further exchange of scanning signals and scanning reply signals is initiated for estimating the direction of arrival and/or for measuring physical parameters of the radio channels of each antenna 2 of the active antenna system 1.

The direction of arrival can be estimated by measuring the phase differences of the scanning reply signal or contact signal received by the several antennas 2. From the results of the phase measurements the corresponding DOA-parameters $\phi_1, \ldots, \phi_N$ can be derived. There are also other methods known for estimating the direction of arrival (DoA) which can also discriminate reflected signals and disturbing signals which use additional information, particularly the completely encoded and descrambled signals. These further methods for estimating the direction of arrival (DoA) can be also used.

The physical parameters of the radio channels of the individual antennas 2 can be measured by means of a channel impulse response (CIR). Different methods are known for measuring the channel impulse response. This can be done by applying a Dirac-impulse or a Kronecker-$\Delta$ in a discrete-time system, detecting a step response or applying a broadband noise to the channels. Any linear, time-invariant (LTI) system is completely characterized by its impulse response. The impulse response can be converted into a transfer function by the Laplace transform. With such a method the CIR-coefficient $h_n, \ldots, h_N$ can be determined. Thus, the CIR-coefficient of each radio channel and the direction of each radio channel are known. These CIR-coefficients are physical parameters which are varying in time and place. Thus these parameters are very individual numbers which cannot be reproduced by someone else besides copying the original data.

3. The active antenna system 1 is calculating beam-forming parameters $a_{\phi 1}, \ldots, a_{\phi N}$ for each radio channel of each antenna 2 which is directed to the detected communication partner 63.

4. Predistortion factors $w_1, \ldots, w_N$ are calculated for compensating the distortion in the individual radio channels. The predistortion factors are weighting factors for inversely reproducing the radio channels ($w_1, \ldots, w_N \leftrightarrow h^{-1}_1, \ldots, h^{-1}_N$). These weighting factors form together with the beam-forming parameters a beam-forming matrix.

5. A signal s(t) containing certain data which are to be transmitted is sub-divided in several partial signals d(t), wherein the partial signals d(t) are distributed onto the N radio-channels. This can be expressed by the following formula:

$$s(t) = d(t) \sum_{\forall n} w_n a_{\Phi_n} \tag{5}$$

6. The signal s(t) is transmitted via the several radio channels from the active antenna system 1 to the communication partner 63. The communication partner 63 receives the signal s(t) or the partial signals d(t) from all directions and superimposes the received signals d(t). As the partial signals d(t) are transmitted via several radio channels and by means of a directed or beamformed radio signal, the superposition depends very much from the location of the communication partner 63. In other words, only if the communication partner 63 is located at the correct place which corresponds to the direction which was estimated by the active antenna system 1 in the above described step 2 then a complete superposition of the signal s(t) is possible. With this method it can be secured, that other potential communication partners in the cell 64 cannot receive the complete signal s(t) even if they receive all partial signals d(t), because at another place in the cell the partial signals d(t) have a different phase difference and/or runtime and/or amplitude to each other so that the superposition is substantially different to the intended superposition. This makes it difficult for other potential communication partners to listen to the communication between the active antenna system 1 and the intended communication partner 63. Therefore, we call this method spatial encryption. The spatial encryption is based on the provision of several radio channels (at least two, preferably four or more radio channels) and the beamforming of the radio signals.

After having established the data communication between the active antenna system 1 and the communication partner 63 in step 6. an encryption scheme is determined.

After determining the encryption scheme the communication partner 63 can identify itself by the active antenna system 1 by transmitting an identification code such as an IMEI or a telephone number, if such an identification was not yet carried out in step 1.

The encryption scheme can be any ordinary encryption scheme such as RSA or AES (Advanced Encryption Standard) which is negotiated between the active antenna system 1 and the communication partner 63 by means of the established data communication.

This spatial encryption method can be used with each known active antenna system which has beamforming capabilities.

Alternatively or additionally a measurement of unique data or parameters of the radio channel(s) can be used for determining the encryption scheme. Particularly, the measurement of the channel impulse response and the calculation of the CIR-coefficients (as described above) can be used for determining the encryption scheme. The channel impulse response is a very specific function which describes the physical properties of the individual radio channels.

A channel impulse response can be measured by the active antenna system 1 and the corresponding CIR-coefficient can be transmitted via the data connection to the communication partner 63. Both, the active antenna system 1 and the communication partner 63 can use the CIR-coefficients to encrypt the further signals. The usage of the CIR-coefficient is predefined in both systems, the active antenna system 1 and the communication partner 63. This kind of encryption is particularly used in combination with the above described spatial encryption, so that no one else can listen to the transmission of the CIR-coefficients. The CIR coefficients which are used for encryption form a time variant key.

If the radio channels are reciprocal then it is possible that both the active antenna system 1 and the communication partner 63 are measuring simultaneously the CIR-coefficient independently of each other, wherein they receive the identical or substantially identical CIR-coefficients. With such two measurements on both sides of the communication path very specific coefficients are generated which must not be transmitted via the communication path. On the basis of these CIR-coefficients the active antenna system 1 and the communication partner 63 can encrypt the further signals.

If the measurement of the CIR-coefficients was not exact enough, so that the CIR-coefficients of the active antenna system 1 differ from the one of the communication partner 63 then the measurement of the CIR-coefficients has to be repeated until sufficiently coinciding CIR-coefficients are achieved. Such an encryption scheme which is based on the independent measurements of the same physical parameters of the radio channels can also be used independently of the above described spatial encryption, because the radio channels are so specific that no one else can achieve these parameters. This is particularly true if the radio channels are beamformed (steps 1.-4. of the above described method). There is no need to distribute the signal onto different radio channels. In a TDD system (time duplex domain system) this method can also be used with only one single radio channel for securely determining an encryption scheme for the active antenna system and the communication partner.

A further encryption scheme which can be used additionally or alternatively is to scramble a signal containing the data which are to be exchanged between the active antenna system and the communication partner onto the different radio channels. This is a logical distribution of the data onto the different radio channels. The active antenna system 1 and the communication partner have to negotiate how the data are to be scrambled on the different radio channels. Preferably, such negotiation is repeated regularly, so that the scrambling scheme is regularly changed. The intervals for changing the scrambling scheme are preferably in the range of 0, 1 s to 10 s. Such a dynamic scrambling of the data onto the different data paths or radio channels, respectively, is highly secure, because a listener of the different radio channels is not able to read and even combine the snippets of signals or data. Preferably antennas of different cells are used for this method, because these antennas are completely uncorrelated.

Preferably the above encryption schemes are combined using
- spatial encryption, wherein the antenna signals are physically distributed as partial signals d(t) onto the different radio channels,
- the encryption scheme is based on physical parameters of the radio channel(s), and/or
- the data which are transmitted are logically distributed onto the different radio channels statically or dynamically.

In the following a further process for determining the encryption scheme by means of CIR-coefficients is explained, comprising the following steps:

a. A reference signal is transmitted by the active antenna system 1 several times, wherein each time it is transmitted simultaneously via at least two radio channels (i.e. at least two antennas 2) (out of n), wherein each time a different combination of the radio channels is used. Thus, the communication partner 63 receives always a reference signal simultaneously of at least two radio channels.

b. The communication partner 63 measures the CIR-coefficients of the reference signals.

c. The communication partner resends the measured CIR-coefficients to the active antenna system.

d. The active antenna system calculates the CIR-coefficients for each single radio channel on the basis of the received CIR-coefficients. The CIR-coefficient of each radio channel is a vector. By measuring the reference signal which is transmitted via at least two radio channels, provides CIR-coefficients which correspond to a vector resulting from an addition of vectors of the individual radio channels. As only the active antenna systems know which radio channels were used for transmitting the reference signal, only the active antenna system is able to calculate the CIR-coefficient for each individual radio channel.

e. By means for the thus received CIR-coefficients for the individual radio channels, the above described spatial encryption is carried out.

As an example it is assumed that three antennas A, B, C are used. The active antenna systems 1 transmits the reference signal firstly via the antenna A+B, then via the antenna B+C and then via the antenna A+C. The communication partner measures the CIR-coefficients for each combination of the two reference signals. The measured CIR-coefficients are transmitted from the communication partner to the active antenna system. At the active antenna system the CIR-coefficients are calculated by subtraction of the vectors so that the CIR-coefficients for the individual radio channels are achieved. These CIR-coefficients are used for calculating the weighting factors for the predistortion factors of the step 4.

A listener who receives the CIR-coefficients transmitted from the communication partner to the active antenna system cannot combine them, because he does not know by which radio channels the reference signal was transmitted In the example just three antennas are used. Preferably, more antennas such as at least five or at least ten antennas are used, wherein the reference signal is simultaneously transmitted by preferably a varying number of antennas such as two, three, four or five antennas simultaneously, so that the number of potential combinations is large.

According to a further embodiment the Rx-receiving chip 17 is replaced by a homodyne receiver 65. Such homodyne receivers are also called direct-conversion receiver (DCR), synchrodyne receiver or Zero-IF-receiver. The homodyne receiver demodulates the incoming radio signal using synchronous detection driven by a local oscillator whose frequency is identical to, or very close to, the carrier frequency of the received signal. This is in contrast to standard super-heterodyne receivers where this is accomplished only after an initial conversion to an intermediate frequency. The simplification of performing only a single frequency conversion reduces the basic circuit complexity but other issues arise, for instance, regarding dynamic range. The development of homodyne receivers in low-cost integrated circuits made this design widely accepted.

In a homodyne receiver an amplitude modulated signal is decomposed into two amplitude-modulated sinusoids that are offset in-phase by one-quarter cycle. These amplitude-modulated sinusoids are known as in-phase (I) and quadrature (Q) components.

The homodyne receivers suffer the problem that the in-phase and the quadrature can be offset (IQ-Imbalance) so that mirror frequencies which are folded into the base band signal are caused. If the offset of the in-phase and the quadrature components is known, then it is possible to compensate the offset. Thereby, the offset can continuously change during operation due to temperature effects and changing other operational parameters so that a static compensation of the IQ-imbalance cannot permanently avoid the problem.

The transceiver module 12 of this embodiment comprises a transmission path 30 which is substantially identical to the one of the above-described embodiments comprising an RF-base band chip 18 and a Tx-transmission chip 16 (FIG. 14). The homodyne receiver 65 is located in the receiving path 45.

An attenuation element 66 is provided in-between the transmission path 30 and the receiving path 45 for transmitting a portion of the amplified output antenna signal u(t) onto the return (standard receive Rx path) path 45. The attenuated signal $u_R(t)$ is added as a reference signal in the receiving path 45 to the received antenna signal $u_s(t)$.

In the simplest embodiment the circuits of the transmission path 30 and the receiving path 45 are located so close to each other that the cross-talk of the transmission path 30 to the receiving path 45 transmits an attenuated portion of the output antenna signal $u_R(t)$ onto the receiving path 45. Other attenuation elements 66 can be provided, such as e.g. a capacitor or a directional coupler.

The superimposed signals of the reference signal $u_R(t)$ and the input antenna signal $u_s(t)$ are applied to the input side of the homodyne receiver 65. The output side of the homodyne receiver 65 is connected to an IQ-compensation module 67 for compensating the IQ-imbalance. The output side of the homodyne receiver 65 is further connected to an IQ-coefficient determination module 68. The IQ-coefficient determination module 68 is provided for determining IQ-imbalance coefficients $g_0$, $g_1$, $g_2$, . . . . The IQ-coefficient determination module 68 is further connected to the input side of the transmission path 30 for receiving a complex, time-depending amplitude A(t). This complex, time-dependent amplitude A(t) forms a broadband transmission signal. Preferably, the transmitter and the receiver are run in the FDD (Frequency Division Duplex) mode. The transmission Tx-band in the receiving (Rx-band) do usually not overlap after filtering the signals with the duplex filter 15. However, it can be assumed that due to non-linear distortions the Tx-band emits basically undesired components overlap with the receiving Rx-band, or before filtering the signals the transmission band and the receiving band can overlap. A reference signal can be used which frequency lies in the overlap. The desired transmission signal $u_g(t)$ having the carrier frequency $f_T=\omega_T/2\pi$ can be described by:

$$u_g(t)=\text{Re}\{\underline{A}(t)\cdot\exp(j\omega_T t)\} \quad (6)$$

The portions of the transmission signal including non-linear distortions around the middle frequency of the receiver ($f_R=\Omega_R/2\pi$) are used for characterizing the IQ-imbalance of the receiver. A duplex distance $f_D=f_T-f_R=\omega_D/2\pi$ is usually small in comparison to the middle frequency $|f_D|\ll f_T, f_D$.

The complete transmission signal u(t) can be described with $$u(t)=\text{Re}\{(1+\underline{a}_3\cdot|\underline{A}(t)|^2+\underline{a}_5\cdot|\underline{A}(t)|^4+\ldots)\cdot \underline{A}(t)\cdot\exp(j\omega_T t)\} \quad (7)$$

wherein the complex coefficient $\underline{a}_3$, $\underline{a}_5$, . . . describes the non-linearity. A potential frequency dependency of the non-linearities is neglected in this formula.

As described above, a portion of the transmission signal is transmitted from the transmission path to the receiving path 45 as reference signal, wherein this portion of the transmission signal $u_R(t)$ is strongly attenuated so that the receiving signal is not distorted. The attenuation factor k is much smaller than 1, $|k|\ll 1$.

The reference signal at the input side of the homodyne receiver 65 can be described as $$u_R(t)=\text{Re}\{\underline{k}\cdot(1+\underline{a}_3\cdot|\underline{A}(t)|^2+\underline{a}_5\cdot|\underline{A}(t)|^4+\ldots)\cdot \underline{A}(t)\cdot\exp(j\omega_D t)\cdot\exp(j\omega_R t)\} \quad (8)$$

or $$u_R(t)=\text{Re}\{\underline{B}(t)\cdot\exp(j\omega_R t)\} \quad (9)$$

with $$\underline{B}(t)=\underline{k}\cdot(1+\underline{a}_3\cdot|\underline{A}(t)|^2+\underline{a}_5\cdot|\underline{A}(t)|^4+\ldots)\cdot\underline{A}(t)\cdot\exp(j\omega_D t) \quad (10)$$

the complex attenuation factor $\underline{k}$ can be combined with the complex coefficients $\underline{a}_3$, $\underline{a}_5$, . . . to the complex coefficients $b_1=\underline{k}$, $b_3=\underline{k}\cdot\underline{a}_3$, $b_5=\underline{k}\cdot\underline{a}_5$, . . . , so that:

$$\underline{B}(t)=(b_1+b_3\cdot|\underline{A}(t)|^2+b_5\cdot|\underline{A}(t)|^4+\ldots)\cdot\underline{A}(t)\cdot\exp(j\omega_D t) \quad (11)$$

The simplest way to describe the homodyne receiver 65 with IQ-imbalance is to use the amplitude $\underline{C}(t)$ instead of the complex, time-dependent amplitude $\underline{B}(t)$, wherein the amplitude $\underline{C}(t)$ comprises a small portion of the complex conjugate amplitude $\underline{B}^*(t)$ and a dc-portion $g_0$:

$$\underline{C}(t)=g_0+\underline{g}_1\cdot\underline{B}(t)+\underline{g}_2\cdot\underline{B}^*(t) \quad (12)$$

In a good homodyne receiver the modulus of the complex coefficient $\underline{g}_2$ is much smaller than the modulus of the complex coefficient $\underline{g}_1$.

Aim of the characterization is the determination of the coefficients $g_0$, $g_1$ and $g_2$. However the coefficients $b_m$, with m=2n+1, n=0, 1, 2, . . . are not known.

The coefficients are determined by means of known methods of least squares, wherein the mean error between the measured receiving signal $\underline{Y}(t)$ and the received signal $\underline{C}(t)$ which is derived from the transmission signal $\underline{A}(t)$ is to be calculated:

$$\overline{|e(t)|^2} = \overline{|\underline{Y}(t) - \underline{C}(t)|^2} \stackrel{!}{=} \min. \tag{13}$$

The receiving signal $\underline{C}(t)$ can be described by the following formula:

$$\underline{C}(t) = \underline{g}_0 + \underline{g}_1 \sum_n b_{2n+1} |\underline{A}(t)|^{2n} \underline{A}(t) \exp(j\omega_D t) + \underline{g}_2 \sum_n \underline{b}^*_{2n+1} |\underline{A}(t)|^{2n} \underline{A}^*(t) \exp(-j\omega_D t) \tag{14}$$

On the basis of this formula and with the following assumptions $|\underline{g}_0|, |\underline{g}_2| \ll |\underline{g}_1|$ and $\underline{C}(t) \square \underline{C}'(t)$ and by setting $\underline{g}_1=1$ the coefficients $b_n$ are determined according to a first approach:

$$\underline{C}'(t) = \sum_n \underline{b}_{2n+1} \cdot |\underline{A}(t)|^{2n} \cdot \underline{A}(t) \cdot \exp(j\omega_D t) = \sum_n \underline{b}_{2n+1} \cdot \underline{F}_n(t) \tag{15}$$

$F_n(t)$ is a substituting function for error determination. Known methods for solving the linear problem of the least square can be used for determining the coefficients $b_m$:

$$\overline{|e'(t)|^2} = \overline{|\underline{Y}(t) - \underline{C}'(t)|^2} \stackrel{!}{=} \min. \tag{16}$$

The signals are time variant so that it is appropriate to average the signals for a certain period. The averaging corresponds to an averaging in time or a correlation of the signals for e.g. about 10 ms. The received signal $\underline{Y}(t)$ comprises besides the reference signal $u_R(t)$ also the desired signal $u_S(t)$. The cross-correlation of the desired signal and the reference signal or the cross-correlation of the desired signal and the function $\underline{F}_n(t)$ is negligible small.

In a second step $\underline{C}(t)$ can be calculated from $\underline{C}'(t)$ with the following formula:

$$\underline{C}(t) = \underline{g}_0 + \underline{C}'(t) + \underline{g}_2 \cdot \underline{C}'^*(t) \tag{17}$$

The coefficients $\underline{g}_0$ and $\underline{g}_2$ are calculated with known methods for solving linear problems of the least square according to the following formula:

$$\overline{|e(t)|^2} = \overline{|\underline{Y}(t) - \underline{g}_0 - \underline{C}'(t) - \underline{g}_2 \cdot \underline{C}'^*(t)|^2} \stackrel{!}{=} \min. \tag{18}$$

Alternatively the coefficients $\underline{g}_0$, $\underline{g}_1$, $\underline{g}_2$ and $b_m$ are determined according to a second approach with known methods according to solving the non-linear problems of least squares and that the following equation is directly minimized:

$$\overline{|e(t)|^2} = \overline{|\underline{Y}(t) - \underline{C}(t)|^2} \stackrel{!}{=} \min. \tag{19}$$

As the minimization has not to be carried out in real time all known method for solving the non-linear problems of least squares can be used.

An IQ-balance compensation of the received signal $\underline{Y}(t)$ can be carried out with the known coefficients $\underline{g}_0$, $\underline{g}_1$, and $\underline{g}_2$ for receiving a corrected receiving signal $X(t)$ according to the following formula:

$$X(t) = \frac{\underline{g}_1^* \cdot \underline{Y}(t) - \underline{g}_2 \cdot \underline{Y}^*(t) - \underline{g}_1^* \cdot \underline{g}_0 + \underline{g}_2 \cdot \underline{g}_0^*}{|\underline{g}_1|^2 - |\underline{g}_2|^2} \tag{20}$$

The above representation in the time domain can be transformed into a discretely-timed signal by means of a z-transformation if a scanning frequency $f_A$ is sufficiently large. This is the case if $f_A > 2f_D$.

A potential frequency dependency of the amplitude and phase transmission can be generally described by means of a convolution with complex impulse responses in the time domain instead of a multiplication of complex coefficients. The transfer function with the coefficients $b_{m,k}$ is used instead of $b_m$ in a time-discrete formulation by means of z-transformation. The calculated received signal C can be represented in a linear combination in the same way as in the above-described example, so that the same solution principles can be used. Particularly, the first above described approach is solvable as a linear problem.

This embodiment of the transceiver module 12 comprising the homodyne receiver 65 and the IQ-compensation module 67 allows to create a compensation of the IQ-imbalance during operation, wherein an attenuated portion of the transmitting signal is coupled from the transmission path 30 to the receiving path 45 and after amplification by the homodyne receiver 65 used for determining of IQ-imbalancing coefficients $g_0$, $g_1$, and $g_2$. The received and amplified signal Y(t) is compensated with respect to IQ-imbalance by means of these coefficients. Thus, it is possible to carry out an IQ-imbalance compensation during the operation of the transceiver module 12.

The above described radio equipment 3 is completely based on electronic circuits, wherein some parts are digital circuits and other parts are analog circuits.

In the following, embodiments of the radio equipment 3 are explained which comprise optoelectronic circuits. Such optoelectronic circuits are also called photonic circuits or microwave photonic circuits.

In "Optical Beam Forming Network created by Silicon Nitride microwave photonic circuits", Chris G. H. Roeloffzen et al., Optics Express 2, Vol. 21, No. 19, Sep. 23, 2013 describes several microwave photonic processing functionalities based on combinations of Mach-Zehnder and ring resonator filters using the high index contrast silicon nitride waveguide technology. All functionalities are built using the same basic building blocks, namely straight waveguides, phase tuning elements, and directional couplers. This document is also incorporated by reference.

David Marpaung et al., "Integrated microwave photonics" in Laser & Photonics Reviews (in the following: LPR), Nov. 20, 2012 provides an overview about microwave photonics (MWP) and discusses fundamentals of microwave photonics and certain applications.

Charles Middleton et al., "High Performance Microwave Photonic Links using Double Sideband Suppressed Carrier Modulation and Balanced Coherent Heterodyne Detection", to be presented at MILCOM 2009 in Boston (in the following: MILCOM), presents a microwave photonic link architecture that enables high gain and dynamic range, low noise figure, and multi-octave bandwidth operation.

John Michael Wyrwas, "Linear, Low Noise Microwave Photonic Systems using Phase and Frequency Modulation", dissertation (University of California, Berkeley), May 11, 2012, Technical Report No. UCB/EECS-2012-89 (in the following: EECS) (www.eecs.berkeley.edu/Pubs/TechRpts/

2012/EECS-2012-89.html) discusses microwave photonics applications and the elements used therewith.

All these documents are incorporated by reference.

The above described examples of active antenna systems can also be designed in an optical domain i.e. with (microwave) photonic components. Before discussing examples based on an optical domain, electro optical or optical (photonic) components are explained which can be used in a photonic active antenna systems.

Up-/Down-Conversion

A Mach-Zehnder modulator can be used for carrying out an up-/down-conversion. Alternatively, it is also possible to use an optical non-linear element for transmitting a light of a first laser. The first laser light is modulated by the light of a second laser. In EECS, page 5, FIGS. 1.4 and 1.5, such elements are shown for modulating light which can be used as an up- or down-conversion element. Further suitable modulators are shown in FIG. 10 of LPR and FIG. 1 of MILCOM.

Filter Elements, Particularly Suitable for Analog Predistortion

Figure 17:
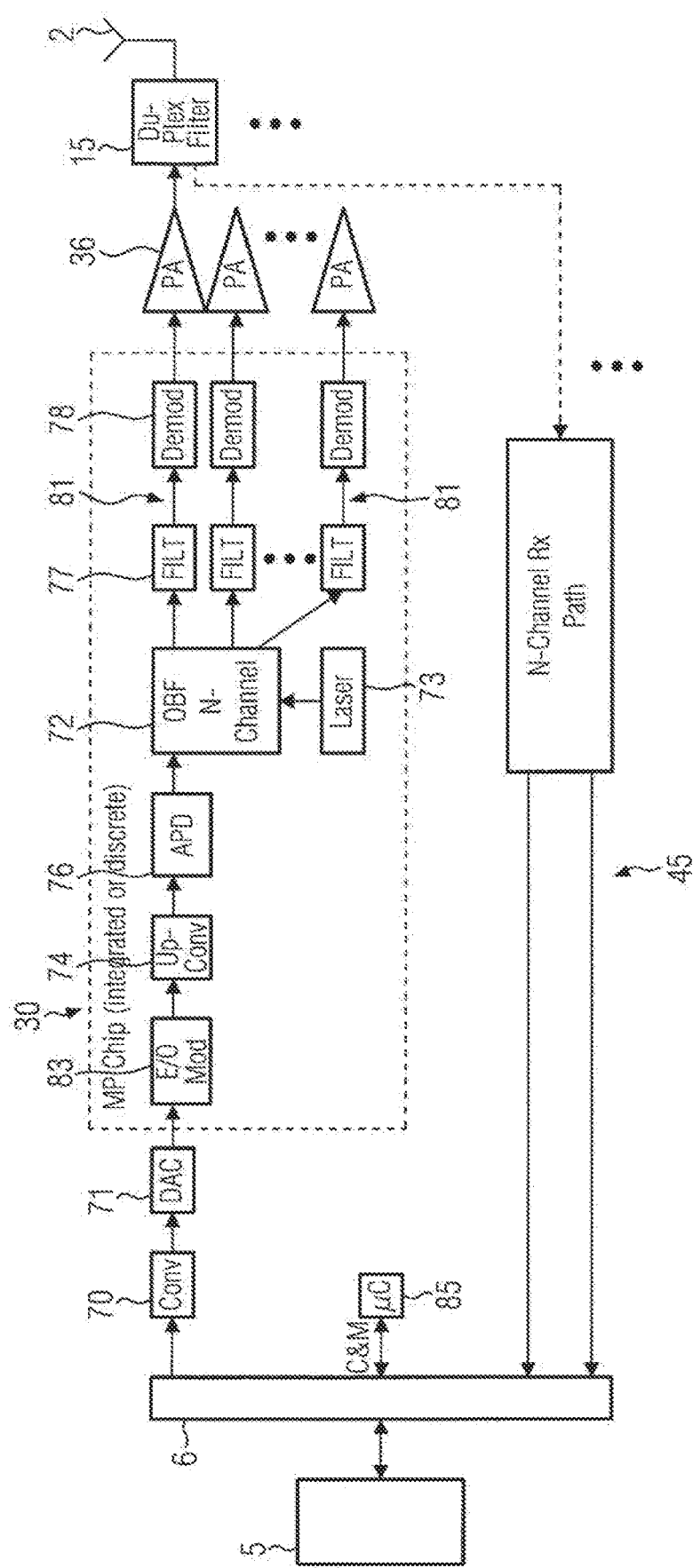
Figure 19:
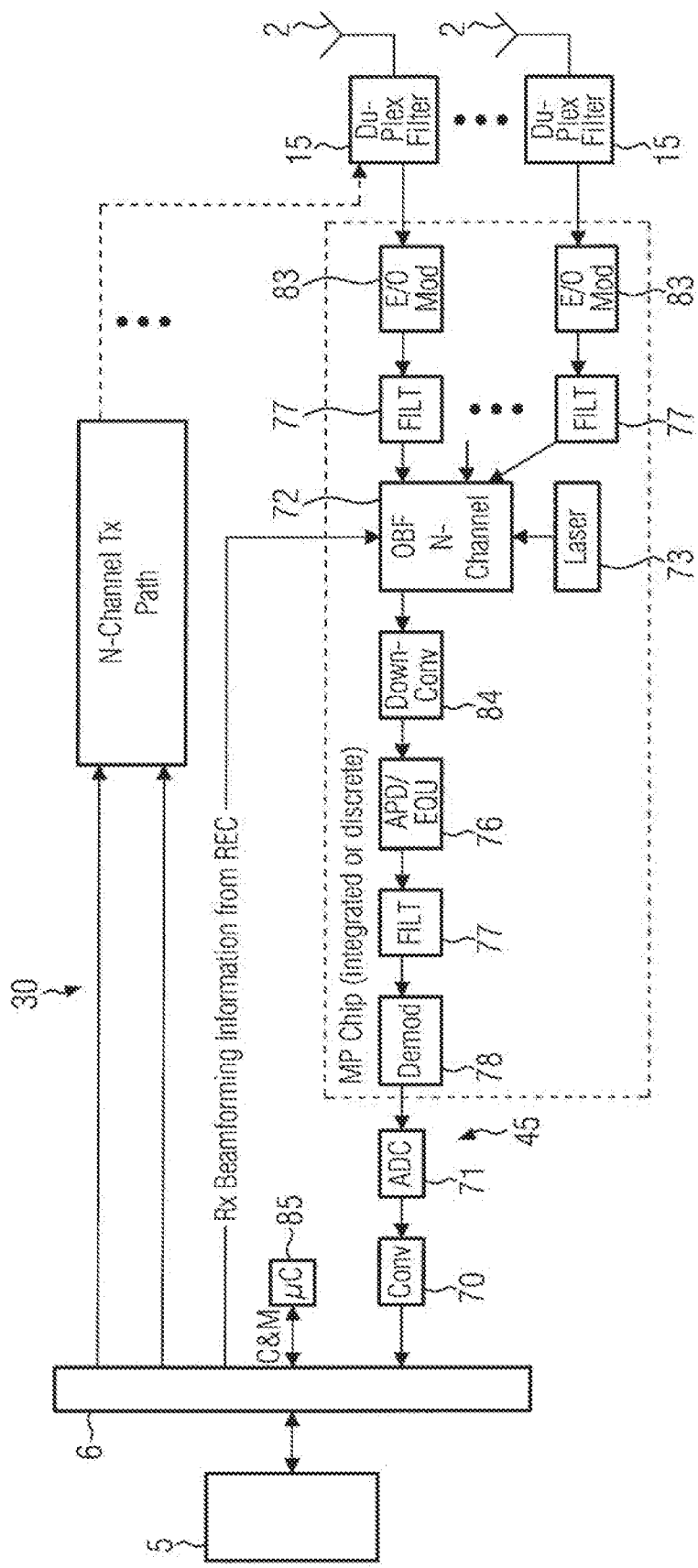

A digital FIR-filter which is suitable for analog predistortion can be realized by analog components, such as direction couplers and delays, wherein Mach-Zehnder modulators and Mach-Zehnder interferometers are used. Such an FIR-lattice filter architecture is e.g. shown in FIG. 4.1, FIG. 4.2 and FIG. 4.3 of EECS. Further suitable filter structures are shown in FIG. 6, FIG. 9, FIG. 14 and FIG. 15 of LPR. An analog bandpass filter is shown in FIG. 17 and FIG. 19 of LPR. These filter elements are tunable.

Photonic Beam Former

A photonic beam former is known from US 2013/0194134 A1. This document is incorporated by reference.

All these known elements can be used as up-converters, down-converters, electro-to-optical modulation units, optical-to-electrical modulation units, tunable filter elements and optical beamformer chips.

In the following, examples of the radio equipment 3 are explained comprising such kind of photonic elements.

Figure 15:
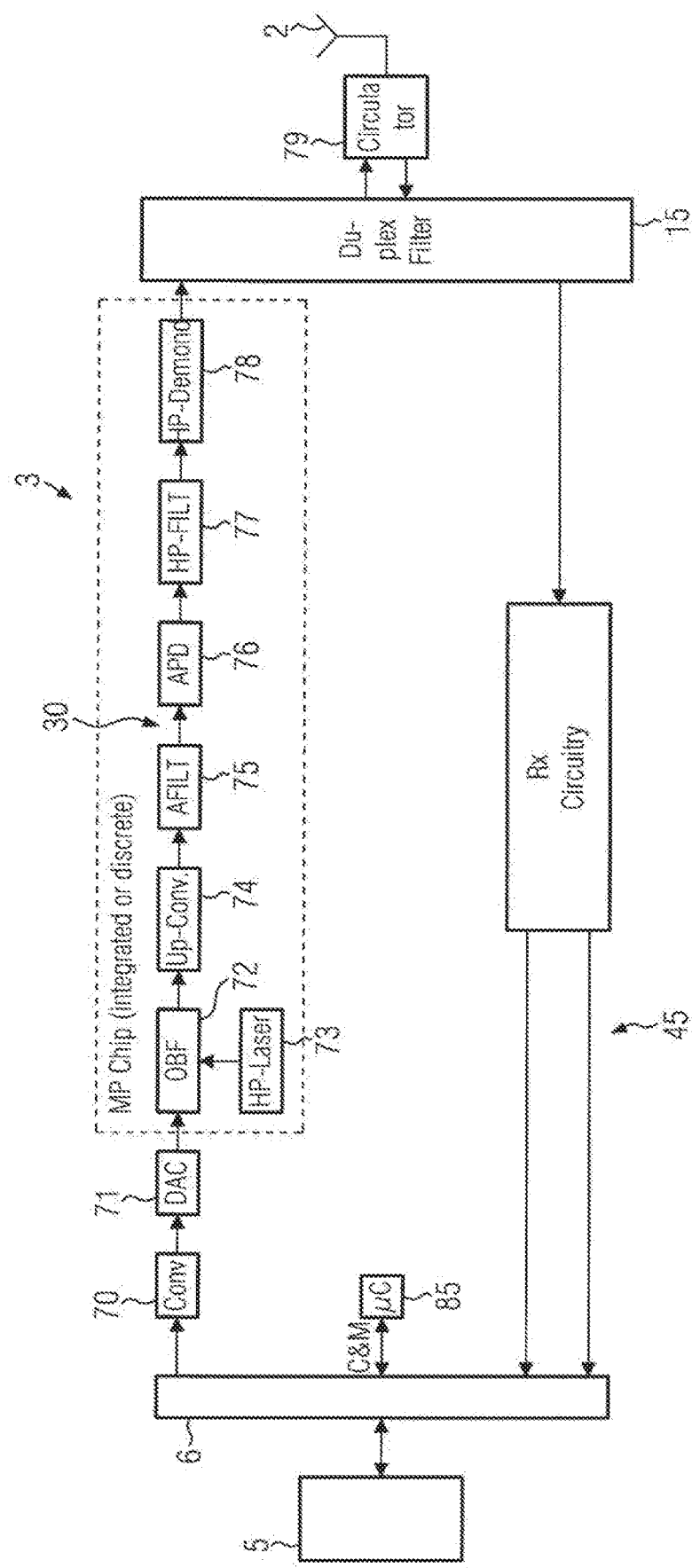

FIG. 15 shows a first embodiment of the electrooptical radio equipment 3. The radio equipment 3 is connected by means of an antenna interconnect 6 to the radio equipment control unit (not shown), which is identical to one of the above described embodiments. Similar to the above embodiments, a transmission path 30 and a receiving path 45 extend between the antenna interconnect 6 and a duplex filter 15. In the present embodiment, the receiving path 45 is based on electronic circuits only and embodied according to any one of the above described embodiments.

The transmission path 30 comprises a converter 70 to prepare the incoming data for optical processing. In the particular embodiment, the data transmitted via the antenna connect 6 are 8/10B-coded. The converter 70 converts the 8/10B code into 8 bit signals. This converter basically converts the digital base band signals so that the signals can be modulated onto a laser signal. Thus, other types of conversion can be suitable. These signals are further converted by a digital-to-analog converter 71 (DAC) into analog signals.

The digital-to-analog converter 71 is connected to an optical beamformer chip 72 (OBF). The optical beam former chip 72 comprises an electric-to-optical-modulator for converting the electrical analog signal into an optical signal. The optical beam former chip 72 is e.g. embodied as a photonic beamformer chip, which is disclosed in US 2013/0194134 A1. The optical beamformer chip 72 is connected to a laser 73 which is in the particular embodiment a high-power laser.

The optical beamformer chip 72 applies delays and optionally a modificated amplitude to the antenna signals, so that the antenna signals can be supplied to each antenna 2 with a predetermined or adaptive phase shift. Tunable ring resonators can be used for generating the phase shifts. Such ring resonators are usually coupled to a heater for adjusting the temperature of the ring resonator and thereby adjusting the electrical length of the ring resonator. In dependence of the length of the ring resonator, the resonance frequency of the ring will be changed. As such, a different frequency of light will couple to the ring resonator. Tunable power coupler are provided to the ring resonators to alter the amount of power (the "amount" of the optical signal) that couples to the ring. Thus, a single ring resonator provides a tunable delay, but it is bandwidth-limited. There is a trade off between the maximum delay achievable and the delay bandwidth. This is addressed by using more than one ring resonator, wherein plurality of ring resonators can be arranged in a cascade.

The optical beamformer chip 72 is connected to an optical up-converter 74 which is a mixer or another photonic upconversion element.

The upconverter 74 is followed by an AFILT 75 which is a small signal analog filter.

The AFILT 75 is followed by an APD 76 which is a photonic analog predistortion element. By means of the APD 76, the transmission path 30 is linearized. In case of static distortions, the APD can be embodied as an equalizer. The APD 76 can also be adaptive, as a feed forward structure or by means of a feedback loop that is provided from the output of the base band or from the output of the transmission path 30, wherein the feedback can be taken from the output of the optoelectronic section as it is shown in the following examples.

The APD 76 (Analog Predistortion Element) processes the HF-antenna signals by a combination of numerical operations, such as multiplications, additions, etc. From Optical Beam Forming Network created by silicon nitride microwave photonic circuits, Chris G. A. Roeloffzen et al., table 1 basic building blocks and their transfer functions are known, with which someone skilled in the art can compose the numerical operations for carrying out the analog predistortion in the APD 76. The numerical operations are basically the same as they are known from electrical predistortion circuits, however, they have to be adapted to the particular distortions in the optical or photonic section of the transmission path 30. Due to the large frequency gap between the HF-antenna signals and the carrier signal, such numerical operations can be carried out with a high quality factor.

The APD 76 is connected to a filter 77 which is in the particular embodiment a high performance filter. This is an integrated filter for bandpass filtering. As the carrier signal is light, there is a huge frequency gap between the carrier signal and the modulated user signal or antenna signal, respectively. Due to the huge frequency gap, the filtering both in the AFILT 75 as well and the filter 77 is carried out with a high quality factor.

The filter elements 75 and 77 are optical filter elements. Such filter elements can be embodied as interference filters, particularly dichroit filters or thin film filters. Such filter elements can also be adaptive. Such an adaptive filter element is e.g. a Fabry-Pérot interferometer. The quality factor of such interference filters is much higher than the one of electrical filters. Furthermore, the frequency gap between the antenna signal and the carrier signal (light) is very large in comparison to the above described embodiments based on electrical circuits. Therefore, the selectivity of the optical filters is much better than the one of the electrical filters.

The optical signals output from the filter 77 are demodulated into electrical signals by means of a HP-demodulation unit 78. The demodulation unit 78 is in the particular embodiment a high performance module for converting optical signals into electrical RF-signals.

Preferably, the laser 73 provides light with sufficient power that no further power amplification is needed in the transmission path 30. Thus, the antenna signals can be directly applied via the duplex filter 15 to the antenna 2.

Optionally, a circulator 79 is provided between the duplex filter 15 and the antenna 2, which prevents that reflected signals are transmitted back into the transmission path 30.

Thus, the optical processing of the antenna signals improves the quality significantly with respect to antenna signals achieved by pure electrical processing. This is particularly the case if no electrical amplification of the beamformed signals is needed. An electrical amplification can be omitted if the laser light has a sufficient intensity. Therefore, the laser is a high-power laser source 73.

Figure 16:
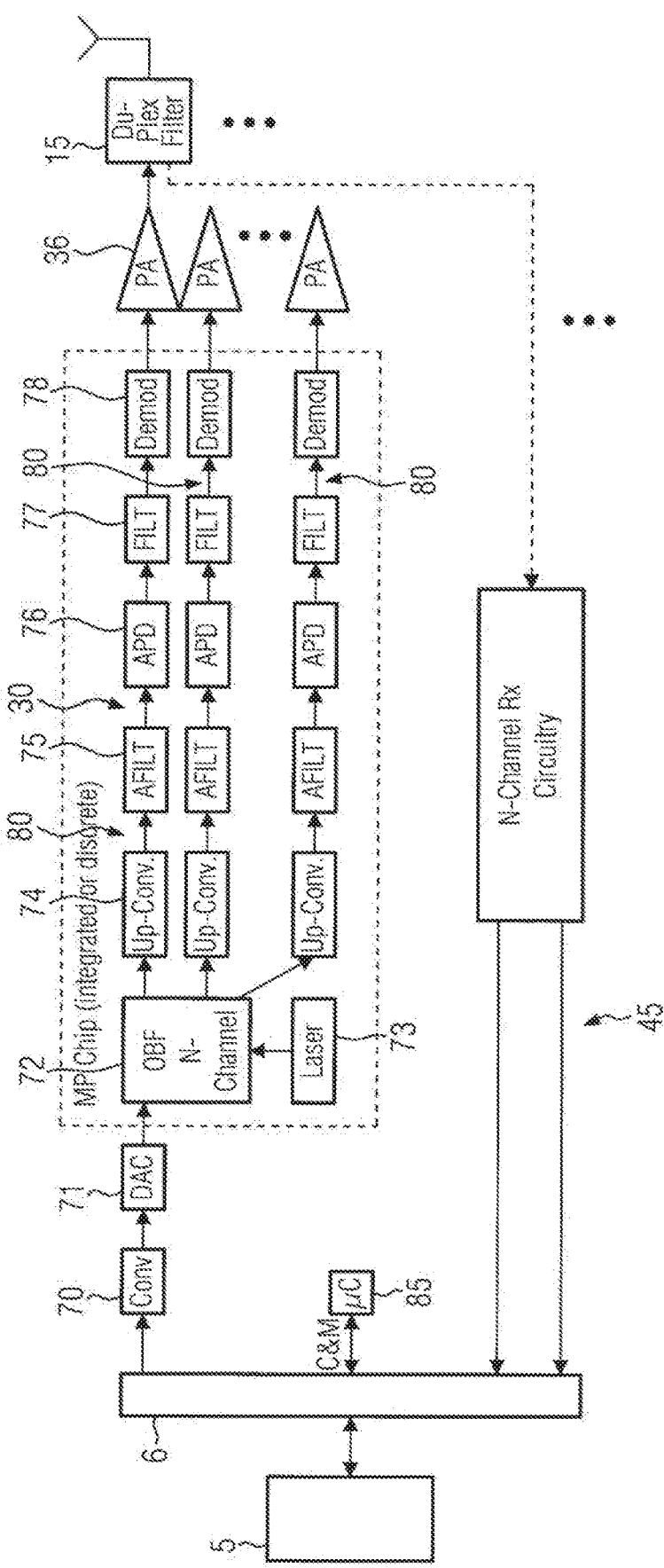

FIG. 16 shows an additional embodiment of the radio equipment 3 having an optical transmission path 30. The embodiment according to FIG. 16 corresponds substantially to the one of FIG. 15, however, the signals for the individual antennas or for individual groups of antennas 2 of an antenna array are separately processed after the beamforming in the optical beamforming chip 72. Thus, the transmission path 30 comprises several parallel optical process branches 80, each comprising an upconverter 74, an AFILT 75, an APD 76, a filter 77, and a demodulator 78. The optical process branches 80 are each connected to a power amplifier 36. The power amplifier 36 is connected to a duplex filter 15 which conducts the antenna signals to an antenna 2.

Due to the amplification by the power amplifiers 36, a laser source 73 can be used having less power than the one according to the embodiment of FIG. 15.

The APDs 76 can be embodied identically if it is assumed that the distortion in each optical process branch 80 is substantially identical. If an adaptive APD 76 is used, then a feedback loop is provided for each optical process branch 80. Preferably, the feedback loop includes also the corresponding power amplifier 36.

According to a further embodiment (FIG. 17), the optical beamforming chip 72 is arranged behind the upconverter 74 and the APD 76 with respect to the signal-running direction. The optical beamforming chip 72 is connected to several optical process branches 81, each comprising a filter element 77 and a demodulation unit 78. Each optical process branch 81 is connected to a power amplifier 36.

Figure 18:
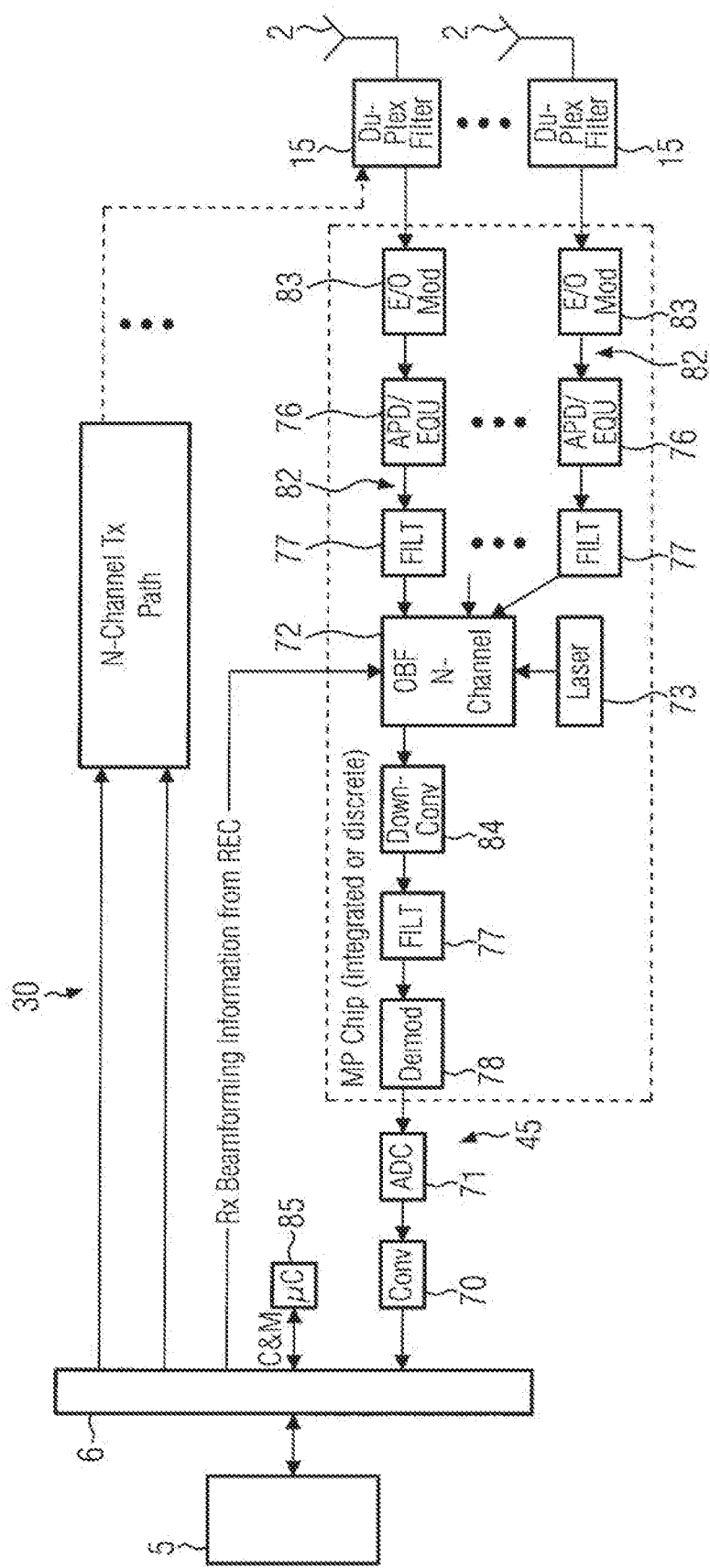

Also the receiving path 40 of the radio equipment 3 can be embodied with optical processing modules (FIG. 18). The receiving path 40 comprises several optical input branches 82, each connected to a duplex filter 15 of an antenna 2 or of a group of antennas 2.

Each optical input branch 82 comprises an electrical-to-optical modulation unit 83, an APD 76 and a filter element 77. Each optical input branch 82 is connected with an optical beamforming chip 72. A laser 73 is provided for inputting a light signal into the optical beamforming chip 72.

The output of the optical beamforming chip 72 is connected to a downconverter 84, a filter element 77 and a demodulation unit 78. The downconverter can also be placed behind the electrical-to-optical modulation unit and before the optical beamforming chip.

The beamforming chip 72 is additionally connected to an input line for inputting the receiving (Rx) beamforming information on the radio equipment control unit 5. By this information, it is possible to combine the antenna signals of the several antennas, wherein even-coded and/or scrambled signals can be decoded and composed.

A further embodiment, which is shown in FIG. 19, corresponds substantially to the embodiment of FIG. 18, wherein the APD is located between the down-converter 84 and the filter element 77 and not in the optical input branches 82.

Figure 20:
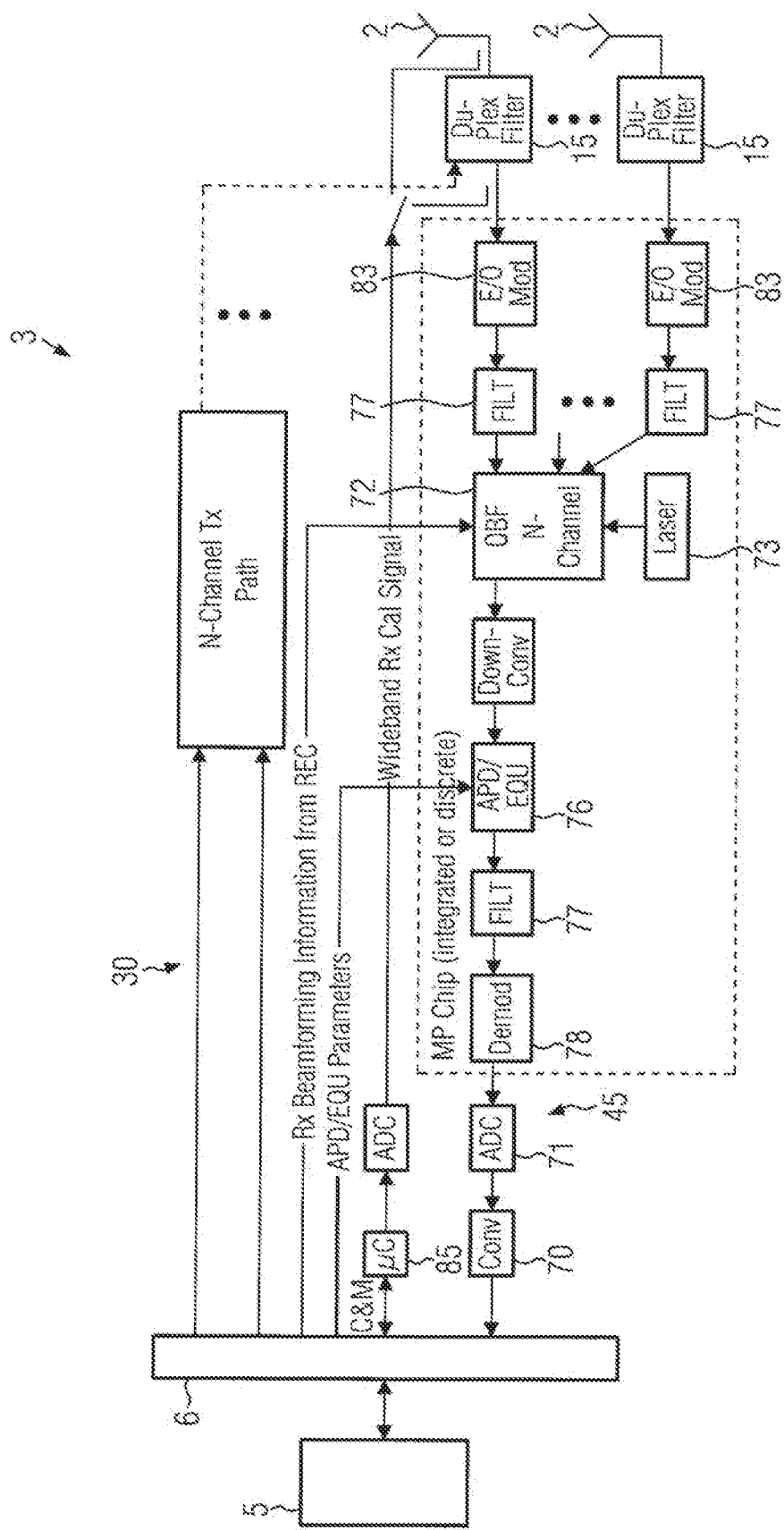

FIG. 20 shows a further embodiment of a radio equipment 3 comprising an optical domain receiving path 40 and further comprising means for calibrating the received antenna signals. This embodiment comprises substantially the electrical domain embodiments as shown in FIGS. 9a and 9b. the optical domain section in the receiving path 40 is substantially the same as the one of the embodiment according to FIG. 19. Additionally, an external coupling element 53 and an internal coupling element 56, wherein the internal coupling element 56 is located in the receiving path 45 between the duplex filter 15 and the electrical-to-optical modulation unit 83 and the external coupling element 53 is located between the duplex filter 15 and the antenna 2. The internal coupling element 56 and the external coupling element 53 are connected by a switch 57 to a reference path 46. The reference path 46 comprises a digital-to-analog converter 55 for converting a digital reference signal to an analog reference signal which can be applied to one of the coupling elements 53, 56. The reference signal can be generated by a digital signal processor and the comparison information can be determined by comparing the original reference signal with the received signal in a similar way as it is done in the embodiments of FIG. 9a, 9b. the corresponding means are schematically depicted in FIG. 20 by a block for a microcontroller 85. The determined comparison information can be supplied to the APD 76 for calibrating the received signals.

Controlling parameters deducted from the comparison information which are to be supplied to the APD 76 are to be converted from the electrical domain to the optical domain by means of an electrical-to-optical modulation unit (not shown).

Alternatively, it is possible to calibrate the received signals in the base band in the radio equipment control unit 5.

Alternatively, it is also possible to couple a portion of the transmitting antenna signal to the receiving path 45 and using it as reference signal. However, if an optical domain transmitting path 30 is provided due to the exact bandwidth limitation in an FDD system (frequency domain duplex system), there is hardly any overlap, even in the harmonics, between the frequencies of the transmitting antenna signals and the frequencies of the receiving antenna signals, so that it its not always not possible to directly use a portion of the transmitting signals as reference signal. In such a case, additional spread-spectrum-signals can be used in the transmitting antenna signals as reference signals, which do as such contain no information. It is also possible to use gaps in the spectrum between the frequencies or in the channels outside the regular transmitting frequencies.

If the radio equipment 3 is a TDD system (time domain duplex system), wherein the same frequencies are used for transmitting and receiving, then it is possible to directly use a portion of the transmitting antenna signal as reference signal in the receiving path 45.

Figure 23:
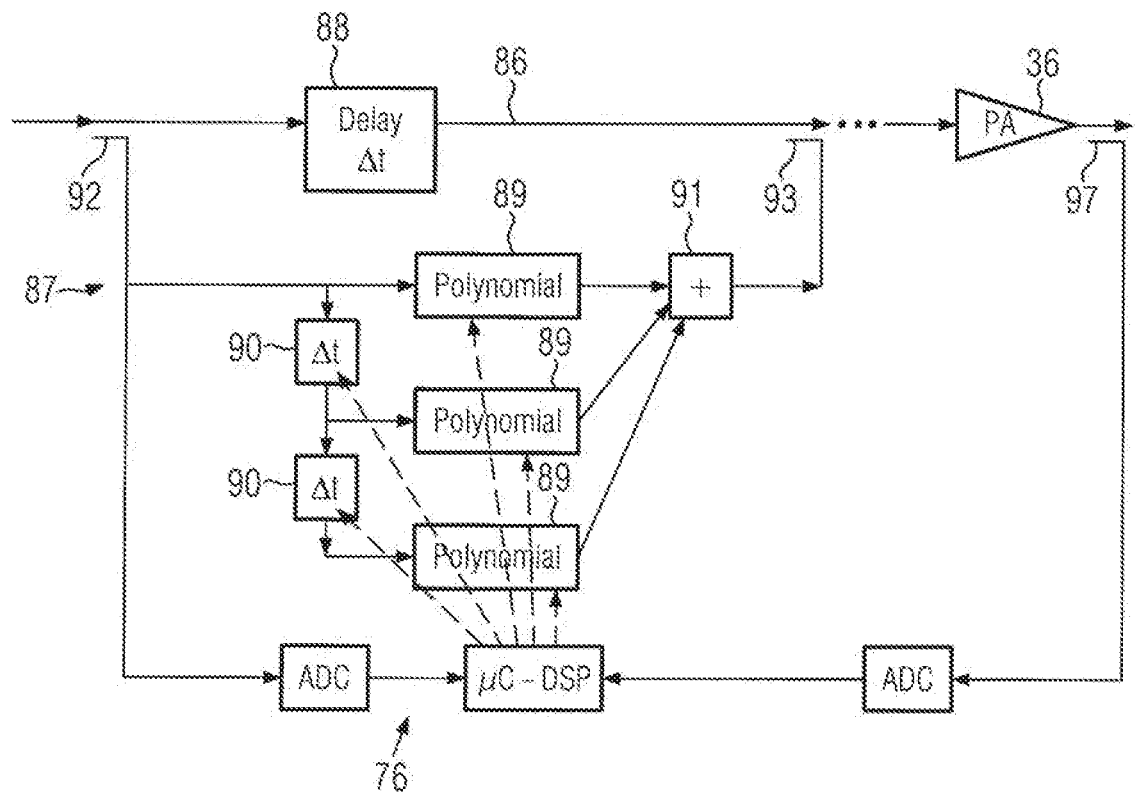

FIG. 23 shows an example of a feedback APD 76 which comprises a main branch 86 and correction branches 87, which are parallel to the main branch 86. The main branch 86 comprises a delay element 88. Each correction branch 87 comprises a polynomial correction element 89. Further delay elements 90 are located in the correction branches 87 before or after the polynomial correction element 89. All correction branches 87 are combined with an adder 91 for adding the signals of the individual correction branches 87 to a common correction signal.

The delay elements 90 and the polynomial correction elements 89 are connected to the microcontroller 85 for receiving correction parameters. Thus, the polynomial correction elements 89 are individually adjustable according to the determined comparison information. The correction branches 87 are coupled to the main branch 86 before and after the delay element 88 by means of coupling elements 92, 93. A portion of the signal which is to be corrected is branched off in the correction branches 87, where this portion of the signal is processed by several polynomial correction elements. The summarized correction signals are then coupled onto the main branch 86 for providing a predistortion to the signal which is to be corrected in the main branch 86. The delay elements 88, 90 secure that all signals of the main branch 86 and of all correction branches 87 are synchronized.

Figure 22:
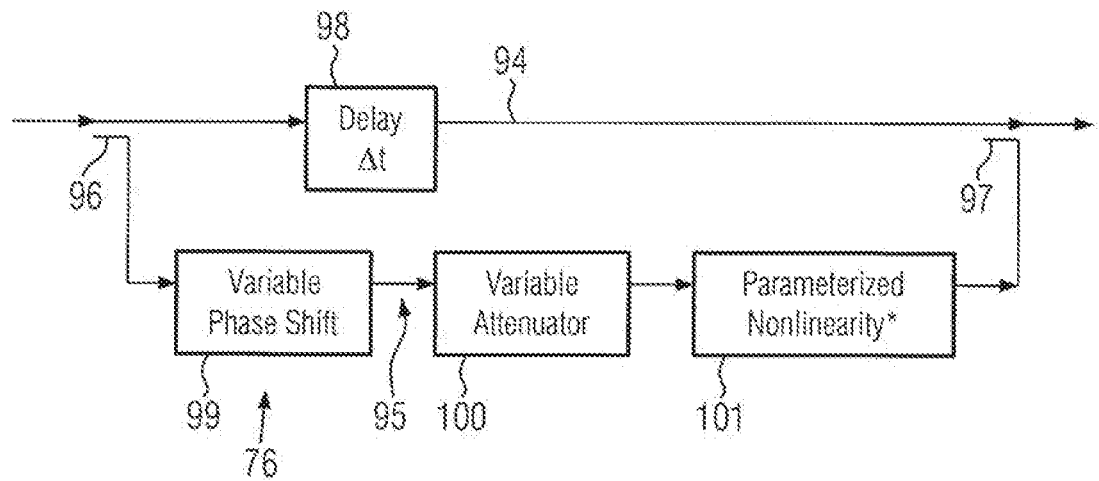

FIG. 22 shows an example of a feed forward APD 76 comprising a main branch 94 and a correction branch 95, wherein the correction branch is coupled to the main branch by coupling elements 96, 97. The main branch 94 comprises a delay element 98 and the correction branch 95 comprises at least one correction element 99, 100, 101. In the particular embodiments, the correction elements 99-101 are a variable phase shift element 99, a variable attenuator 100, and a parameterized non-linearity element 101. These correction elements 99-101 are adjustable, wherein during use they are adjustable and fixed parameters. It is also possible to provide several sets of parameters in a look-up table, wherein independence of the actual status of use the corresponding set of parameters is loaded to the correction elements 99-101, so that the APD 76 is adapted to a predefined operation status. Such an operation status can be defined by signal levels, temperature, etc.

Figure 21:
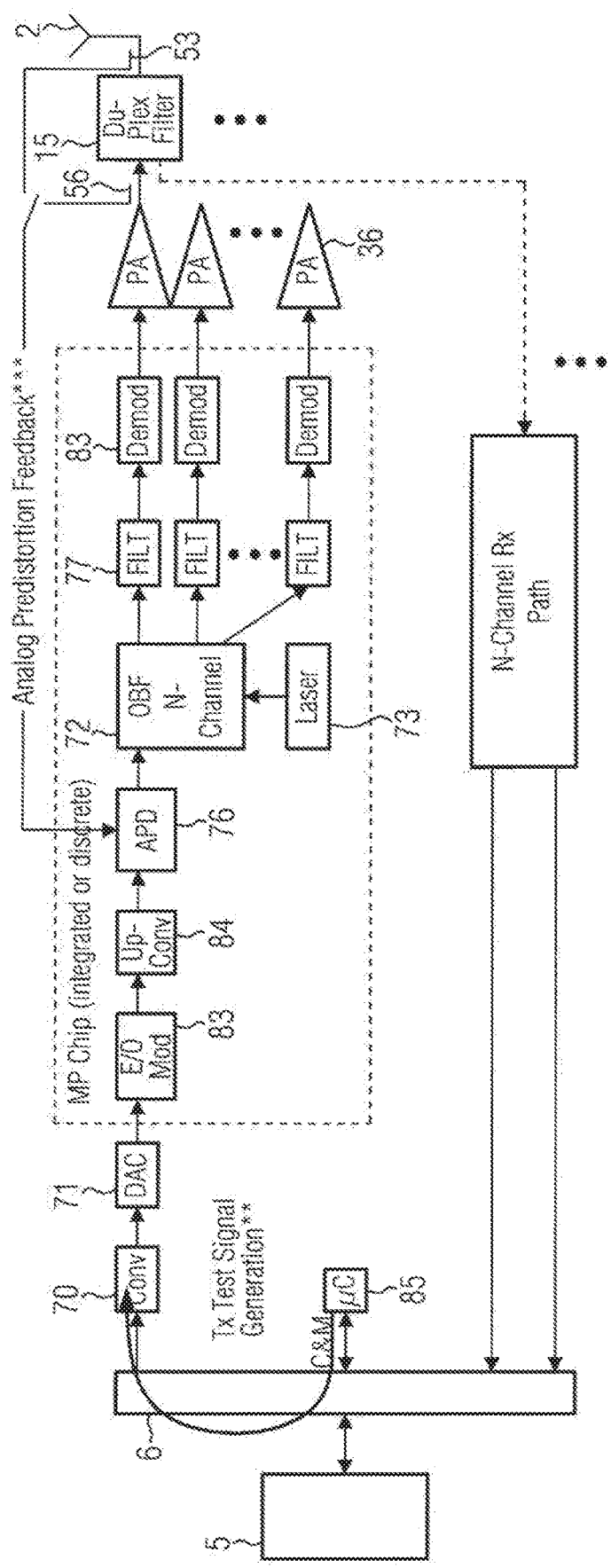

FIG. 21 shows a further embodiment of a radio equipment 3 comprising an optical domain transmission path 30 and further comprising means for calibrating the transmission antenna signals. This embodiment comprises substantially the electrical domain embodiments as shown in FIGS. 8a and 8b. the optical domain section in the transmission path 30 is substantially the same as the one of the embodiment according to FIG. 17. A feedback loop extending from the couplers 53, 56 is provided with a reference signal from the output of the base band. The reference signal is generated by a microcontroller 85.

The photonic APD 76 used in the above described embodiments of a radio equipment 3 is an analog predistortion element 76. A predistortion element can be also embodied as a FIR filter or IIR filter which is usually a digital element. Therefore, the photonic predistortion element can also be a digital predistortion element (DPD).

The above described examples according to electrical as well as photonic domain are embodied for FDD (frequency division duplex), wherein the transmitting and the receiving signals are transmitted in different frequency bands. These embodiments can also be embodied for TDD (time division multiplex), wherein the same frequencies are used for transmitting and receiving the antenna signals. In such a case the duplex filter is to be replaced by a switch for connecting alternatively the transmitting paths and the receiving paths with the corresponding antennas.

The above embodiments comprises an antenna interconnect 6 which is embodied for transmitting data according to the CPRI standard. The antenna interconnect can also be embodied for transmitting data according to other standards or other protocols, such as ORI, OBSAI, etc. The antenna interconnect can also be embodied for transmitting analog signals.

LIST OF REFERENCE SIGNS

| | |
|---|---|
| 1 | active antenna system |
| 2 | antenna |
| 3 | radio equipment |
| 4 | antenna tower |
| 5 | radio equipment control unit |
| 6 | antenna interconnect |
| 7 | Interface |
| 8 | core controller |
| 9 | channel card |
| 10 | antenna cable |
| 11 | hub |
| 12 | transceiver module |
| 13 | transceiver filter unit |
| 14 | control RF-base band unit |
| 15 | duplex filter amplifier |
| 16 | Tx-transmission chip |
| 17 | Rx-receiving chip |
| 18 | RF-base band chip |
| 19 | digital filter |
| 20 | calibration module |
| 21 | controller |
| 22 | transport interface |
| 23 | antenna module |
| 24 | antenna array |
| 25 | switch matrix |
| 26 | terminal |
| 27 | intermediate cable |
| 28 | main lobe |
| 29 | side lobe |
| 30 | transmission path |
| 31 | reference path |
| 32 | digital predistorsion unit |
| 33 | intermediate frequency-up mixer |
| 34 | digital-to-analog converter |
| 35 | channel frequency-up mixer |
| 36 | power amplifier |
| 37 | coupling element |
| 38 | intermediate frequency-down mixer |
| 39 | analog-to-digital converter |
| 40 | base band down mixer |
| 41 | digital signal processor |
| 42 | calibration unit |
| 43 | internal coupling element |
| 44 | switch |
| 45 | receiving path |
| 46 | reference path |
| 47 | low noise amplifier |
| 48 | channel band filter |
| 49 | intermediate frequency-down mixer |
| 50 | intermediate frequency band filter |
| 51 | base band down mixer |
| 52 | analog-to-digital converter |
| 53 | coupling element |
| 54 | channel frequency-up mixer |
| 55 | digital-to-analog converter |
| 56 | internal coupling element |
| 57 | switch |
| 58 | amplifier |
| 59 | summarizing node |
| 60 | summarizing node |
| 61 | current source |
| 62 | switch |
| 63 | communication partner |
| 64 | cell |
| 65 | homodyne receiver |
| 66 | attenuation element |
| 67 | IQ-compensation module |
| 68 | IQI-coefficient determination module |

| | |
|---|---|
| 69 | RNC |
| 70 | converter |
| 71 | digital-to-analog converter |
| 72 | optical beamformer chip |
| 73 | laser |
| 74 | upconverter |
| 75 | AFILT |
| 76 | APD |
| 77 | filter element |
| 78 | demodulation unit |
| 79 | circulator |
| 80 | optical process branch |
| 81 | optical process branch |
| 82 | optical input branch |
| 83 | electrical-to-optical modulation unit |
| 84 | downconverter |
| 85 | microcontroller |
| 86 | main branch |
| 87 | correction branch |
| 88 | delay element |
| 89 | polynomial correction element |
| 90 | delay element |
| 91 | adder |
| 92 | coupling element |
| 93 | coupling element |
| 94 | main branch |
| 95 | correction branch |
| 96 | coupling element |
| 97 | coupling element |
| 98 | delay element |
| 99 | radiator |

What is claimed is:

1. Active antenna system comprising
a plurality of antennas,
a radio equipment connected to the antennas,
wherein the radio equipment comprises for each antenna a separate transceiver module and antenna modules are each comprising one of said antennas and one of said transceiver modules, further comprising modules for determining delays caused by the runtime of antenna signals from a data source to the respective antenna module and for calculating delay coefficients for compensating the delays caused by the respective runtime, and the antenna modules comprise each a calibration module and the calibration modules are embodied for detecting the time when a synchronization signal for synchronizing the antenna modules passes the respective antenna module on the way from the data source to the most distant antenna module and on its way back to the data source, wherein the difference of these two time data is calculated and divided in half and the resulting time difference forms the delay time $\Delta t$ of the respective calibration module.

2. Active antenna system according to claim 1, wherein the data source is a radio equipment control unit.

3. Active antenna system according to claim 1, wherein the data source is embodied for the determination of calibration coefficients for all or a predetermined number of antenna modules and for carrying out the delay in a radio equipment control unit.

4. Active antenna system according to claim 1, wherein one of the antenna modules is the data source, wherein this antenna module generates a synchronization signal for synchronizing the antenna modules.

5. Active antenna system according to claim 1, comprising
a radio equipment control unit, wherein the radio equipment control unit comprises a hub being connected to the transceiver modules via an antenna interconnect, and the hub is embodied for receiving base band signals via the antenna interconnect from the transceiver modules and to extract channel signals from the received base band signals, or each transceiver module comprises a switch matrix being connected to the radio equipment control unit via an antenna interconnect.

6. Active antenna system according to claim 5, wherein the antenna interconnect comprises antenna cables for connecting the transceiver modules with the radio equipment control unit or wherein the antenna interconnect is a radio connect.

7. Active antenna system according to claim 5, wherein the radio equipment comprises an up-converter for converting a base band signal to a high frequency RF antenna signal for transmitting the antenna signal via the corresponding antenna, and a down-converter for converting a received high frequency RF antenna signal to a base band signal.

8. Active antenna system according to claim 5, wherein the radio equipment comprises a digital-to-analog converter for converting a digital signal received from the radio equipment control unit into an analog signal, and an analog-to-digital converter for converting an analog signal received by means of the antenna into a digital signal, wherein digital signals are transmitted via the antenna interconnect.

9. Active antenna system according to claim 5, wherein the radio equipment control unit is connected to the radio equipment by means of the antenna interconnect.

10. Active antenna system according to claim 5, wherein an up-converter for converting a base band signal to a high frequency RF antenna signal for transmitting the antenna signal via the corresponding antenna, and a down-converter for converting a received high frequency RF antenna signal to a base band signal.

11. Active antenna system according to claim 5, wherein several antenna modules of the radio equipment comprise each a switch matrix, and the switch matrix can be connected to a radio equipment control unit by means of the antenna interconnect or to a switch matrix of another antenna module by means of an intermediary cable.

12. Active antenna system according to claim 5, wherein the transceiver module comprises a calibration unit.

13. Active antenna system according to claim 12, wherein the calibration unit is part of a feedback loop comprising a digital signal processor and at least one coupler being coupled to a signal path in the proximity of one of said antennas.

14. Active antenna system according to claim 12, wherein the calibration unit is located in a transmission path and/or in a receiving path.

15. Active antenna system according to claim 5, wherein the radio equipment comprises an optical beam former chip and a photonic predistortion element.

16. Active antenna system comprising:
a plurality of antennas,
a radio equipment connected to the antennas,
wherein the radio equipment comprises for each antenna a separate transceiver module and antenna modules are each comprising one of said antennas and one of said transceiver modules, further comprising modules for determining delays caused by the runtime of antenna signals from a data source to the respective antenna module and for calculating delay coefficients for compensating the delays caused by the respective runtime, and each antenna module comprises a separate clock, wherein the clocks of the antenna modules can communicate with each other and one of said clocks is configured as a master clock and the other clocks are configured as slave clocks, wherein the master clock sends a clock signal to the slave clocks and the clock signal comprises a time stamp, so that the slave clocks receive the clock signals from the master clock together with the time stamp and calibrate their clocks according to a time difference between the time stamp and a time when the slave clock received the clock signal from the master clock, wherein the time difference can be determined either by iteratively returning the clock signals from the slave clocks to the master clock.

17. Active antenna system comprising:
a plurality of antennas,
a radio equipment connected to the antennas, and
a radio equipment control unit,
wherein the radio equipment comprises for each antenna a separate transceiver module and antenna modules are each comprising one of said antennas and one of said transceiver modules, further comprising modules for determining delays caused by the runtime of antenna signals from a data source to the respective antenna module and for calculating delay coefficients for compensating the delays caused by the respective runtime, the radio equipment control unit comprises a hub being connected to the transceiver modules via an antenna interconnect, and the hub is embodied for receiving base band signals via the antenna interconnect from the transceiver modules and to extract channel signals from the received base band signals, or each transceiver module comprises a switch matrix being connected to the radio equipment control unit via an antenna interconnect, the transceiver module comprises a calibration unit, which is part of a feedback loop comprising a digital signal processor and at least one coupler being coupled to a signal path in the proximity of one of said antennas, and the feedback loop comprises a second coupler being coupled to the signal path, wherein one of said couplers is located in between the antenna and a duplex filter and the other coupler is located adjacent to the duplex filter but distant to the antenna.

* * * * *